United States Patent
Moriya et al.

(10) Patent No.: US 8,249,379 B2
(45) Date of Patent: Aug. 21, 2012

(54) IMAGE PROCESSING APPARATUS AND METHOD AND IMAGE DISPLAY APPARATUS

(75) Inventors: Shotaro Moriya, Tokyo (JP); Noritaka Okuda, Tokyo (JP); Satoshi Yamanaka, Tokyo (JP); Koji Minami, Tokyo (JP); Yoshitaka Toyoda, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 219 days.

(21) Appl. No.: 12/810,448

(22) PCT Filed: Nov. 25, 2009

(86) PCT No.: PCT/JP2009/006356
§ 371 (c)(1),
(2), (4) Date: Jun. 24, 2010

(87) PCT Pub. No.: WO2010/073485
PCT Pub. Date: Jul. 1, 2010

(65) Prior Publication Data
US 2010/0310166 A1    Dec. 9, 2010

(30) Foreign Application Priority Data

Dec. 22, 2008  (JP) ................. 2008-325148
Dec. 22, 2008  (JP) ................. 2008-325180
Jan. 14, 2009  (JP) ................. 2009-005549
Mar. 18, 2009  (JP) ................. 2009-066630
Mar. 23, 2009  (JP) ................. 2009-070498

(51) Int. Cl.
*G06K 9/44* (2006.01)
(52) U.S. Cl. ..................................... 382/264
(58) Field of Classification Search .......... 382/167, 382/264, 100
See application file for complete search history.

(56) References Cited

U.S. PATENT DOCUMENTS 5,717,789 A    2/1998 Anderson et al.
(Continued)

FOREIGN PATENT DOCUMENTS

EP    1530364 A1    5/2005
(Continued)

OTHER PUBLICATIONS

Greenspan et al., "Image enhancement by non-linear extrapolation in frequency space", Proceedings of the IS&T/SPIE Symposium on Electric Imaging Science and Technology—Image and Vedio Processing II, vol. 2182, pp. 2-13, Feb. 1994.

(Continued)

*Primary Examiner* — Claire X Wang
(74) *Attorney, Agent, or Firm* — Birch, Stewart, Kolasch & Birch, LLP

(57) ABSTRACT

A first intermediate image generating means (1) generates an intermediate image (D1) by extracting a component of an input image DIN in a particular frequency band; a second intermediate image generating means (2) generates an intermediate image D2 having a frequency component higher than the intermediate image (D1); a first intermediate image processing means (3M) generates an intermediate image (D3M) by amplifying the pixel values in the intermediate image (D1); a second intermediate image processing means (3H) generates an intermediate image (D3H) by amplifying the pixel values in the intermediate image (D2); and an adding means (4) adds the input image (DIN) and the intermediate image (D3M) and the intermediate image (D3H) together to obtain an output image (DOUT). A first amplification factor (D3MA) and a second amplification factor (D3HA) are determined according to pixel values in the input image (DIN). Even if the input image includes a fold-over component on the high-frequency side or does not include an adequate high-frequency component, an enhanced image can be provided without causing overshoot.

15 Claims, 55 Drawing Sheets

U.S. PATENT DOCUMENTS

| | | | |
|---|---|---|---|
| 6,005,983 A | 12/1999 | Anderson et al. | |
| 6,738,528 B1 | 5/2004 | Nio et al. | |
| 2007/0080975 A1 | 4/2007 | Yamashita et al. | |
| 2007/0165048 A1 | 7/2007 | Yamashita et al. | |
| 2007/0237425 A1 | 10/2007 | Taguchi et al. | |
| 2009/0232401 A1 | 9/2009 | Yamashita et al. | |
| 2011/0211766 A1* | 9/2011 | Moriya et al. | 382/264 |

FOREIGN PATENT DOCUMENTS

| | | |
|---|---|---|
| EP | 1667066 A1 | 6/2006 |
| EP | 1809018 A2 | 7/2007 |
| JP | 5-344386 A | 12/1993 |
| JP | 7-177386 A | 7/1995 |
| JP | 8-111792 A | 4/1996 |
| JP | 9-44651 A | 2/1997 |
| JP | 9-46576 A | 2/1997 |
| JP | 2000-050275 A | 2/2000 |
| JP | 2000-115582 A | 4/2000 |
| JP | 2006-246080 A | 9/2006 |
| JP | 2006-340006 A | 12/2006 |
| JP | 2007-312349 A | 11/2007 |
| JP | 2008-125112 A | 5/2008 |
| JP | 2008-159069 A | 7/2008 |
| WO | 94/22265 A1 | 9/1994 |
| WO | WO 2010/013400 A1 | 2/2010 |

OTHER PUBLICATIONS

Shimura et al., "A digital Image Enlarging Method without Edge Effect by Using the e-Filter", Journal of IEICE, vol. J86-A, No. 5, pp. 540-551, May 1, 2003.

Extended European Search Report dated Jun. 18, 2012 for European Application No. 12162488.6.

Greenspan et al., "Image Enhancement By Nonlinear Extrapolation in Frequency Space," IEEE Transactions on Image Processing, vol. 9, No. 6, Jun. 2000, pp. 1035-1048, XP055028978.

* cited by examiner

FIG.11 (A)

| A11 | A21 | A31 | A41 |
|-----|-----|-----|-----|
| A12 | A22 | A32 | A42 |
| A13 | A23 | A33 | A43 |
| A14 | A24 | A34 | A44 |

FIG.11 (B)

| A11 | 0 | A21 | 0 | A31 | 0 | A41 | 0 |
|-----|---|-----|---|-----|---|-----|---|
| A12 | 0 | A22 | 0 | A32 | 0 | A42 | 0 |
| A13 | 0 | A23 | 0 | A33 | 0 | A43 | 0 |
| A14 | 0 | A24 | 0 | A34 | 0 | A44 | 0 |

FIG.11 (C)

| B11 | B21 | B31 | B41 | B51 | B61 | B71 | B81 |
|-----|-----|-----|-----|-----|-----|-----|-----|
| B12 | B22 | B32 | B42 | B52 | B62 | B72 | B82 |
| B13 | B23 | B33 | B43 | B53 | B63 | B73 | B83 |
| B14 | B24 | B34 | B44 | B53 | B64 | B74 | B84 |

FIG.11 (D)

| B11 | B21 | B31 | B41 | B51 | B61 | B71 | B81 |
|-----|-----|-----|-----|-----|-----|-----|-----|
| 0   | 0   | 0   | 0   | 0   | 0   | 0   | 0   |
| B12 | B22 | B32 | B42 | B52 | B62 | B72 | B82 |
| 0   | 0   | 0   | 0   | 0   | 0   | 0   | 0   |
| B13 | B23 | B33 | B43 | B53 | B63 | B73 | B83 |
| 0   | 0   | 0   | 0   | 0   | 0   | 0   | 0   |
| B14 | B24 | B34 | B44 | B53 | B64 | B74 | B84 |
| 0   | 0   | 0   | 0   | 0   | 0   | 0   | 0   |

FIG.11 (E)

| C11 | C21 | C31 | C41 | C51 | C61 | C71 | C81 |
|-----|-----|-----|-----|-----|-----|-----|-----|
| C12 | C22 | C32 | C42 | C52 | C62 | C72 | C82 |
| C13 | C23 | C33 | C43 | C53 | C63 | C73 | C83 |
| C14 | C24 | C34 | C44 | C54 | C64 | C74 | C84 |
| C15 | C25 | C35 | C45 | C55 | C65 | C75 | C85 |
| C16 | C26 | C36 | C46 | C56 | C66 | C76 | C86 |
| C17 | C27 | C37 | C47 | C57 | C67 | C77 | C87 |
| C18 | C28 | C38 | C48 | C58 | C68 | C78 | C88 |

FREQUENCY SPECTRUM OF ORIGINAL IMAGE DORG

FREQUENCY SPECTRUM OF IMAGE DU1A

FREQUENCY RESPONSE OF HORIZONTAL LOW-FREQUENCY COMPONENT PASSING MEANS U1B

FREQUENCY SPECTRUM OF IMAGE DU1B

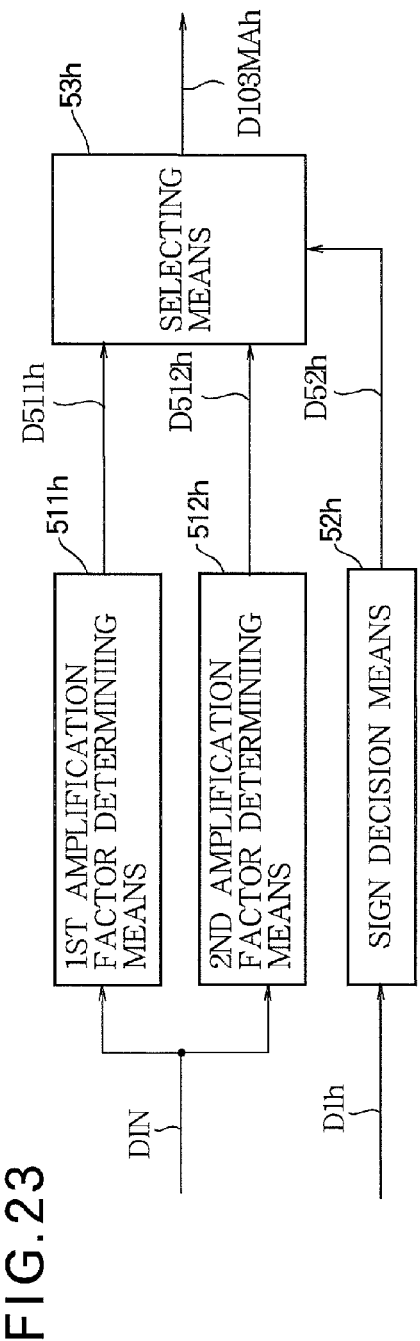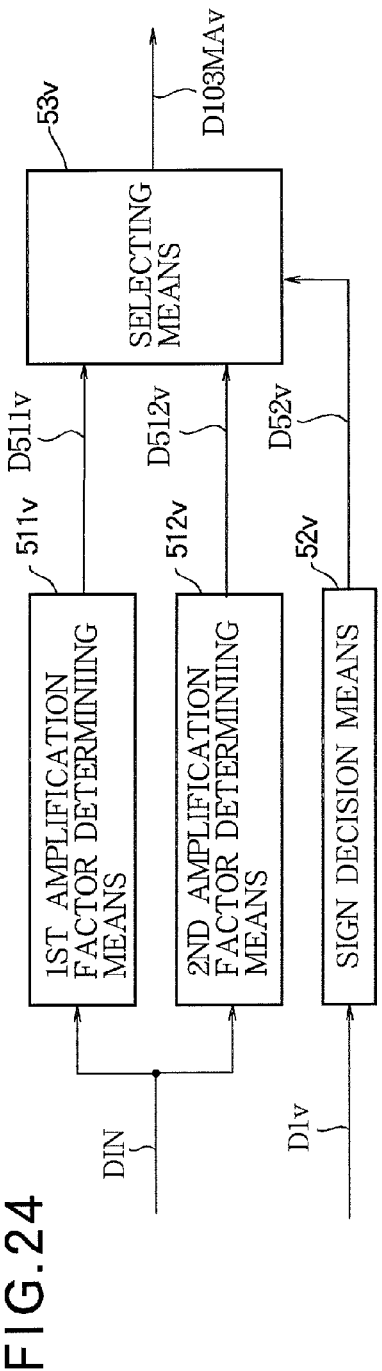

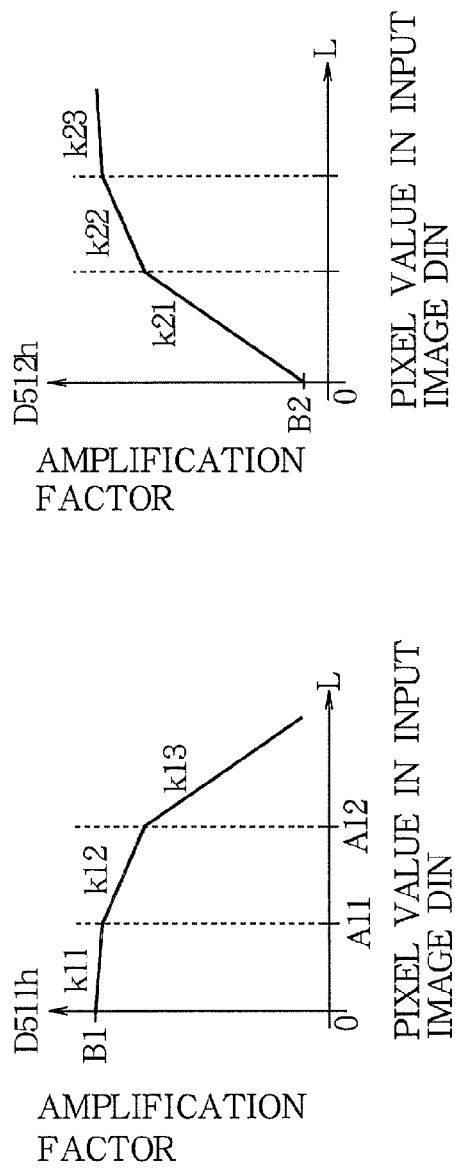
FIG. 25 (A)
FIG. 25 (B)
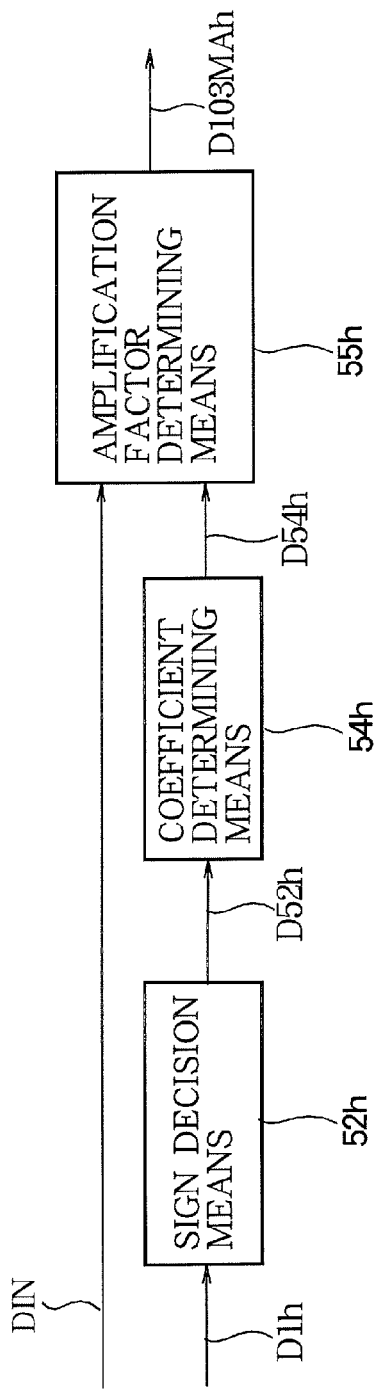
FIG. 26

FIG.30(A)

| | y=1 | y=2 | y=3 | y=4 |
|---|---|---|---|---|
| x=4 | YC(41) | YC(42) | YC(43) | YC(44) |
| x=3 | YC(31) | YC(32) | YC(33) | YC(34) |
| x=2 | YC(21) | YC(22) | YC(23) | YC(24) |
| x=1 | YC(11) | YC(12) | YC(13) | YC(14) |

FIG.30(B)

| | y=1 | y=2 | y=3 | y=4 |
|---|---|---|---|---|
| x=4 | D1h(41) | D1h(42) | D1h(43) | D1h(44) |
| x=3 | D1h(31) | D1h(32) | D1h(33) | D1h(34) |
| x=2 | D1h(21) | D1h(22) | D1h(23) | D1h(24) |
| x=1 | D1h(11) | D1h(12) | D1h(13) | D1h(14) |

FIG.30(C)

| | y=1 | y=2 | y=3 | y=4 |
|---|---|---|---|---|
| x=4 | D1v(41) | D1v(42) | D1v(43) | D1v(44) |
| x=3 | D1v(31) | D1v(32) | D1v(33) | D1v(34) |
| x=2 | D1v(21) | D1v(22) | D1v(23) | D1v(24) |
| x=1 | D1v(11) | D1v(12) | D1v(13) | D1v(14) |

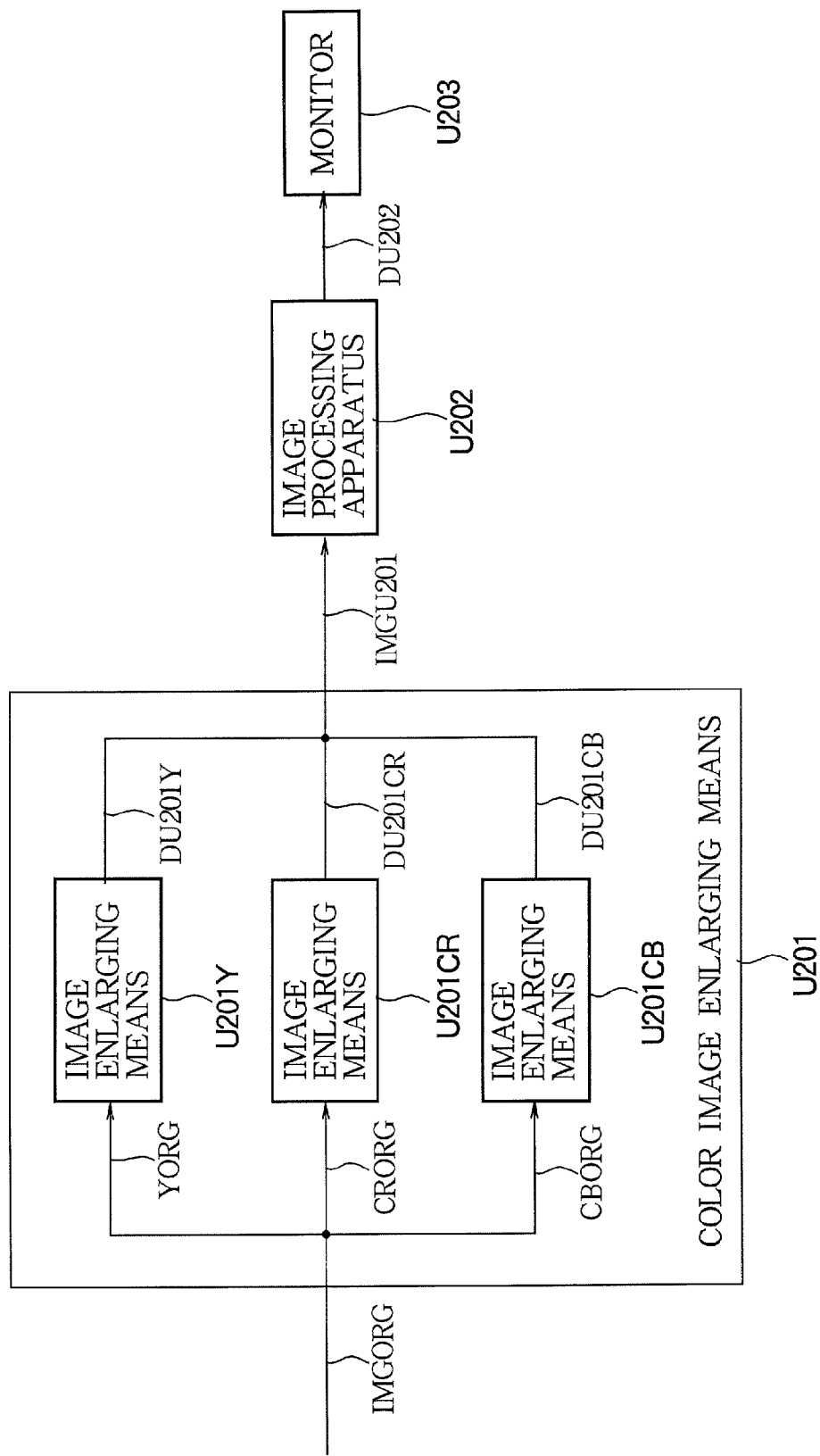

FREQUENCY SPECTRUM
OF INPUT IMAGE IMGIN

FREQUENCY RESPONSE
OF HIGH-FREQUENCY
COMPONENT IMAGE
GENERATING MEANS 1A

FREQUENCY RESPONSE
OF LOW-FREQUENCY
COMPONENT IMAGE
GENERATING MEANS 1B

FREQUENCY RESPONSE
OF INTERMEDIATE IMAGE
GENERATING MEANS 1

FREQUENCY SPECTRUM OF
INTERMEDIATE IMAGE D1

PIXEL VALUE OF INPUT IMAGE YIN

IMAGE PROCESSING APPARATUS AND METHOD AND IMAGE DISPLAY APPARATUS

FIELD OF THE INVENTION

The present invention relates to an image processing apparatus and an image processing method that enhance an input image by, for example, generating and adding high-frequency components to an enlarged input image that is an enlargement of an original image, in order to obtain an output image with a high perceived resolution, and to an image display apparatus using the image processing apparatus and an image processing method.

BACKGROUND ART

Images are generally played back and displayed after image signals representing the image have been subjected to appropriate image processing.

When image enhancement processing is carried out on a color image, image enhancement processing of the luminance signal is carried out.

In the image processing apparatus disclosed in patent document 1, for example, following multiresolution decomposition, a desired frequency band is enhanced by specifying an enhancement coefficient for the image in the desired frequency band according to the image signal in a lower frequency band.

The sharpness enhancement circuit disclosed in patent document 2 includes a first enhancement circuit for enhancing the luminance component of the input image signal around the frequency band including the highest-frequency component of the luminance component and a second enhancement circuit for enhancing the luminance component of the image signal at a center frequency lower than in the first enhancement circuit.

PRIOR ART REFERENCES

Patent Documents

Patent document 1: Japanese Patent Application Publication No. H9-44651
Patent document 2: Japanese Patent Application Publication No. 2000-115582

SUMMARY OF THE INVENTION

Problems to be Solved by the Invention

In the image processing apparatus in which an appropriate enhancement coefficient is specified for the image in a desired frequency band of the decomposed multiresolution image, for some input images the enhancement processing is inappropriate or inadequate and output images with proper picture quality cannot be obtained.

If an image that has been subjected to enlargement processing is input as an input image, for example, part of the frequency spectrum of the image before the enlargement processing folds over and appears as a fold-over component on the high-frequency side of the frequency spectrum of the input image. Simply enhancing the high-frequency component is then inappropriate, because the fold-over component is enhanced. If the frequency band is limited so as to enhance only a frequency band excluding the fold-over component, however, then enhancement of the high-frequency side of the frequency spectrum must be avoided, and in consequence, the enhancement processing is inadequate.

If a noise-suppressed image is input as an input image, the high-frequency side of the frequency spectrum has been eliminated by noise suppression. Attempts to extract the high-frequency component therefore fail, which may make it impossible to carry out adequate image enhancement processing.

When the luminance component of an input image signal is enhanced, the shades of colors in colored areas (areas having relatively high colorfulness) around edges may be changed: colors near colored edges may become white (or faint), or edge areas may become blackened.

An object of the present invention is to provide an image processing apparatus and an image processing method that can enhance an input image adequately even if the image includes a fold-over component on the high-frequency side of its frequency spectrum or does not include an adequate high-frequency component.

Means of Solution of the Problems

An aspect of the invention provides an image processing apparatus having:
a first intermediate image generating means for generating a first intermediate image by extracting a component of an input image in a particular frequency band;
a second intermediate image generating means for generating a second intermediate image from the first intermediate image;
a first intermediate image processing means for generating a third intermediate image from the first intermediate image;
a second intermediate image processing means for generating a fourth intermediate image from the second intermediate image; and
an adding means for adding the input image and the third intermediate image and the fourth intermediate image together; wherein
the first intermediate image processing means amplifies a pixel value in the first intermediate image by a first amplification factor determined according to a pixel value in the input image; or
the second intermediate image processing means amplifies a pixel value in the second intermediate image by a second amplification factor determined according to the pixel value in the input image.

Effect of the Invention

According to an aspect of the present invention, adequate image enhancement processing can be carried out, while preventing the occurrence of overshoot, even if the frequency spectrum of the input image includes a fold-over component on the high-frequency side, or does not include adequate high-frequency components.

BRIEF DESCRIPTION OF THE DRAWINGS

FIGS. 11(A) to 11(E) are pixel arrangement diagrams illustrating the operation of the image enlarging means U1 in FIG. 10.

FIG. 23 is a block diagram illustrating an exemplary structure of the horizontal amplification factor determining means 103MAh in FIG. 21.

FIG. 24 is a block diagram illustrating an exemplary structure of the vertical amplification factor determining means 103MAv in FIG. 21.

FIGS. 25(A) and 25(B) are diagrams showing the relationship between the pixel values in the input image DIN and the amplification factors in the first intermediate image processing means 103M and second intermediate image processing means 103H.

FIG. 26 is a block diagram illustrating another exemplary structure of the horizontal amplification factor determining means 103MAh in FIG. 21.

FIGS. 30(A) to 30(C) are diagrams showing the arrangement of pixels in the summed luminance and color difference image YC, image D1h, and image D1v.

FIG. 31 is a block diagram illustrating an exemplary structure of an image display apparatus utilizing the image processing apparatus according to the third embodiment.

FIGS. 41(A) to 41(C) are diagrams showing the arrangement of pixels in the summed high-frequency component image D404, input CR image CRIN, and input CB image CBIN.

MODE FOR CARRYING OUT THE INVENTION

The image processing apparatus in the embodiments of the present invention described below can be utilized as, for example, part of an image display apparatus.

First Embodiment

Figure 1:
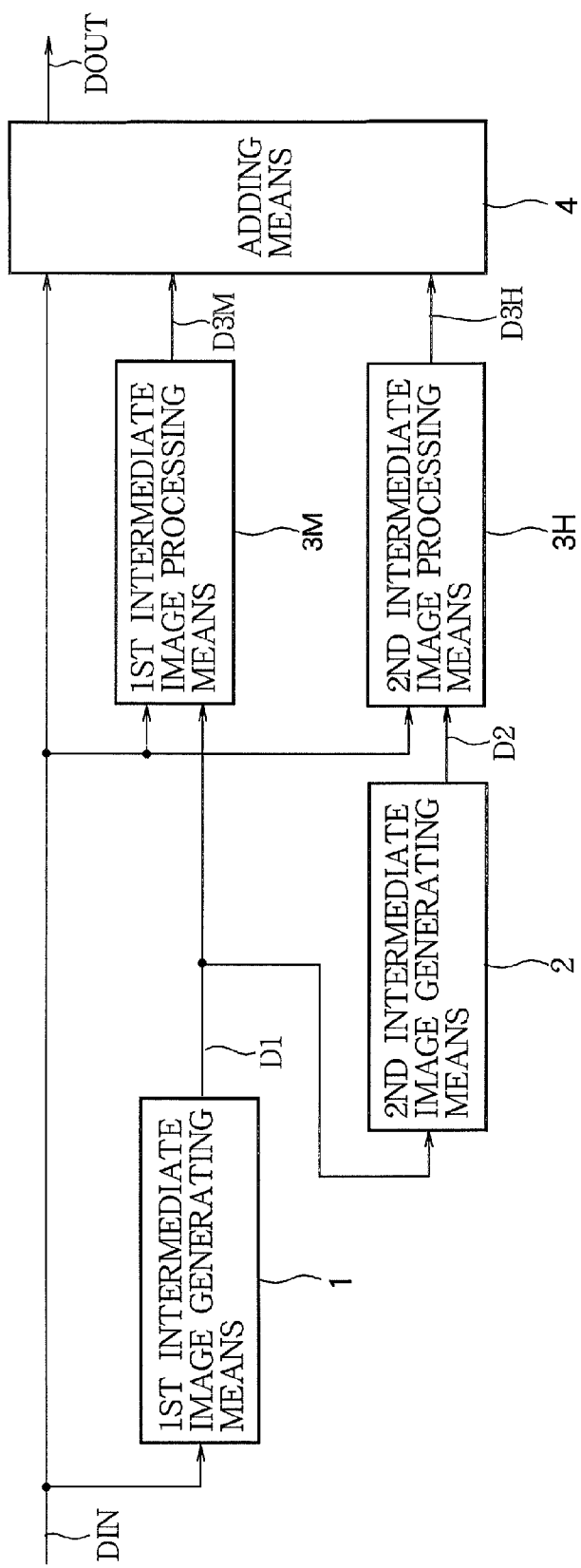
FIG. 1 is a block diagram illustrating the structure of an image processing apparatus according to a first embodiment of the invention.

FIG. 1 is a diagram illustrating an exemplary structure of an image processing apparatus according to a first embodiment of the invention.

The illustrated image processing apparatus includes a first intermediate image generating means 1, a second intermediate image generating means 2, a first intermediate image processing means 3M, a second intermediate image processing means 3H, and an adding means 4.

The first intermediate image generating means 1 generates an intermediate image D1 (the first intermediate image) by extracting components in a particular frequency band (components from a first frequency (a first predetermined frequency) to a second frequency (a second predetermined frequency)) from an input image DIN.

The second intermediate image generating means 2 generates an intermediate image D2 (the second intermediate image) by carrying out certain processing, which will be described later, on intermediate image D1.

The first intermediate image processing means 3M generates an intermediate image D3M (the third intermediate image) by carrying out certain processing, which will be described later, on intermediate image D1.

The second intermediate image processing means 3H generates an intermediate image D3H (the fourth intermediate image) by carrying out certain processing, which will be described later, on intermediate image D2.

The adding means 4 adds the input image DIN, intermediate image D3M, and intermediate image D3H together.

The image obtained as the resulting sum by the adding means 4 is output as a final output image DOUT.

Figure 2:
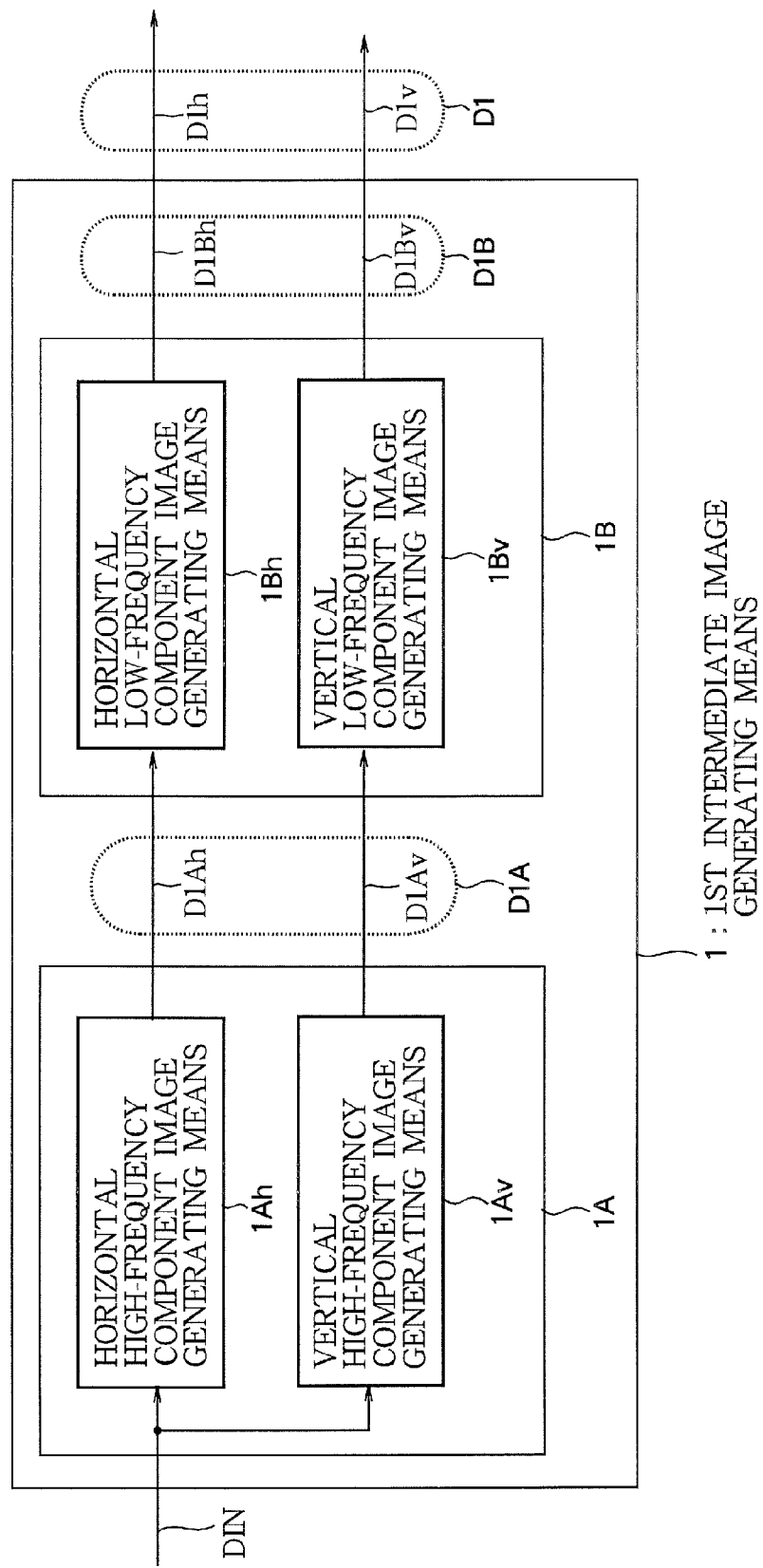
FIG. 2 is a block diagram illustrating an exemplary structure of the first intermediate image generating means 1 in FIG. 1.

FIG. 2 is a diagram illustrating an exemplary structure of the first intermediate image generating means 1. The illustrated first intermediate image generating means 1 includes a high-frequency component image generating means 1A for generating an image D1A by extracting only the high-frequency component above the first frequency from the input image DIN and a low-frequency component image generating means 1B for generating an image D1B by extracting only the low-frequency component below the second frequency from image D1A. The high-frequency component image generating means 1A and the low-frequency component image generating means 1B form a band-pass filter means for extracting the component in a particular frequency band. Image D1B is output from the first intermediate image generating means 1 as intermediate image D1.

Figure 3:
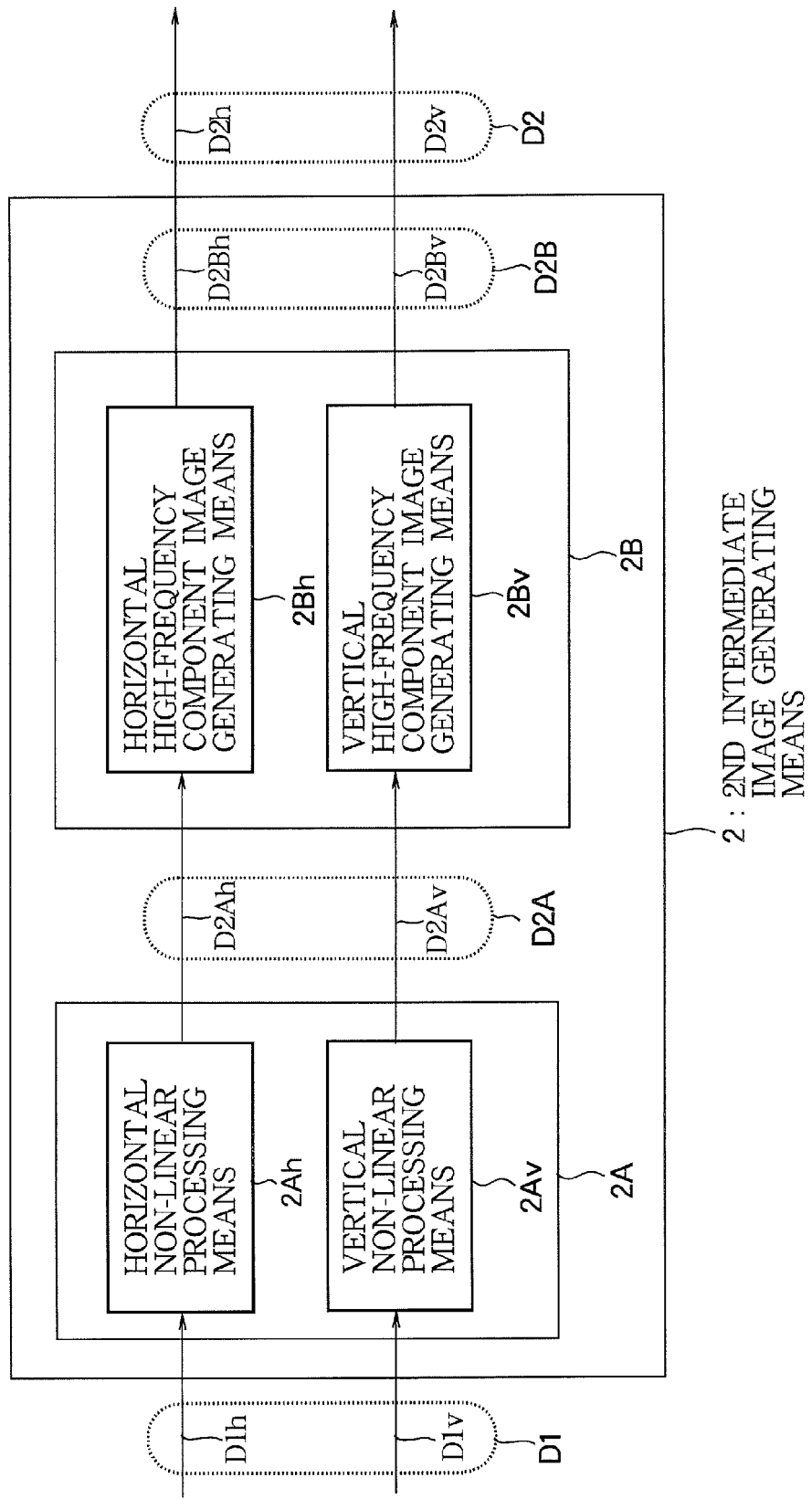
FIG. 3 is a block diagram illustrating an exemplary structure of the second intermediate image generating means 2 in FIG. 1.

FIG. 3 is a diagram illustrating an exemplary structure of the second intermediate image generating means 2; the illustrated second intermediate image generating means 2 includes a non-linear processing means 2A for outputting an image D2A obtained by performing non-linear processing, which will be described later, on intermediate image D1 and a high-frequency component image generating means 2B for outputting an image D2B obtained by extracting only the high-frequency component above a third frequency (the third predetermined frequency) from image D2A. Image D2B is output from the second intermediate image generating means 2 as intermediate image D2.

Figure 4:
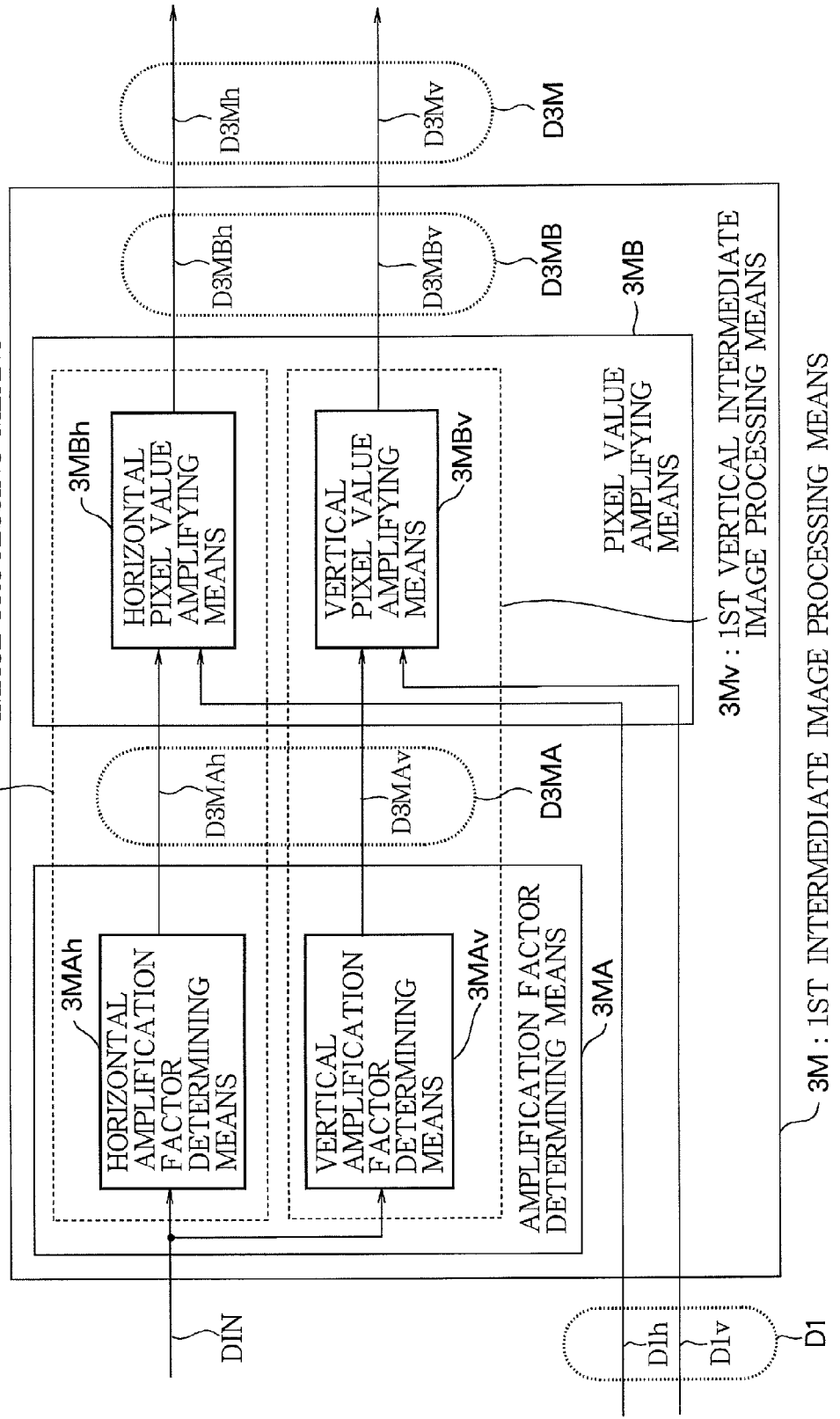
FIG. 4 is a block diagram illustrating an exemplary structure of the first intermediate image processing means 3M in FIG. 1.

FIG. 4 is a diagram illustrating an exemplary structure of the first intermediate image processing means 3M; the illustrated first intermediate image processing means 3M includes an amplification factor determining means 3MA and a pixel value amplifying means 3MB. The amplification factor determining means 3MA determines amplification factors D3MA from pixel values in the input image DIN. The pixel value amplifying means 3MB amplifies the pixel values in intermediate image D1 in accordance with the amplification factors D3MA determined by the amplification factor determining means 3MA and outputs the result as an intermediate image D3MB. Intermediate image D3MB is output from the first intermediate image processing means 3M as intermediate image D3M.

The amplification factor determining means 3MA includes a horizontal amplification factor determining means 3MAh and a vertical amplification factor determining means 3MAv, and the pixel value amplifying means 3MB includes a horizontal pixel value amplifying means 3MBh and a vertical pixel value amplifying means 3MBv. The horizontal amplification factor determining means 3MAh and the horizontal pixel value amplifying means 3MBh constitute a first horizontal intermediate image processing means 3Mh; the vertical amplification factor determining means 3MAv and the vertical pixel value amplifying means 3MBv constitute a first vertical intermediate image processing means 3Mv.

Figure 5:
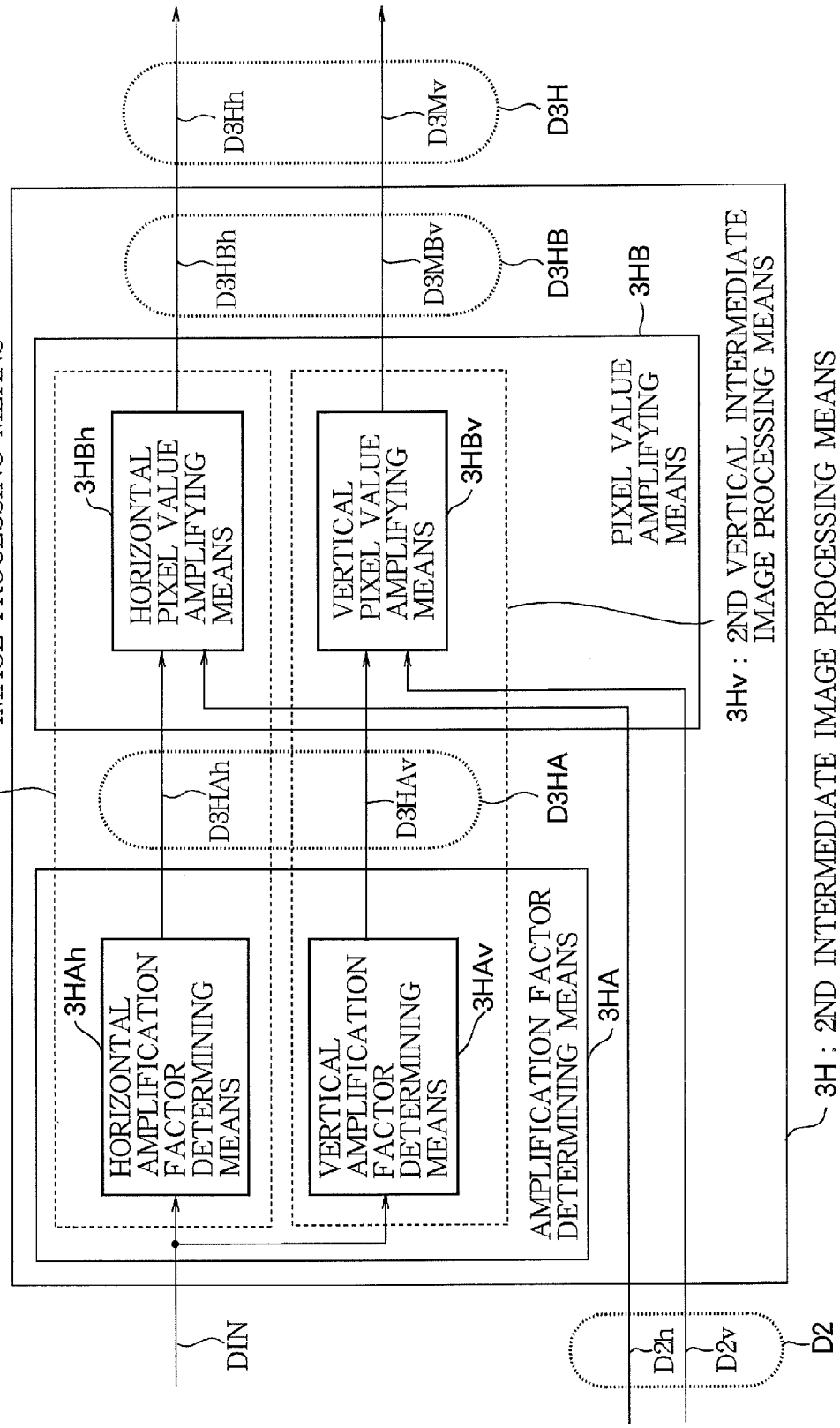
FIG. 5 is a block diagram illustrating an exemplary structure of the second intermediate image processing means 3H in FIG. 1.

FIG. 5 is a diagram illustrating an exemplary structure of the second intermediate image processing means 3H; the illustrated second intermediate image processing means 3H includes an amplification factor determining means 3HA and a pixel value amplifying means 3HB. The amplification factor determining means 3HA determines amplification factors D3HA from pixel values in the input image DIN. The pixel value amplifying means 3HB amplifies the pixel values in intermediate image D2 in accordance with the amplification factors D3HA determined by the amplification factor determining means 3HA and outputs the result as an intermediate image D3HB. Intermediate image D3HB is output from the second intermediate image processing means 3H as intermediate image D3H.

The amplification factor determining means 3HA includes a horizontal amplification factor determining means 3HAh and a vertical amplification factor determining means 3HAv, and the pixel value amplifying means 3HB includes a horizontal pixel value amplifying means 3HBh and a vertical pixel value amplifying means 3HBv. The horizontal amplification factor determining means 3HAh and the horizontal pixel value amplifying means 3HBh constitute a second horizontal intermediate image processing means 3Hh; the vertical amplification factor determining means 3HAv and the vertical pixel value amplifying means 3HBv constitute a second vertical intermediate image processing means 3Hv.

The adding means 4 generates the final output image DOUT by adding intermediate image D3M and intermediate image D3H to the input image DIN.

The operation of the image processing apparatus in the first embodiment will be described in detail below.

First the detailed operation of the first intermediate image generating means 1 will be described.

In the first intermediate image generating means 1, the high-frequency component image generating means 1A generates image D1A by extracting only the high-frequency component of the input image DIN above the first frequency. The high-frequency component can be extracted by performing high-pass filter processing. The high-frequency component of the image is extracted in the horizontal direction and vertical direction separately. The high-frequency component image generating means 1A includes a horizontal high-frequency component image generating means 1Ah for generating an image D1Ah by performing horizontal high-pass filter processing on the input image DIN to extract a horizontal high-frequency component above a first horizontal frequency only in the horizontal direction and a vertical high-frequency component image generating means 1Av for generating an image D1Av by performing vertical high-pass filter processing to extract a vertical high-frequency component above a first vertical frequency only in the vertical direction; image D1A includes image D1Ah and image D1Av.

In the first intermediate image generating means 1, the low-frequency component image generating means 1B generates an image D1B by extracting only the low-frequency component of image D1A below the second frequency. The low-frequency component can be extracted by performing low-pass filter processing. The low-frequency component is extracted in the horizontal direction and the vertical direction separately. The low-frequency component image generating means 1B includes a horizontal low-frequency component image generating means 1Bh for generating an image D1Bh by performing horizontal low-pass filter processing on image D1Ah to extract a horizontal low-frequency component below a second horizontal frequency only in the horizontal direction and a vertical low-frequency component image generating means 1Bv for generating an image D1Bv by performing vertical low-pass filter processing on image D1Av to extract a vertical low-frequency component below a second vertical frequency only in the vertical direction; image D1B includes image D1Bh and image D1Bv. Image D1B is output from the first intermediate image generating means 1 as intermediate image D1. Intermediate image D1 includes an image D1$h$ corresponding to image D1Bh and an image D1$v$ corresponding to image D1Bv.

Next the detailed operation of the second intermediate image generating means 2 will be described.

In the second intermediate image generating means 2, the non-linear processing means 2A generates image D2A by performing non-linear processing, which will be described later, on intermediate image D1. The non-linear processing is performed in the horizontal direction and vertical direction separately. The non-linear processing means 2A includes a horizontal non-linear processing means 2Ah for generating an image D2Ah by performing non-linear processing, which will be described later, on image D1$h$, and a vertical non-linear processing means 2Av for generating an image D2Av by performing non-linear processing, which will be described later, on image D1$v$; image D2A includes image D2Ah and image D2Av.

The operation of the non-linear processing means 2A will now be described in further detail. The horizontal non-linear processing means 2Ah and the vertical non-linear processing means 2Av included in the non-linear processing means 2A have the same structure. The horizontal non-linear processing means 2Ah performs processing in the horizontal direction, and the vertical non-linear processing means 2Av performs processing in the vertical direction.

Figure 6:
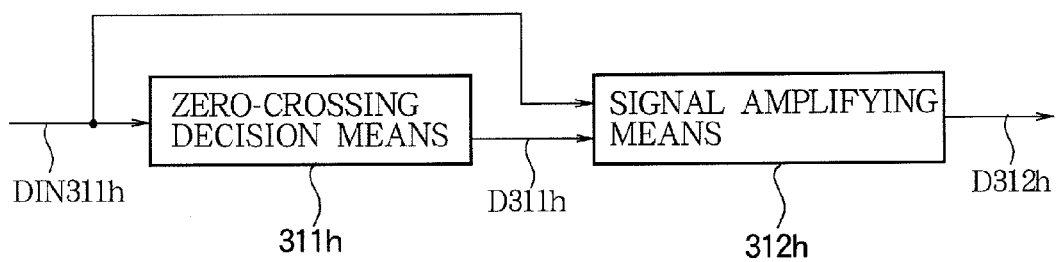
FIG. 6 is a block diagram illustrating an exemplary structure of the horizontal non-linear processing means 2Ah in FIG. 3.

FIG. 6 is a diagram illustrating an exemplary structure of the horizontal non-linear processing means 2Ah. The illustrated horizontal non-linear processing means 2Ah includes a zero-crossing decision means 311$h$ and a signal amplifying means 312$h$. The horizontal non-linear processing means 2Ah receives image D1$h$ as an input image DIN311$h$.

The zero-crossing decision means 311$h$ checks the pixel values in the input image DIN 311$h$ for changes in the horizontal direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312$h$ by a signal D311$h$. Preceding and following herein means the preceding and following positions in the sequence in which signals are supplied: the positions to the left and right when the pixel signals are supplied from left to right in the horizontal direction, or the positions above and below when the pixel signals are supplied from top to bottom in the vertical direction. The zero-crossing decision means 311$h$ in the horizontal non-linear processing means 2Ah recognizes the pixels to the left and right of the zero-crossing point as the pixels preceding and following the zero-crossing point.

The signal amplifying means 312$h$ identifies the pixels preceding and following the zero-crossing point (the adjacently preceding and following pixels) in accordance with the signal D311$h$ and generates a non-linear image D312$h$ by amplifying the pixel values (increasing the absolute values) of the pixels preceding and following the zero-crossing point. The amplification factor for the pixel values of the pixels preceding and following the zero-crossing point is a value greater than 1; the amplification factor for the pixel values of other pixels is 1.

The non-linear image D312h is output from the horizontal non-linear processing means 2Ah as image D2Ah.

Figure 7:
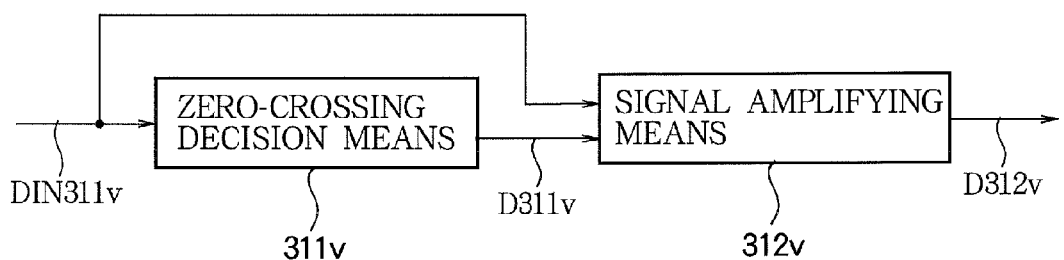
FIG. 7 is a block diagram illustrating an exemplary structure of the vertical non-linear processing means 2Av in FIG. 3.

FIG. 7 is a diagram illustrating an exemplary structure of the vertical non-linear processing means 2Av. The illustrated vertical non-linear processing means 2Av includes a zero-crossing decision means 311v and a signal amplifying means 312v. Image D1v is input to the vertical non-linear processing means 2Av as an input image DIN311v.

The zero-crossing decision means 311v checks the pixel values in the input image DIN311v for changes in the vertical direction. A point where the pixel value changes from positive to negative or from negative to positive is identified as a zero-crossing point, and the positions of the pixels preceding and following the zero-crossing point (the adjacently preceding and following pixels) are reported to the signal amplifying means 312v by a signal D311v. The zero-crossing decision means 311v in the vertical non-linear processing means 2Av recognizes the pixels above and below the zero-crossing point as the pixels preceding and following the zero-crossing point.

The signal amplifying means 312v identifies the pixels preceding and following the zero-crossing point (the adjacently preceding and following pixels) from signal D311v and generates a non-linear image D312v by amplifying only the pixel values (increasing the absolute values) of the pixels preceding and following the zero-crossing point. The amplification factor for the pixel values of the pixels preceding and following the zero-crossing point is a value greater than 1, and the amplification factor for the pixel values of other pixels is 1.

The non-linear processing means 2A operates as described above.

Next, in the second intermediate image generating means 2, the high-frequency component image generating means 2B generates image D2B by extracting only the high-frequency component of image D2A above the third frequency. The high-frequency component can be extracted by performing high-pass filter processing. The high-frequency component of the image is extracted in the horizontal direction and the vertical direction separately. The high-frequency component image generating means 2B includes a horizontal high-frequency component image generating means 2Bh for generating an image D2Bh by performing horizontal high-pass filter processing on image D2Ah to extract a horizontal high-frequency component above a third horizontal frequency only in the horizontal direction and a vertical high-frequency component image generating means 2Bv for generating an image D2Bv by performing vertical high-pass filter processing on image D2Av to extract a vertical high-frequency component above a third vertical frequency only in the vertical direction; image D2B includes image D2Bh and image D2Bv. Image D2B is output from the second intermediate image generating means 2 as intermediate image D2. Intermediate image D2 includes an image D2h corresponding to image D2Bh and an image D2v corresponding to image D2Bv.

Next the detailed operation of the first intermediate image processing means 3M will be described.

In the first intermediate image processing means 3M, the amplification factor determining means 3MA determines amplification factors D3MA in accordance with the pixel values in the input image DIN. The pixel values in the first intermediate image D1 are amplified in accordance with amplification factors D3MA as described above. Since the first intermediate image D1 includes image D1h and image D1v, amplification factors D3MAh for image D1h and amplification factors D3MAv for image D1v are determined as amplification factors D3MA. The amplification factor determining means 3MA includes a horizontal amplification factor determining means 3MAh and a vertical amplification factor determining means 3MAv. The horizontal amplification factor determining means 3MAh determines amplification factors D3MAh from the pixel values in the input image DIN; the vertical amplification factor determining means 3MAv determines amplification factors D3MAv from the pixel values in the input image DIN; amplification factors D3MAh and amplification factors D3MAv are output from the amplification factor determining means 3MA as amplification factors D3MA.

The operation of the horizontal amplification factor determining means 3MAh and the vertical amplification factor determining means 3MAv will now be described in further detail.

Figure 8C:
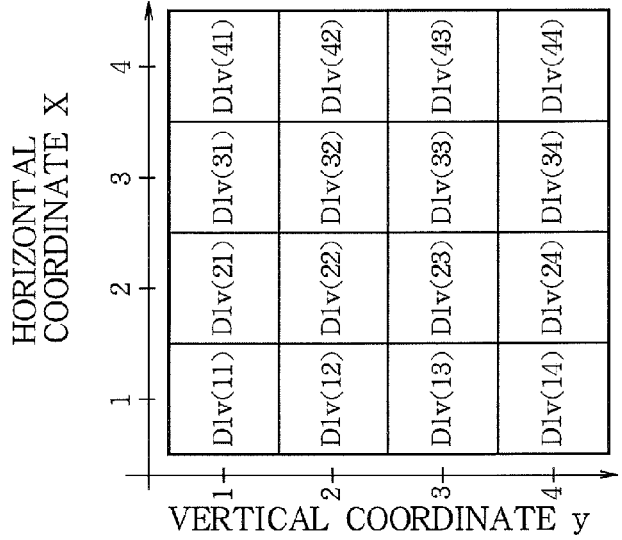
FIGS. 8(A) to 8(C) are diagrams showing the arrangement of pixels in the input image DIN, image D1h, and image D1v.
Figure 8B:
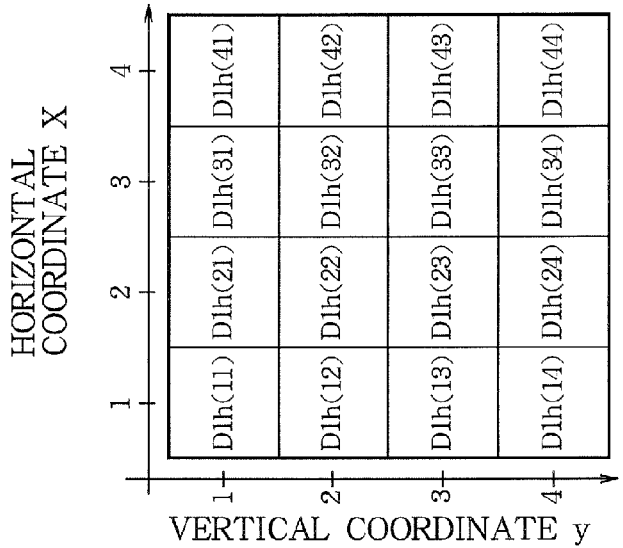
Figure 8A:
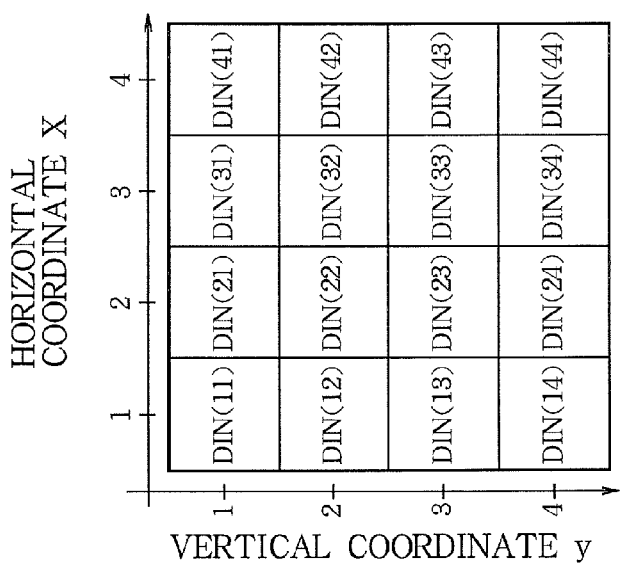

FIGS. 8(A) to 8(C) are diagrams representing the input image DIN, image D1h, and image D1v. FIG. 8(A) represents the input image DIN; FIG. 8(B) represents image D1h; FIG. 8(C) represents image D1v. The horizontal and vertical axes shown in FIGS. 8(A) to 8(C) correspond to the horizontal and vertical directions in the image and indicate coordinate values. The pixel value of the pixel in the input image DIN in a position indicated by x on the horizontal axis and y on the vertical axis is denoted DIN(xy). In image D1h, the pixel value of the pixel in the position indicated by x on the horizontal axis and y on the vertical axis is denoted D1h(xy). In image D1v, the pixel value of the pixel in the position indicated by x on the horizontal axis and y on the vertical axis is denoted D1v(xy).

The horizontal amplification factor determining means 3MAh determines an amplification factor for each pixel in image D1h on the basis of the pixel value in the corresponding position in the input image DIN. The amplification factor is determined from the value of the pixel with the same coordinates in the input image DIN; the amplification factor for pixel value D1h(11) is determined from pixel value DIN(11), the amplification factor for the pixel value D1h(12) is determined from pixel value DIN(12), and in general, the amplification factor for pixel value D1h(xy) is determined from pixel value DIN(xy); the results are output as amplification factor D3MAh.

The vertical amplification factor determining means 3MAv determines an amplification factor for each pixel in image D1v from the pixel value in the corresponding position in the input image DIN. The amplification factor is determined from the value of the pixel with the same coordinates in the input image DIN; the amplification factor for pixel value D1v(11) is determined from pixel value DIN(11), the amplification factor for pixel value D1v(12) is determined from pixel value DIN(12), and in general, the amplification factor for pixel value D1v(xy) is determined from pixel value DIN(xy); the results are output as amplification factor D3MAv.

The pixel value amplifying means 3MB amplifies the pixel values in the first intermediate image D1 in accordance with amplification factors D3MA. Since the first intermediate image D1 includes image D1h and image D1v, the pixel value amplifying means 3MB includes a horizontal pixel value amplifying means 3MBh for amplifying the pixel values in image D1h and a vertical pixel value amplifying means 3MBv for amplifying the pixel values in image D1v.

The horizontal pixel value amplifying means 3MBh outputs an image D3MBh obtained by amplifying the pixel values in image D1h in accordance with amplification factors D3MAh, and the vertical pixel value amplifying means 3MBv outputs an image D3MBv obtained by amplifying the pixel values in image D1v in accordance with amplification factors D3MAv. Image D3MBh and image D3MBv are output from the pixel value amplifying means 3MB as image D3MB.

Image D3MB is output from the first intermediate image processing means 3M as intermediate image D3M. Intermediate image D3M includes an image D3Mh corresponding to image D3MBh and an image D3Mv corresponding to image D3MBv.

The first intermediate image processing means 3M operates as described above.

Next the operation of the second intermediate image processing means 3H will be described. A comparison of FIGS. 4 and 5 indicates that the second intermediate image processing means has the same structure as the first intermediate image processing means except that the input signals are the input image DIN and intermediate image D2, and the intermediate image D3H output by the second intermediate image processing means 3H is obtained by performing, on intermediate image D2, the same processing as performed on intermediate image D1 by the first intermediate image processing means 3M. Since the details of the operation of the second intermediate image processing means 3H are clear from the detailed description of the operation of the first intermediate image processing means 3M given above, a description of the detailed operation of the second intermediate image processing means 3H will be omitted.

First the operation of the adding means 4 will be described. The adding means 4 generates an output image DOUT by adding the input image DIN, intermediate image D3M, and intermediate image D3H together. The output image DOUT of the adding means 4 is output from the image processing apparatus as the final output image.

Intermediate image D3M includes image D3Mh and image D3Mv, and intermediate image D3H includes image D3Hh and image D3Hv, so to add the input image DIN, intermediate image D3M, and intermediate image D3H together means to add images D3Mh, D3Mv, D3Hh, and D3Hv to the input image DIN.

The addition in the adding means 4 is not limited to simple addition; weighted addition may be performed. That is, images D3Mh, D3Mv, D3Hh, and D3Hv may be amplified by different amplification factors before being added to the input image DIN.

An example in which the image processing apparatus in this embodiment is utilized as part of an image display apparatus will be described below. The description will clarify the effects of the image processing apparatus in this embodiment. Unless otherwise specified, Fn will denote the Nyquist frequency of the input image DIN.

Figure 9:
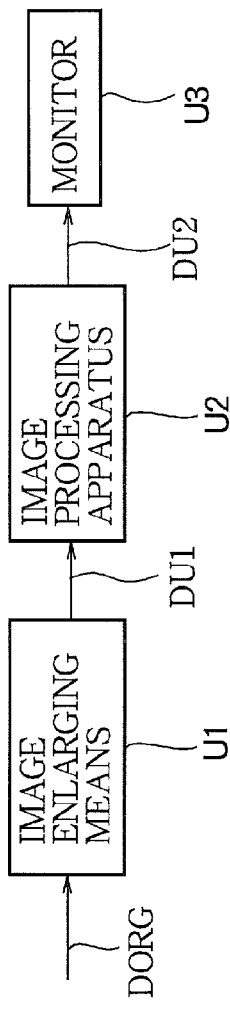
FIG. 9 is a block diagram illustrating an exemplary structure of an image display apparatus utilizing the image processing apparatus according to the first embodiment.

FIG. 9 illustrates an image display apparatus utilizing the image processing apparatus according to the first embodiment. In the illustrated image display apparatus, an image corresponding to the original image DORG is displayed on a monitor U3.

If the image size of the original image DORG is smaller than the image size of the monitor U3, the image enlarging means U1 outputs an image DU1 obtained by enlarging the original image DORG. The image can be enlarged by the bicubic method, for example.

The image processing apparatus U2 in the first embodiment outputs an image DU2 obtained by performing the processing described above on image DU1. Image DU2 is displayed on the monitor U3.

First the operation and effects of the image enlarging means U1 will be described on the assumption that the number of pixels in the original image DORG is half of the number of pixels in the monitor U3 in both the horizontal and vertical directions.

Figure 10:
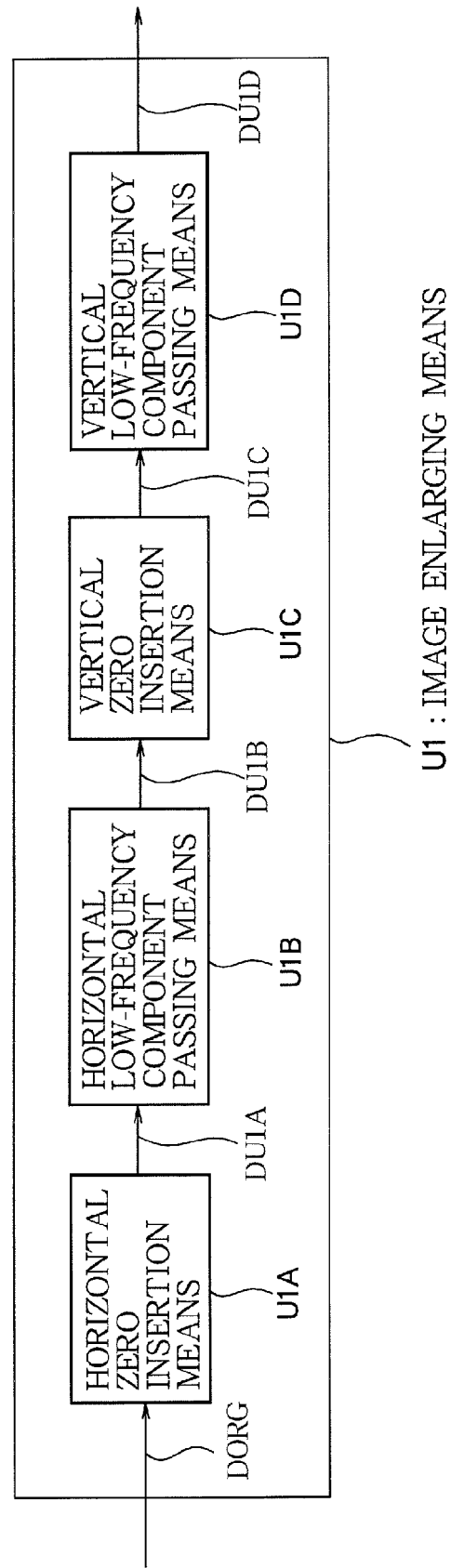
FIG. 10 is a block diagram illustrating an exemplary structure of the image enlarging means in FIG. 9.

FIG. 10 is a diagram illustrating the structure and operation of the image enlarging means U1. The image enlarging means U1 includes a horizontal zero insertion means U1A, a horizontal low-frequency component passing means U1B, a vertical zero insertion means U1C, and a vertical low-frequency component passing means U1D.

The horizontal zero insertion means U1A generates an image DU1A by appropriately inserting pixels having a pixel value of 0 into the original image DORG in the horizontal direction (inserting a column of pixels having pixel values of 0 between each horizontally adjacent pair of pixel columns in the original image DORG).

The horizontal low-frequency component passing means U1B generates an image DU1B by performing low-pass filter processing to extract only a low-frequency component from image DU1A.

The vertical zero insertion means U1C generates an image DU1C by appropriately inserting pixels having a pixel value of 0 into image DU1B in the vertical direction (inserting a row of pixels having pixel values of 0 between each vertically adjacent pair of pixel rows in image DU1B).

The vertical low-frequency component passing means U1D generates an image DU1D by extracting only a low-frequency component from image DU1C.

Image DU1D, which is output from the image enlarging means U1 as image DU1, is an enlargement of the original image DORG by a factor of two in both the horizontal direction and the vertical direction.

FIGS. 11(A) to 11(E) are diagrams illustrating the operation of the image enlarging means U1 in detail: FIG. 11(A) shows the original image DORG; FIG. 11(B) shows image DU1A; FIG. 11(C) shows image DU1B; FIG. 11(D) shows image DU1C; FIG. 11(E) shows image DU1D. In FIGS. 11(A) to 11(E), each box represents a pixel, and the characters or numbers in the box represent the pixel value of the corresponding pixel.

The horizontal zero insertion means U1A generates the image DU1A shown in FIG. 11(B) by inserting a pixel having a pixel value of 0 for each pixel in the original image DORG in the horizontal direction as shown in FIG. 11(A) (inserting a column of pixels having pixel values of 0 between each horizontally adjacent pair of pixel columns in the original image DORG). The horizontal low-frequency component passing means U1B generates the image DU1B shown in FIG. 11(C) by performing low-pass filter processing on the image DU1A shown in FIG. 11(B).

The vertical zero insertion means U1C generates the image DU1C shown in FIG. 11(D) by inserting a pixel having a pixel value of 0 for each pixel in image DU1B in the vertical direction as shown in FIG. 11(C) (inserting a row of pixels having pixel values of 0 between each vertically adjacent pair of pixel rows in image DU1B). The vertical low-frequency component passing means U1D generates the image DU1D shown in FIG. 11(E) by performing low-pass filter processing on the image DU1C shown in FIG. 11(D). The image DU1D generated by this processing is twice as large as the original image DORG in both the horizontal and vertical directions.

Figure 12A:
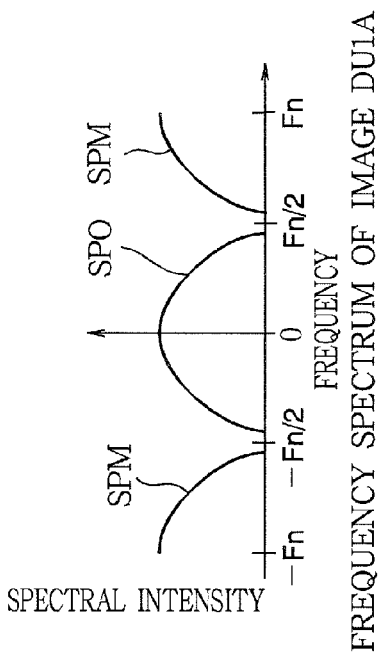
FIGS. 12(A) to 12(D) are diagrams showing frequency spectra and a frequency response to illustrate the operation of the image enlarging means in FIG. 10.
Figure 12B:
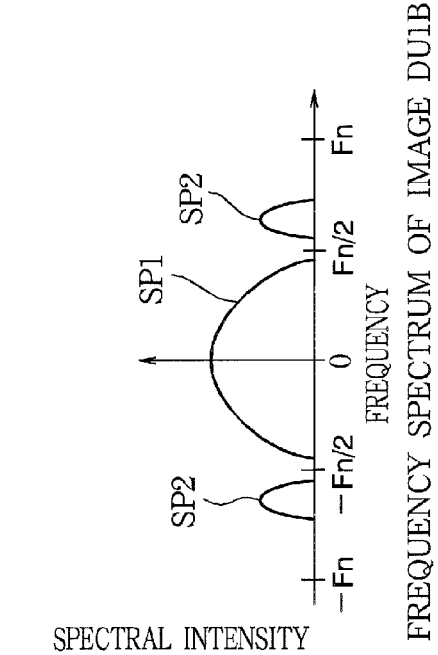
Figure 12C:
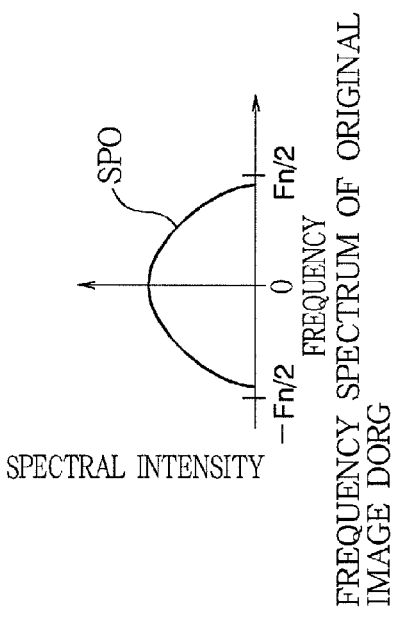
Figure 12D:
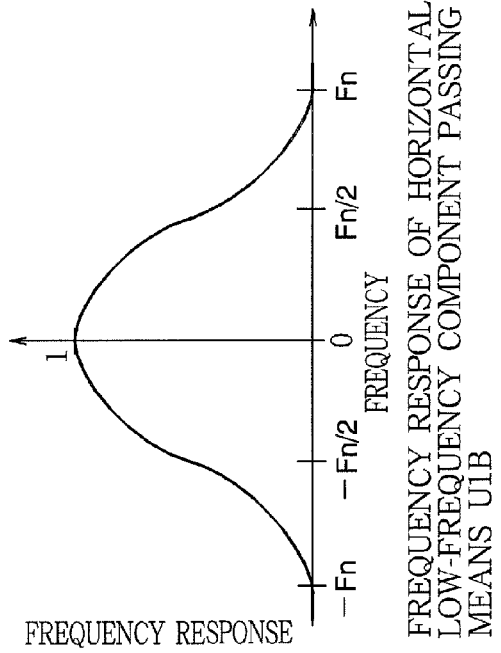

FIGS. 12(A) to 12(D) represent the effect of processing by the image enlarging means U1 in the frequency domain: FIG. 12(A) represents the frequency spectrum of the original image DORG; FIG. 12(B) represents the frequency spectrum of image DU1A; FIG. 12(C) represents the frequency response of the horizontal low-frequency component passing means U1B; FIG. 12(D) represents the frequency spectrum of image DU1B. In FIGS. 12(A) to 12(D), the horizontal axis is a frequency axis representing spatial frequency in the horizontal direction, and the vertical axis represents the intensity value of the frequency spectrum or frequency response.

The number of pixels in the original image DORG is half the number of pixels in the input image DIN; in other words, the sampling interval of the original image DORG is twice the sampling interval of the input image DIN. Consequently, the Nyquist frequency of the original image DORG is half the Nyquist frequency of the input image DIN, i.e., Fn/2.

For the sake of simplicity, a single frequency axis is used in FIGS. 12(A) to 12(D). Image data in general, however, assign pixel values to pixels arranged in a two-dimensional array, and their frequency spectra are described in a plane determined by a horizontal frequency axis and a vertical frequency axis. Accordingly, both the horizontal frequency axis and the vertical frequency axis should be indicated to represent the frequency spectra of images such as DORG accurately. Since frequency spectra are generally isotropic about the origin of the frequency axes, if a frequency spectrum is given in a space with a single frequency axis, those skilled in the art can easily imagine how the frequency spectrum appears in a space with two frequency axes. Therefore, unless otherwise specified, spaces with a single frequency axis will be used in the descriptions related to the frequency domain.

First the frequency spectrum of the original image DORG will be described. The image input as the original image DORG is generally a natural image, in which case its spectral intensity is concentrated around the origin of the frequency space. The frequency spectrum of the original image DORG accordingly resembles spectrum SPO in FIG. 12(A).

Next the spectral intensity of image DU1A will be described. Image DU1A is generated by inserting a pixel having a pixel value of 0 for each pixel in the original image DORG in the horizontal direction. This processing causes the frequency spectrum to fold over at the Nyquist frequency of the original image DORG. Because a spectrum SPM is generated by fold-over of the spectrum SPO at frequencies of ±Fn/2, the frequency spectrum of image DU1A is represented as shown in FIG. 12(B).

Next the frequency response of the horizontal low-frequency component passing means U1B will be described. The horizontal low-frequency component passing means U1B is implemented by a low-pass filter, and its frequency response decreases as the frequency increases, as shown in FIG. 12(C).

Next the frequency spectrum of image DU1B will be described. The image DU1B shown in FIG. 12(D) is obtained by performing low-pass filter processing, with the frequency response shown in FIG. 12(C), on the image DU1A having the frequency spectrum shown in FIG. 12(B). As shown, the frequency spectrum of image DU1B includes a spectrum SP2 having a somewhat lower intensity than spectrum SPM and a spectrum SP1 having a somewhat lower intensity than spectrum SPO. The frequency response of a low-pass filter generally decreases as the frequency increases. In comparison with spectrum SPO, spectrum SP1 has an intensity lowered by the horizontal low-frequency component passing means U1B on the high-frequency side, at frequencies near ±Fn/2.

Among the processing by the image enlarging means U1, the effects in the frequency domain of the processing performed by the vertical zero insertion means U1C and the vertical low-frequency component passing means U1D will not be described, but from the content of the processing it can be easily understood that the effects are the same as described with reference to FIGS. 12(A) to 12(D), though in the direction of the vertical spatial frequency axis. The frequency spectrum of image DU1D becomes a two-dimensional expansion of the frequency spectrum shown in FIG. 12(D).

In the subsequent description, spectrum SP2 will be referred to as the fold-over component. The fold-over component appears on an image as a spurious signal or noise having relatively high-frequency components. This type of noise or spurious signal includes overshoot, jaggies, ringing, and the like.

The effects of the image processing apparatus according to the first embodiment will be described below.

Figure 13C:
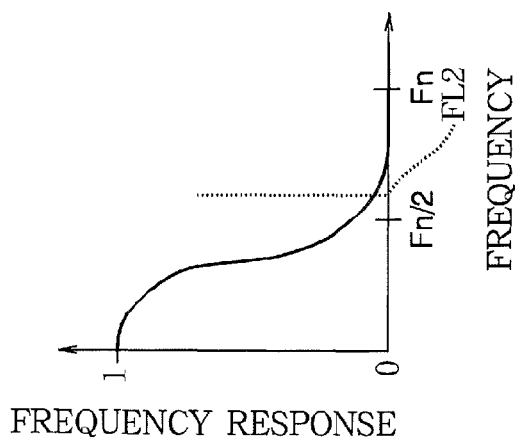
FIGS. 13(A) to 13(E) are diagrams showing frequency spectra and frequency responses to illustrate the operation of the first intermediate image generating means 1 in FIG. 1.
Figure 13B:
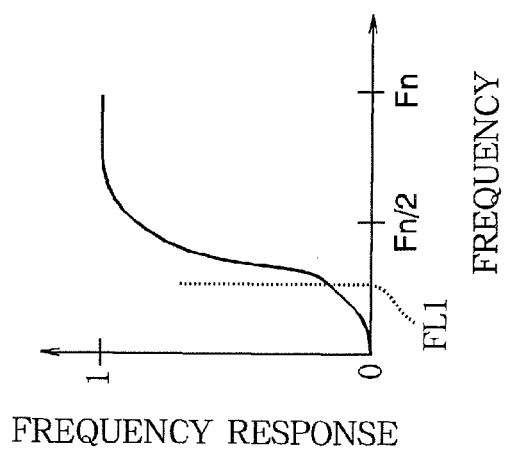
Figure 13A:
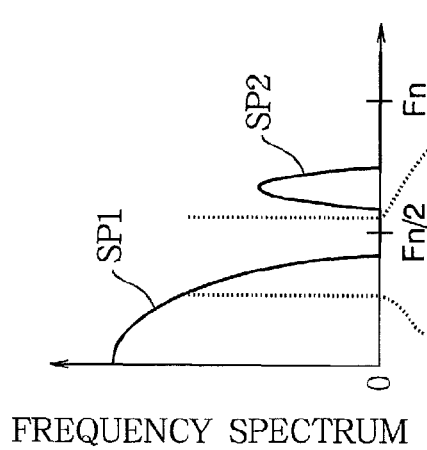
Figure 13D:
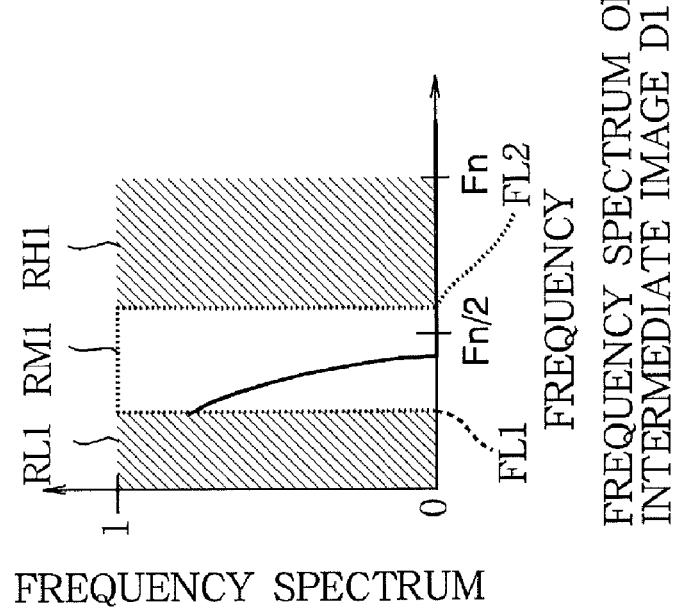
Figure 13E:
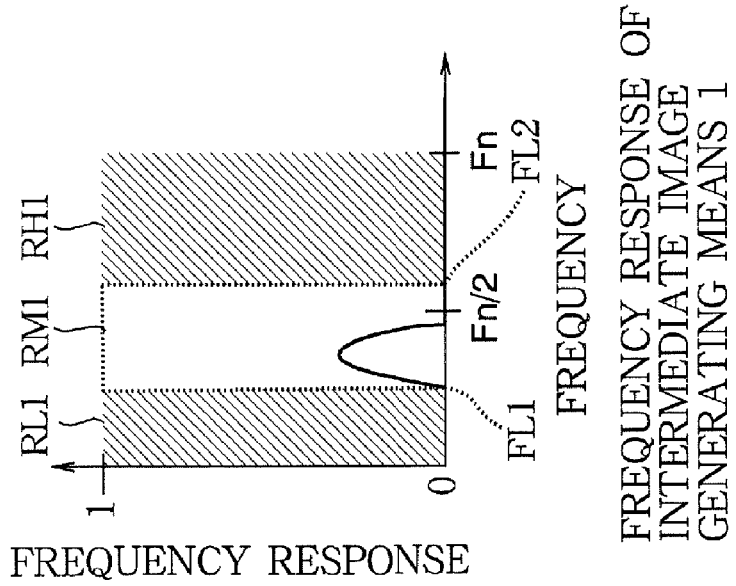

FIGS. 13(A) to 13(E) are diagrams schematically representing the effect of generating intermediate image D1 from the input image DIN when an image DU1D obtained by enlarging the original image DORG is input as the input image DIN (or image DU1): FIG. 13(A) represents the frequency spectrum of the input image DIN; FIG. 13(B) represents the frequency response of the high-frequency component image generating means 1A; FIG. 13(C) represents the frequency response of the low-frequency component image generating means 1B; FIG. 13(D) represents the frequency response of the first intermediate image generating means 1; FIG. 13(E) represents the frequency spectrum of intermediate image D1. FIGS. 13(A) to 13(E) use just a single frequency axis for the same reason as in FIGS. 12(A) to 12(D).

In FIGS. 13(A) to 13(E), the intensity value of the frequency spectrum or frequency response is shown only in the range where the spatial frequency is zero or greater, but the frequency spectrum or frequency response described below is symmetrical about the origin on the frequency axis. Therefore, the diagrams used in the description, showing only the range in which the spatial frequency is zero or greater, are sufficient.

First the frequency spectrum of the input image DIN will be described. Because an image DU1D generated by enlargement processing in the image enlarging means U1 is input as the input image DIN, the frequency spectrum of the input image DIN, shown in FIG. 13(A), has the same shape as shown in FIG. 12(D), including a spectrum SP1 which has a lower intensity than the spectrum SPO of the original image DORG and a spectrum SP2, which is a fold-over component.

Next the frequency response of the high-frequency component image generating means 1A will be described. Since the high-frequency component image generating means 1A is implemented by a high-pass filter, its frequency response decreases as the frequency decreases, as shown in FIG. 13(B).

Next the frequency response of the low-frequency component image generating means 1B will be described. Since the low-frequency component image generating means 1B is implemented by a low-pass filter, its frequency response decreases as the frequency increases, as shown in FIG. 13(C).

Next the frequency response of the first intermediate image generating means 1 will be described. Among the frequency components of the input image DIN, the frequency components in the low-frequency region RL1 (the frequency band lower than the first frequency FL1) shown in FIG. 13(D) are weakened by the high-frequency component image generating means 1A in the first intermediate image generating means 1. The frequency components in the high-frequency region RH1 (the frequency band higher than the second frequency FL2) shown in FIG. 13(D) are weakened by the low-frequency component image generating means 1B in the first intermediate image generating means 1. Therefore, as shown in FIG. 13(D), the frequency response of the first intermediate image generating means 1 has a peak in an intermediate region (frequency band) RM1 limited by the low-frequency region RL1 and the high-frequency region RH1.

Next the frequency spectrum of intermediate image D1 will be described. The intermediate image D1 shown in FIG. 13(E) is obtained by passing the input image DIN having the frequency spectrum shown in FIG. 13(A) through the first intermediate image generating means 1 having the frequency response shown in FIG. 13(D). Since the frequency response of the first intermediate image generating means 1 peaks in the intermediate region RM1 limited by the low-frequency region RL1 and the high-frequency region RH1, the frequency spectrum of intermediate image D1 is the frequency spectrum of the input image DIN with attenuation of the parts included in the low-frequency region RL1 and high-frequency region RH1. Therefore, spectrum SP2, which would become a fold-over component, is removed from the high-frequency component of input image DIN in intermediate image D1. In other words, the first intermediate image generating means 1 has the effect of generating intermediate image D1 by removing spectrum SP1, which becomes a fold-over component, from the high-frequency component of the input image DIN.

Figure 14C:
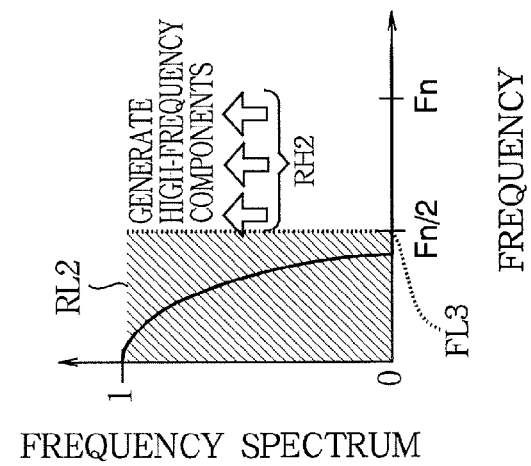
FIGS. 14(A) to 14(C) are diagrams showing frequency spectra and a frequency response to illustrate the operation of the second intermediate image generating means 2 in FIG. 1.
Figure 14B:
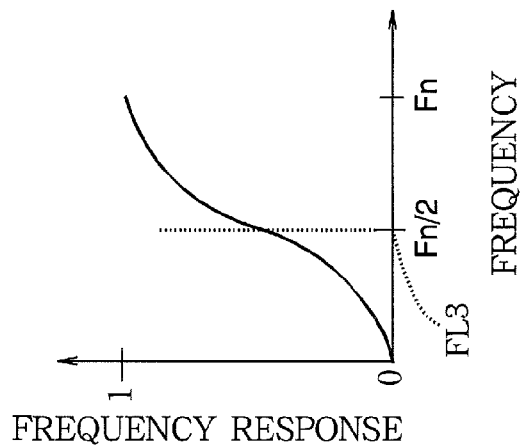
Figure 14A:
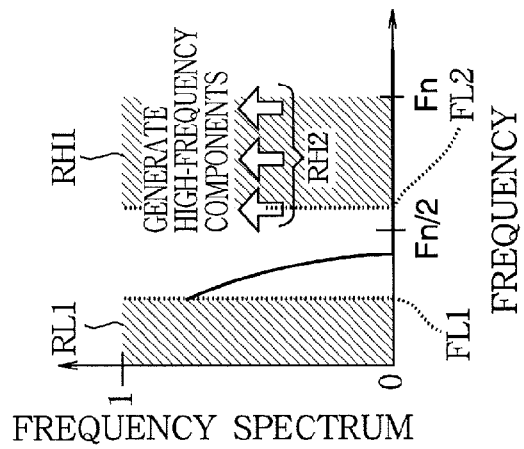

FIGS. 14(A) to 14(C) are diagrams representing the effect of the second intermediate image generating means 2: FIG. 14(A) represents the frequency spectrum of the non-linearly processed image D2A; FIG. 14(B) represents the frequency response of the high-frequency component image generating means 2B; FIG. 14(C) represents the frequency spectrum of image D2B. FIGS. 14(A) to 14(C) represents the frequency spectra and frequency response in regions where the spatial frequency is 0 or greater, for the same reason as FIGS. 13(A) to 13(E).

A high-frequency component corresponding to the high-frequency region RH2 is generated in non-linearly processed image D2A, as described later. FIG. 14(A) expresses this schematically. The image D2B shown in FIG. 14(C) is generated by passing the non-linearly processed image D2A through the high-frequency component image generating means 2B. The high-frequency component image generating means 2B includes a high-pass filter that passes components higher than the third frequency FL3, and its frequency response increases as the frequency increases as shown in FIG. 14(B). Accordingly, the frequency spectrum of image D2B is obtained by removing a component corresponding to the low-frequency region RL2 (the frequency component lower than the third frequency FL3) from the frequency spectrum of the non-linearly processed image D2A, as shown in FIG. 14(C). In other words, the non-linear processing means 2A has the effect of generating a high-frequency component corresponding to the high-frequency region RH2, and the high-frequency component image generating means 2B has the effect of extracting only the high-frequency component generated by the non-linear processing means 2A. In the illustrated example, the third frequency FL3 is substantially equal to Fn/2.

The effects will now be described in further detail.

FIGS. 15(A) to 15(C) and FIGS. 16(A) to 16(C) are diagrams illustrating signals obtained when a step edge is sampled.

Figure 15A:
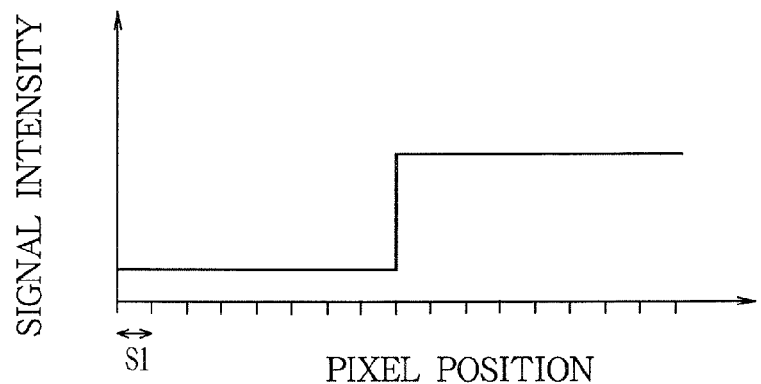
FIGS. 15(A) to 15(C) are diagrams illustrating a step edge and indicating values of consecutive pixel signals obtained when the step edge is sampled at a sampling interval S1.
Figure 15B:
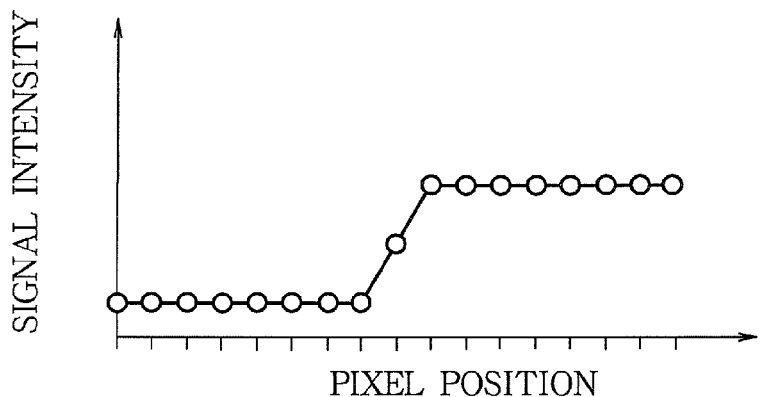
Figure 15C:
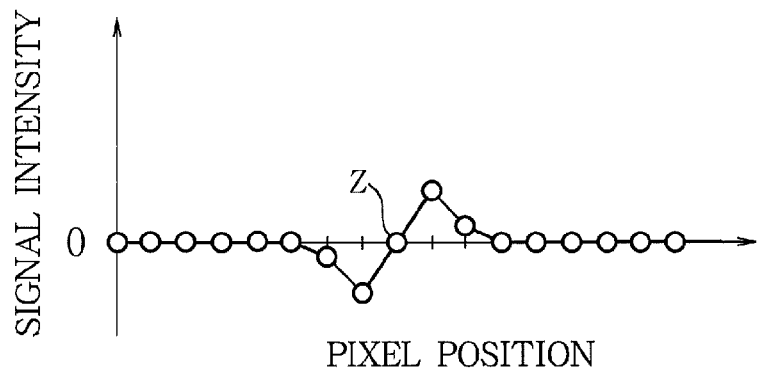
Figure 16A:
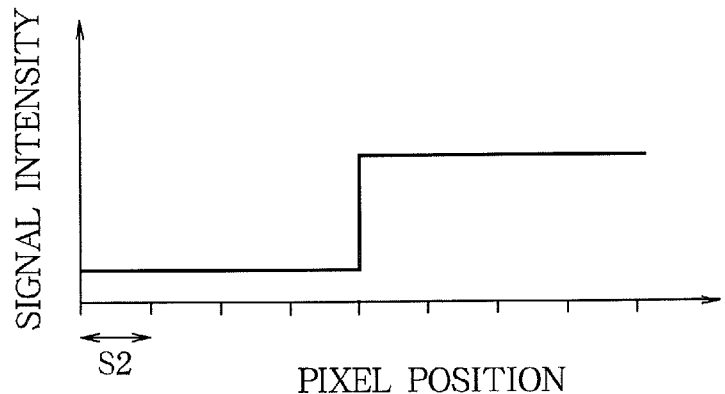
FIGS. 16(A) to 16(C) are diagrams illustrating a step edge and indicating values of consecutive pixel signals obtained when the step edge is sampled at a sampling interval S2.
Figure 16B:
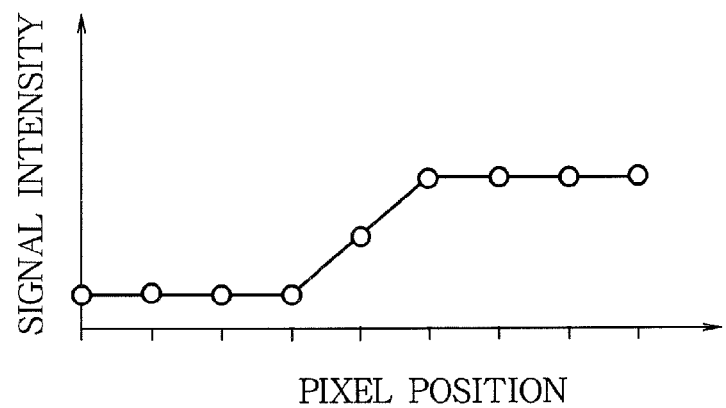
Figure 16C:
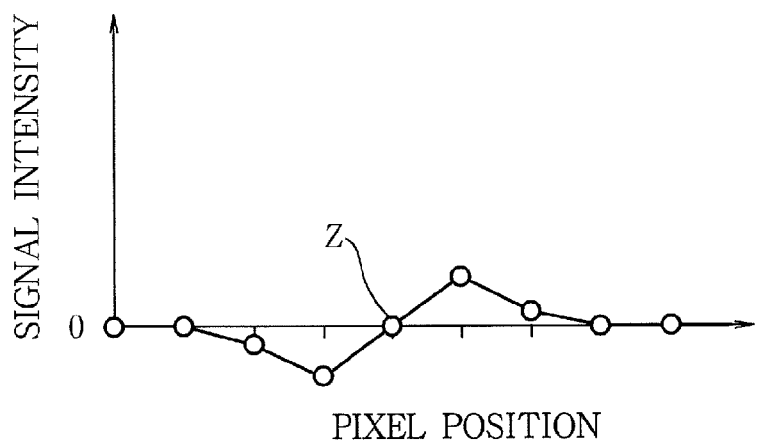

FIG. 15(A) shows a step edge and a sampling interval S1; FIG. 15(B) shows the signal obtained when the step edge is sampled at sampling interval S1; FIG. 15(C) shows the high-frequency component of the signal shown in FIG. 15(B). FIG. 16(A) shows a step edge and a sampling interval S2, which is longer than sampling interval S1; FIG. 16(B) shows the signal obtained when the step edge is sampled at sampling interval S2; FIG. 16(C) shows the high-frequency component of the signal shown in FIG. 16(B). In the description below, the length of sampling interval S2 is twice the length of sampling interval S1.

As shown in FIGS. 15(C) and 16(C), the center of the step edge appears as a zero-crossing point Z in the signal representing the high-frequency component. The slope of the signal representing the high-frequency component near the zero-crossing point Z increases as the length of the sampling interval decreases, and the positions of the points that give the local maximum and local minimum values near the zero-crossing point Z approach the zero-crossing point Z as the length of the sampling interval decreases.

A change in sampling interval does not change the position of the zero-crossing point in the signal representing the high-frequency component near the edge, but as the sampling interval decreases (or the resolution increases), the slope of the high-frequency component near the edge increases, and the position of the points that give the local maximum and minimum values approach the zero-crossing point.

FIGS. 17(A) to 17(F) are diagrams illustrating effects when the signal obtained by sampling the step edge at sampling interval S2 is enlarged to twice its size and then input to the image processing apparatus in the first embodiment, and more specifically the effects of the first intermediate image generating means 1 and second intermediate image generating means 2. As described earlier, the processing in the first intermediate image generating means 1 and second intermediate image generating means 2 is performed in the horizontal direction and the vertical direction separately, and the processing is carried out one-dimensionally. Accordingly, in FIGS. 17(A) to 17(F), the content of the processing is represented by using a one-dimensional signal.

Figure 17A:
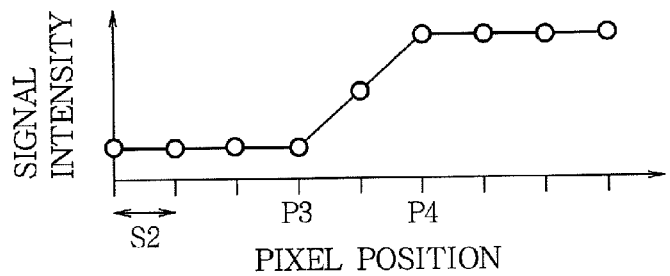
FIGS. 17(A) to 17(F) are diagrams indicating values of consecutive pixel signals to illustrate the operation of the first intermediate image generating means 1 and second intermediate image generating means 2 in FIG. 1.
Figure 17B:
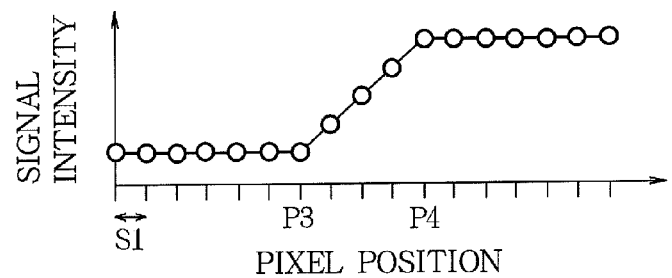

Like FIG. 16(B), FIG. 17(A) shows the signal obtained when the step edge is sampled at sampling interval S2. FIG. 17(B) shows a signal obtained by enlarging the signal shown in FIG. 17(A) to twice its size. That is, if the original image DORG contains an edge as shown in FIG. 17(A), a signal as shown in FIG. 17(B) is input as the input image DIN. When the signal is enlarged to twice its size, the sampling interval becomes half of what it was before the enlargement. The sampling interval of the signal shown in FIG. 17(B) is therefore the same as sampling interval S1 in FIGS. 14(A) to 14(C). In FIG. 17(A), the position denoted by coordinate P3 is on the boundary of the low luminance region (low level side) of the edge signal, and the position denoted by coordinate P4 is on the boundary of the high luminance region (high level side) of the edge signal.

Figure 17C:
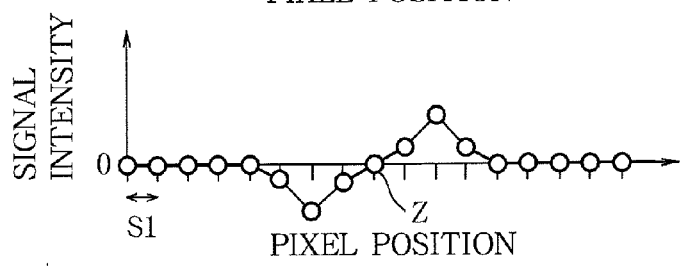

FIG. 17(C) shows a signal representing the high-frequency component of the signal shown in FIG. 17(B), that is, a signal corresponding to the image D1A output from the high-frequency component image generating means 1A. Since image D1A is obtained by extracting the high-frequency component in the input image DIN, it includes a fold-over component.

Figure 17D:
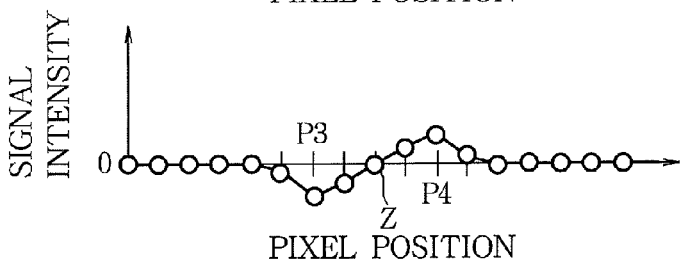

FIG. 17(D) shows a signal representing the low-frequency component of the signal shown in FIG. 17(C), that is, a signal corresponding to the image D1B output from the low-frequency component image generating means 1B. Since, as described earlier, image D1B is output as intermediate image D1, FIG. 17(D) also corresponds to intermediate image D1. In the vicinity of the zero-crossing point Z in intermediate image D1, a local minimum value appears at coordinate P3, and a local maximum value appears at coordinate P4, as shown in FIG. 17(D), matching the form of the high-frequency component extracted from the signal obtained by sampling the step edge at sampling interval S2 as shown in FIG. 16(C). The fold-over component is removed from image D1A by the low-pass filtering process performed by the low-frequency component image generating means 1B.

Figure 17E:
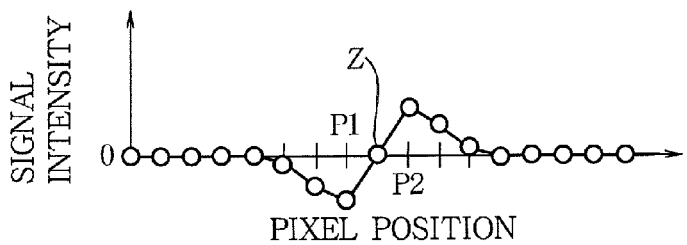

FIG. 17(E) shows the signal output when the signal shown in FIG. 17(D) is input to the non-linear processing means 2A, that is, it illustrates the image D2A output from the non-linear processing means 2A when intermediate image D1 is input. In the non-linear processing means 2A, the signal values at the coordinates P1 and P2 preceding and following (adjacently preceding and following) the zero-crossing point are amplified. Therefore, the magnitudes of the signal values at coordinates P1 and P2 in image D2A become greater than the other values, as shown in FIG. 17(E); the position where the local minimum value appears near the zero-crossing point Z changes from coordinate P3 to coordinate P1, which is closer to the zero-crossing point Z; and the position where the local maximum value appears changes from coordinate P4 to coordinate P2, which is closer to the zero-crossing point Z. This means that the high-frequency component is generated by a non-linear process that amplifies the values of the pixels preceding and following the zero-crossing point Z in the non-linear processing means 2A. A high-frequency component can be generated in this way by changing the amplification factor appropriately for each pixel or by changing the content of the processing appropriately for each pixel. The non-linear processing means 2A has the effect of generating a high-frequency component, which is not included in intermediate image D1, that is, a high-frequency component corresponding to the high-frequency region RH2 shown in FIG. 14(A).

Figure 17F:
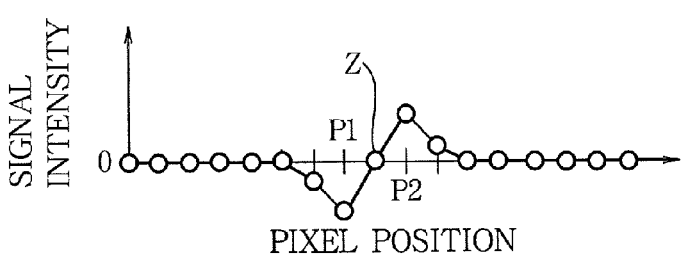

FIG. 17(F) shows a signal representing the high-frequency component of the signal shown in FIG. 17(E), that is, a signal corresponding to the image D2B output from the high-frequency component image generating means 2B. In the vicinity of the zero-crossing point Z in image D2B, the local minimum value (negative peak) appears at coordinate P1 and the local maximum value (positive peak) appears at coordinate P2, as shown in FIG. 17(F), matching the form of the high-frequency component extracted from the signal obtained by sampling the step edge at sampling interval S1, shown in FIG. 15(C). This means that the high-frequency component generated in the non-linear processing means 2A is extracted by the high-frequency component image generating means 2B and output as image D2B.

It could also be said that the extracted image D2B is a signal including a frequency component corresponding to the sampling interval 51. In other words, the high-frequency component image generating means 2B has the effect of extracting only the high-frequency component generated by the non-linear processing means 2A.

The above-described effects of the second intermediate image generating means 2 can be summarized as follows: the non-linear processing means 2A in the second intermediate image generating means 2 has the effect of generating the high-frequency component corresponding to the high-frequency region RH2; the high-frequency component image generating means 2B in the second intermediate image generating means 2 has the effect of extracting only the high-frequency component generated by the non-linear processing means 2A. Since image D2B is output as intermediate image D2, the second intermediate image generating means 2 can output an intermediate image D2 having a high-frequency component corresponding to sampling interval S1.

Image enhancement processing could be carried out at this point by adding intermediate image D1 and intermediate image D2 to the input image DIN.

Although the first embodiment does not add the first intermediate image D1 and second intermediate image D2 to the input image DIN, the effects obtained by adding the first and second intermediate images will be described below; then the effects of adding the third intermediate image D3M and fourth intermediate image D3H instead of the first intermediate image D1 and second intermediate image D2 will be described.

First, the effect of adding intermediate image D1 will be described. As described earlier, intermediate image D1 is obtained by excluding the fold-over component from the high-frequency component of the input image DIN, and corresponds to the high-frequency component near the Nyquist frequency of the original image DORG, as shown in FIG. 13(E). The spectral intensity near the Nyquist frequency of the original image DORG is weakened by the enlargement processing in the image enlarging means U1, as described with reference to FIG. 12(D). The spectral intensity weakened by the enlargement processing can be made up for by adding intermediate image D1. Since the fold-over component has been excluded from intermediate image D1, spurious signals such as overshoot, jaggies, and ringing are not enhanced.

Next the effect of adding intermediate image D2 will be described. As described above, intermediate image D2 is the high-frequency component corresponding to sampling interval S1. Adding intermediate image D2 can supply a high-frequency component in the band above the Nyquist frequency of the original image DORG, so the perceived image resolution can be increased.

To summarize, by adding intermediate image D1 and intermediate image D2 to the input image DIN, high-frequency components can be added without enhancing the fold-over component, and the perceived image resolution can be improved.

The addition of high-frequency components generated as described above to the input image can sharpen the image and improve its image quality, but excessive addition of high-frequency components can lower the image quality instead.

Figure 18A:
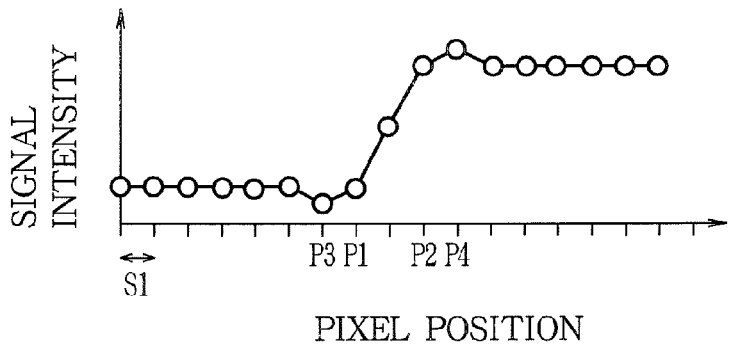
FIGS. 18(A) and 18(B) are diagrams indicating values of consecutive pixel signals when the image is sharpened by appropriate addition of high-frequency components and when the image quality is lowered as a result of excessive addition of high-frequency components.
Figure 18B:
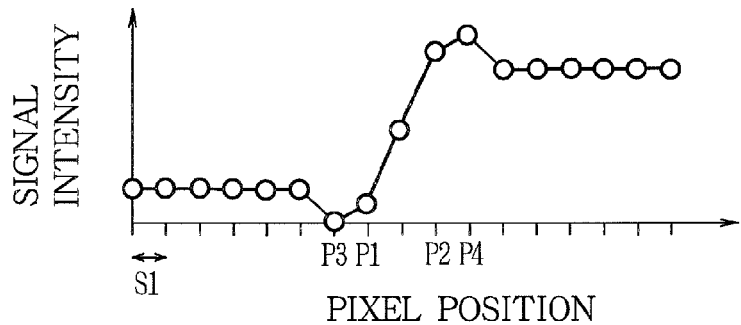

FIGS. 18(A) and 18(B) are diagrams illustrating the lowering of image quality by the addition of high-frequency components: FIG. 18(A) shows an example in which an image is sharpened by appropriate addition of high-frequency components; FIG. 18(B) shows an example in which the image quality is lowered as a result of excessive addition of high-frequency components.

FIG. 18(A) shows the result of addition of the intermediate image D1 shown in FIG. 17(D) and intermediate image D2 shown in FIG. 17(F) to the input image DIN shown in FIG. 17(B). The boundary of the low luminance region of the step edge represented by coordinate P3 in FIG. 17(A) is moved to the position represented by coordinate P1 in FIG. 18(A); the boundary of the high luminance region of the step edge represented by coordinate P4 in FIG. 17(A) is moved to the position represented by coordinate P2 in FIG. 18(A). A comparison of FIGS. 17(A) and 18(B) indicates that FIG. 18(A) is closer to the step edge shown in FIG. 16(A). This indicates that the image is sharpened by appropriate addition of high-frequency components.

FIG. 18(B) is also a diagram illustrating the result of addition of the intermediate image D1 shown in FIG. 17(D) and intermediate image D2 shown in FIG. 17(F) to the input image DIN shown in FIG. 17(B). Differing from FIG. 18(A), an example of excessive addition of high-frequency components is shown. A comparison with FIG. 18(A) indicates that the image quality is lowered because the luminance in the positions represented by coordinates P1 and P3 is decreased unnaturally to a level lower than the surrounding luminance (undershoot) and because the luminance in the positions represented by coordinates P2 and P4 is increased unnaturally to a level higher than the surrounding luminance (overshoot).

If the magnitude of the luminance added or subtracted by intermediate image D1 or intermediate image D2 (hereinafter, the correction amount) becomes too large, undershoot or overshoot, which are factors that lower image quality, is likely to occur. An adjustment to prevent the correction amount due to intermediate image D1 or intermediate image D2 from becoming larger than necessary can therefore be considered.

In one conceivable method of keeping the correction amount from becoming larger than necessary, the local maximum value of the correction given by intermediate image D1 or intermediate image D2 is detected, and if the detected maximum value exceeds a certain level, an appropriate gain is applied to decrease the amount of correction made by intermediate image D1 or intermediate image D2.

In this type of method, however, the data of several pixels must be referenced to determine the local maximum value, leading to an increase in circuit size. To reference the data of several pixels in the vertical direction, a line memory would have to be added, which becomes a cost-increasing factor.

In the first embodiment, the amplification factors applied to intermediate image D1 and intermediate image D2 are altered in accordance with the pixel values in the input image DIN so that the amount of correction applied by intermediate image D1 or intermediate image D2 does not become larger than necessary, and especially, the occurrence of overshoot can be avoided. In the image processing apparatus in the first embodiment, the correction amount is adjusted by applying appropriate amplification factors based on the pixel values in the input image DIN to intermediate image D1 and intermediate image D2 in the first intermediate image processing means 3M and second intermediate image processing means 3H.

Figure 19:
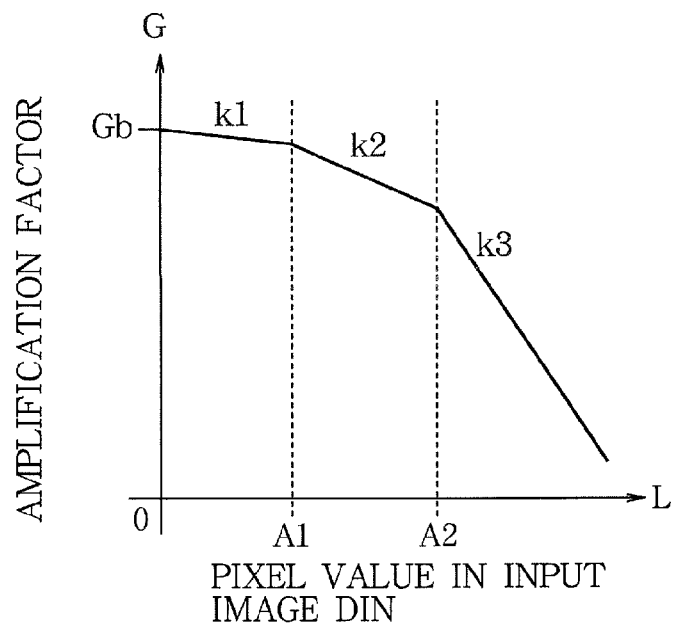
FIG. 19 is a diagram showing the relationship between the pixel values in the input image DIN and the amplification factors in the first intermediate image processing means 3M and second intermediate image processing means 3H.

FIG. 19 shows the amplification factors to be applied to intermediate image D1 and intermediate image D2 in the first intermediate image processing means 3M and second intermediate image processing means 3H or the amplification factors D3MA to be determined by the amplification factor determining means 3MA and the amplification factors D3HA to be determined by the amplification factor determining means 3HA. These amplification factors should decrease as the pixel values in the input image DIN increase. For example, the amplification factor may be Gb if the value of a pixel in the input image DIN is 0, and may decrease by a factor k1 as the pixel value varies from 0 to a value A1, then by a factor k2 as the pixel value varies from value A1 to a value A2, and then by a factor k3 when the pixel value exceeds value A2. Because the amplification factor should clearly be greater than or equal to 0, if the amplification factor determined as described above becomes negative, its value is changed to 0.

If the amplification factor is expressed as G and the values of pixels in the input image DIN are expressed as L, this relationship is expressed as:

[Mathematical expression 1]

$$G = \begin{cases} 0 & \text{if } (G' < 0) \\ G' & \text{if } (0 \le G') \end{cases} \quad (1)$$

where $$G' = \begin{cases} Gb - k1 \cdot L & \text{if } (0 \le L < A1) \\ Gb - k1 \cdot A1 - k2(L - A1) & \text{if } (A1 \le L < A2) \\ Gb - k1 \cdot A1 - k2(A2 - A1) - k3(L - A2) & \text{if } (A2 \le L) \end{cases}$$

Amplification factors as indicated above are appropriate for the following reason.

Intermediate image D1 is generated by performing high-pass filter processing and then low-pass filter processing on the input image DIN. The high-pass filter processing corresponds to subtraction of a local mean value from the value of each pixel in the input image DIN. If a pixel of interest in the input image DIN has a large pixel value, there is a high probability that the output value given to the pixel after the high-pass filter processing will also have a large positive value.

The low-pass filter processing is equivalent to obtaining a local mean value of the input data. Accordingly, if the high-pass filter processing outputs a large positive value, there is a high probability that the output value of the low-pass filter processing will also be a large positive value.

Intermediate image D2 is obtained by performing non-linear processing on intermediate image D1 in the non-linear processing means 2A and then performing high-pass filter processing in the high-frequency component image generating means 2B. Since the non-linear processing means 2A amplifies intermediate image D1 only around zero-crossing points, it can be basically assumed that where intermediate image D1 has a large positive value, the image D2A output by the non-linear processing means 2A will also have a large positive value. If image D2A has a large positive value, there is a high probability that the intermediate image D2 obtained as a result of high-pass filter processing of image D2A will also have a large positive value.

To summarize the above, where the input image DIN has large pixel values, there is high probability that the pixel values in intermediate images D1 and D2 will also be large positive values. In other words, an excessive amount of correction will be added by intermediate image D1 or intermediate image D2, and overshoot is likely to occur.

It can be anticipated that the amount of correction can be controlled so as to be kept from becoming excessively large by decreasing the amplification factor applied to intermediate image D1 or intermediate image D2 as the pixel value in the input image DIN increases. In other words, it can be anticipated that overshoot can be controlled so that it is unlikely to occur.

This type of process (that makes overshoot unlikely to occur) can be performed by determining the amplification factors D3MA or D3HA from a monotonically decreasing function such that the amplification factor decreases as the pixel value in the input image DIN increases, as indicated in FIG. 19 or expression (1).

As described above, the image processing apparatus in the first embodiment can perform image enhancement processing while suppressing the occurrence of overshoot. Excessive occurrence of overshoot in an image causes part of the image to flicker, which is visually irritating, so the image processing apparatus in the first embodiment is highly advantageous in terms of visual characteristics.

In the image processing apparatus according to the first embodiment, although amplification factors for intermediate image D1 and intermediate image D2 are determined in the first intermediate image processing means 3M and second intermediate image processing means 3H in order to suppress the occurrence of overshoot, the only necessary information is the pixel values in the input image DIN. Therefore, the amplification factors can be determined with a simple circuit, and the addition of the first intermediate image processing means 3M and second intermediate image processing means 3H causes only a small increase in circuit size.

The relationship between the amplification factors determined by the first intermediate image processing means 3M and the second intermediate image processing means 3H and the pixel values in the input image DIN is not limited to the relationship explained in the description of the first embodiment; it is only necessary for the amplification factor to decrease as the pixel value in the input image DIN increases.

Second Embodiment

Figure 20:
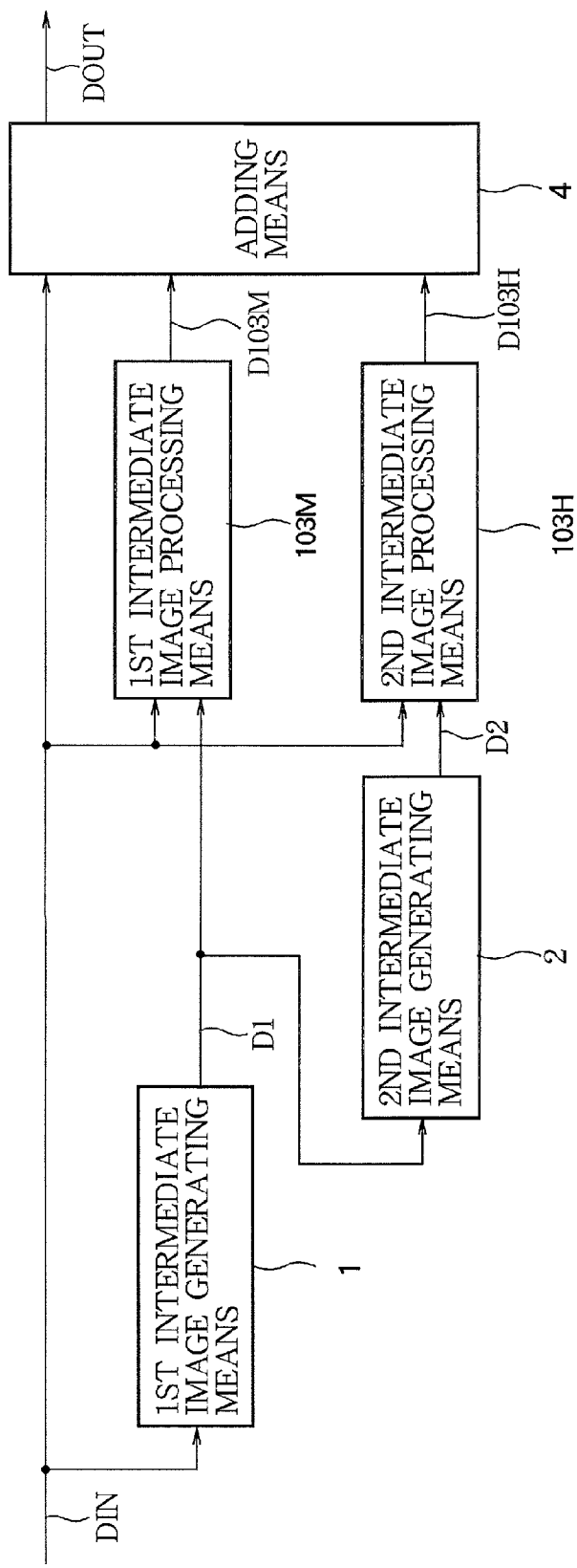
FIG. 20 is a block diagram illustrating the structure of an image processing apparatus according to a second embodiment of the invention.

FIG. 20 is a diagram illustrating an exemplary structure of an image processing apparatus according to a second embodiment of the invention.

The illustrated image processing apparatus includes a first intermediate image generating means 1, a second intermediate image generating means 2, a first intermediate image processing means 103M, a second intermediate image processing means 103H, and an adding means 4. The first intermediate image generating means 1, second intermediate image generating means 2, and adding means 4 have the same structure and operate in the same way as in the first embodiment, so descriptions will be omitted.

Figure 21:
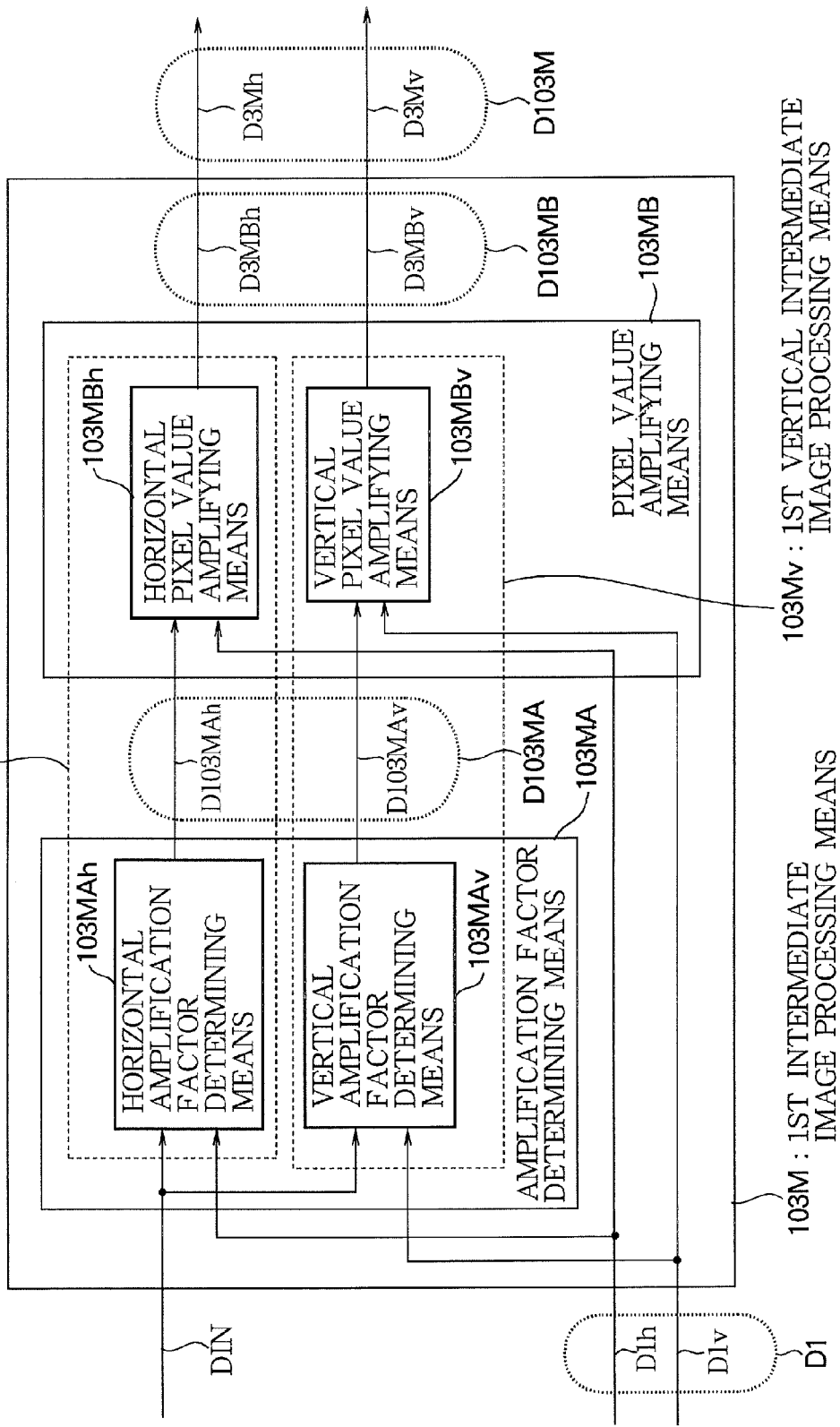
FIG. 21 is a block diagram illustrating an exemplary structure of the first intermediate image processing means 103M in FIG. 20.

FIG. 21 is a diagram illustrating an exemplary structure of the first intermediate image processing means 103M; the illustrated first intermediate image processing means 103M includes an amplification factor determining means 103MA and a pixel value amplifying means 103MB. The amplification factor determining means 103MA determines amplification factors D103MA from pixel values in the input image DIN and intermediate image D1. The pixel value amplifying means 103MB amplifies pixel values in intermediate image D1 in accordance with the amplification factors D103MA determined by the amplification factor determining means 103MA, and outputs the result as an intermediate image D103MB. The first intermediate image processing means 103M outputs intermediate image D103MB as intermediate image D103M.

The amplification factor determining means 103MA includes a horizontal amplification factor determining means 103MAh and a vertical amplification factor determining means 103MAv, and the pixel value amplifying means 103MB includes a horizontal pixel value amplifying means 103MBh and a vertical pixel value amplifying means 103MBv. The horizontal amplification factor determining means 103MAh and the horizontal pixel value amplifying means 103MBh constitute a first horizontal intermediate image processing means 103Mh; the vertical amplification factor determining means 103MAv and the vertical pixel value amplifying means 103MBv constitute a first vertical intermediate image processing means 103Mv.

Figure 22:
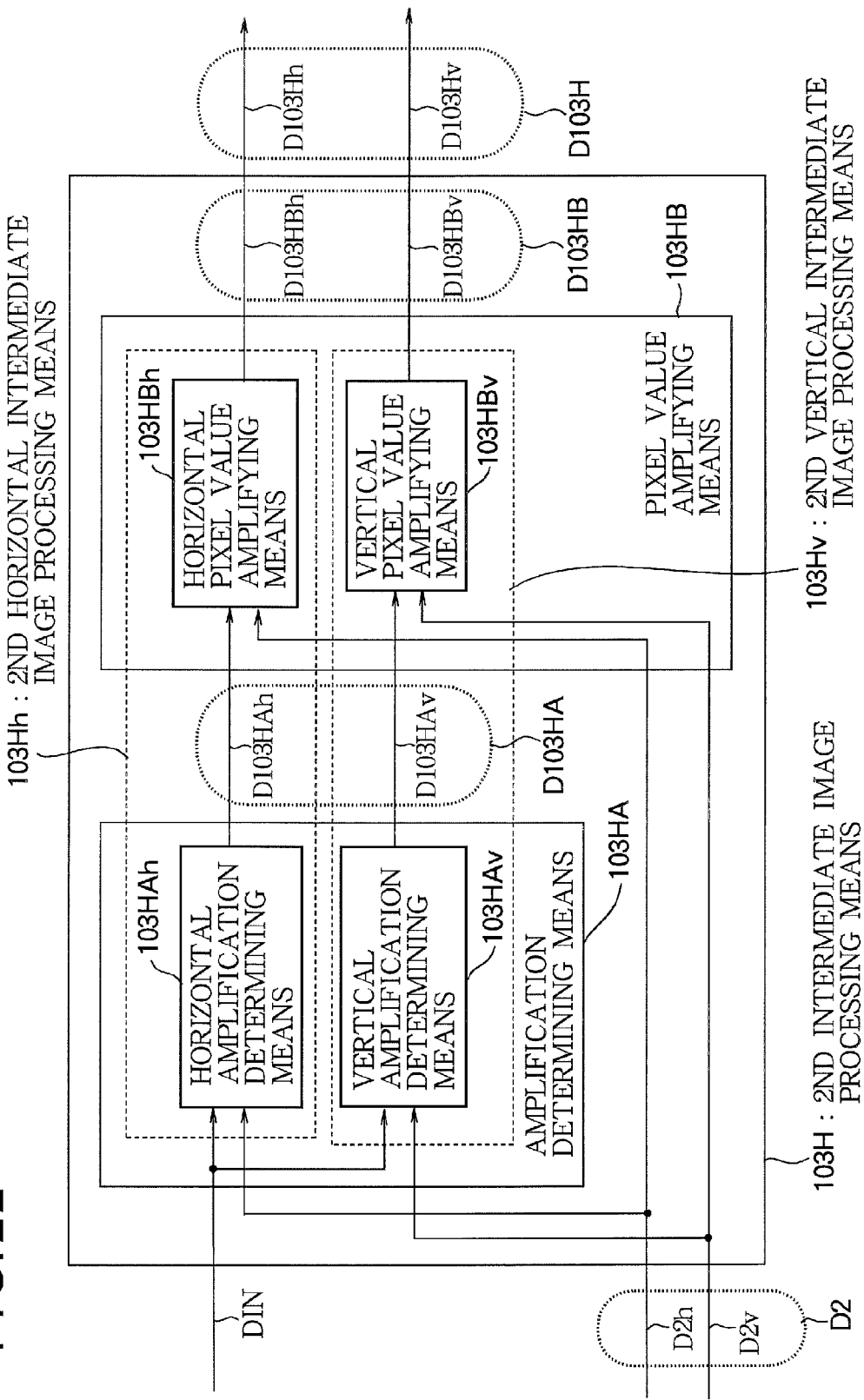
FIG. 22 is a block diagram illustrating an exemplary structure of the second intermediate image processing means 103H in FIG. 20.

FIG. 22 is a diagram illustrating an exemplary structure of the second intermediate image processing means 103H. The illustrated second intermediate image processing means 103H includes an amplification factor determining means 103HA and a pixel value amplifying means 103HB. The amplification factor determining means 103HA determines amplification factors D103HA from the pixel values in the input image DIN and intermediate image D2. The pixel value amplifying means 103HB amplifies the pixel values in intermediate image D2 in accordance with the amplification factors D103HA determined by the amplification factor determining means 103HA, and outputs the result as an intermediate image D103HB. The second intermediate image processing means 103H outputs intermediate image D103HB as an intermediate image D103H.

The amplification factor determining means 103HA includes a horizontal amplification factor determining means 103HAh and a vertical amplification factor determining means 103HAv, and the pixel value amplifying means 103HB includes a horizontal pixel value amplifying means 103HBh and a vertical pixel value amplifying means 103HBv. The horizontal amplification factor determining means 103HAh and the horizontal pixel value amplifying means 103HBh constitute a second horizontal intermediate image processing means 103Hh; the vertical amplification factor determining means 103HAv and the vertical pixel value amplifying means 103HBv constitute a second vertical intermediate image processing means 103Hv.

First the detailed operation of the first intermediate image processing means 103M will be described.

In the first intermediate image processing means 103M, the amplification factor determining means 103MA determines amplification factors D103MA from the pixel values in the input image DIN and intermediate image D1. As described earlier, the pixel values in the first intermediate image D1 are amplified in accordance with amplification factors D103MA. Since the first intermediate image D1 includes an image D1$h$ and an image D1$v$, amplification factors D103MAh for image D1$h$ and amplification factors D103MAv for image D1$v$ are determined as amplification factors D103MA. The amplification factor determining means 103MA includes a horizontal amplification factor determining means 103MAh and a vertical amplification factor determining means 103MAv. The horizontal amplification factor determining means 103MAh determines amplification factors D103MAh from the pixel values in the input image DIN and image D1$h$; the vertical amplification factor determining means 103MAv determines amplification factors D103MAv from the pixel values in the input image DIN and image D1$v$; amplification factors D103MAh and amplification factors D103MAv are output from the amplification factor determining means 103MA as amplification factors D103MA.

The operation of the horizontal amplification factor determining means 103MAh and the vertical amplification factor determining means 103MAv will now be described in further detail.

The input image DIN and images D1$h$, D1$v$ are as described in the first embodiment with reference to FIGS. 8(A), 8(B), and 8(C).

The horizontal amplification factor determining means 103MAh determines an amplification factor for each pixel in image D1$h$ from the pixel values in the corresponding positions in the input image DIN and image D1$h$. The amplification factor is determined from the values of the pixels with the same coordinates in the input image DIN and image D1$h$; the amplification factor for pixel value D1$h$(11) is determined from pixel values DIN(11) and D1$h$(11), the amplification factor for pixel value D1$h$(12) is determined from pixel values DIN (12) and D1$h$(12), and in general, the amplification factor for pixel value D1$h$(xy) is determined from pixel values DIN(xy) and D1$h$(xy); the results are output as amplification factor D103MAh.

The vertical amplification factor determining means 103MAv determines an amplification factor for each pixel in image D1$v$ from the pixel values in the corresponding positions in the input image DIN and image D1$v$. The amplification factor is determined from the values of the pixels with the same coordinates in the input image DIN and image D1$v$; the amplification factor for pixel value D1$v$(11) is determined from pixel values DIN(11) and D1$v$(11), the amplification factor for pixel value D1$v$(12) is determined from pixel values DIN(12) and D1$v$(12), and in general, the amplification factor for pixel value D1v(xy) is determined from pixel values DIN (xy) and D1v(xy); the results are output as amplification factor D103MAv.

FIG. 23 is a diagram illustrating an exemplary structure of the horizontal amplification factor determining means 103MAh. The illustrated horizontal amplification factor determining means 103MAh includes a first amplification factor determining means 511h, a second amplification factor determining means 512h, a sign decision means 52h, and a selecting means 53h. The horizontal amplification factor determining means 103MAh receives the input image DIN and image D1h. The first amplification factor determining means 511h outputs an amplification factor D511h determined in accordance with a first characteristic, which will be described later, from the pixel values in the input image DIN. The second amplification factor determining means 512h outputs an amplification factor D512h determined in accordance with a second characteristic, which will be described later, from pixel values in the input image DIN. The sign decision means 52h determines the sign (positive or negative) of the pixel values in image D1h and reports its determinations to the selecting means 53h by a signal D52h. On the basis of the output D52h of the sign decision means 52h, the selecting means 53h outputs amplification factor D511h as the horizontal amplification factor D103MAh if the sign of the pixel value in image D1h is positive, and outputs amplification factor D512h as the horizontal amplification factor D103MAh if the sign of the pixel value in image D1h is negative.

FIG. 24 is a diagram illustrating an exemplary structure of the vertical amplification factor determining means 103MAv. The illustrated vertical amplification factor determining means 103MAv includes a first amplification factor determining means 511v, a second amplification factor determining means 512v, a sign decision means 52v, and a selecting means 53v. The vertical amplification factor determining means 103MAv receives the input image DIN and image D1v. The first amplification factor determining means 511v outputs an amplification factor D511v determined in accordance with the first characteristic, which will be described later, from the pixel values in the input image DIN. The second amplification factor determining means 512v outputs an amplification factor D512v determined in accordance with the second characteristic, which will be described later, from the pixel values in the input image DIN. Since the first amplification factor determining means 511v and second amplification factor determining means 512v operate in the same manner as the first amplification factor determining means 511h and second amplification factor determining means 512h shown in FIG. 23 and since the input image DIN is used in common, the means can be shared (the amplification factor determining means 511h and 512h may also be used as the amplification factor determining means 511v and 512v). The sign decision means 52v determines the sign (positive or negative) of the pixel values in image D1v and reports its determinations to the selecting means 53v by a signal D52v. On the basis of the output D52v of the sign decision means 52v, the selecting means 53v outputs amplification factor D511v as the vertical amplification factor D103MAv if the sign of the pixel value in image D1v is positive, and outputs amplification factor D512v as the vertical amplification factor D103MAv if the sign of the pixel value in image D1v is negative.

The pixel value amplifying means 103MB amplifies the pixel values in the first intermediate image D1 in accordance with amplification factors D103MA. Since the first intermediate image D1 includes image D1h and image D1v, the pixel value amplifying means 103MB includes a horizontal pixel value amplifying means 103MBh for amplifying the pixel values in image D1h and a vertical pixel value amplifying means 103MBv for amplifying the pixel values in image D1v. The horizontal pixel value amplifying means 103MBh outputs an image D103MBh obtained by amplifying the pixel values in image D1h in accordance with amplification factors D103MAh, and the vertical pixel value amplifying means 103MBv outputs an image D103MBv obtained by amplifying the pixel values in image D1v in accordance with amplification factors D103MAv. Image D103MBh and image D103MBv are output from the pixel value amplifying means 103MB as image D103MB.

Image D103MB is output from the first intermediate image processing means 103M as intermediate image D103M. Intermediate image D103M includes an image D103Mh corresponding to image D103MBh and an image D103Mv corresponding to image D103MBv.

The first intermediate image processing means 103M operates as described above.

Next the operation of the second intermediate image processing means 103H will be described. A comparison of FIGS. 21 and 22 indicates that the second intermediate image processing means has the same structure as the first intermediate image processing means except that the input signals are the input image DIN and intermediate image D2; the intermediate image D103H output by the second intermediate image processing means 103H is obtained by performing, on intermediate image D2, the same processing as performed on intermediate image D1 by the first intermediate image processing means 103M. Since the details of the operation of the second intermediate image processing means 103H are clear from the detailed description of the operation of the first intermediate image processing means 103M given above, a description of the detailed operation of the second intermediate image processing means 103H will be omitted.

Like the image processing apparatus in the first embodiment, the image processing apparatus in this embodiment can be utilized as part of the image display apparatus shown in FIG. 9. An example in which the image processing apparatus in this embodiment is utilized as part of an image display apparatus will be described below. The description will clarify the effects of the image processing apparatus in this embodiment.

As described with reference to FIGS. 18(A) and 18(B) in the first embodiment, by adding intermediate image D1 and image D2 to the input image DIN, the image can be sharpened, and the image quality can be improved. However, the image quality may sometimes be lowered as a result of excessive addition of high-frequency components.

In this embodiment, the amplification factors applied to intermediate image D1 and intermediate image D2 are varied in accordance with the pixel values in the input image DIN and the pixel values in intermediate image D1 or intermediate image D2 so that the amount of correction added or subtracted by intermediate image D1 or intermediate image D2 does not become excessively large, and the occurrence of overshoot or undershoot can be avoided.

In the illustrated image processing apparatus, the amount of correction is adjusted by applying appropriate amplification factors, based on the pixel values in the input image DIN and the sign (positive or negative) of the pixel values in intermediate image D1 and intermediate image D2, to intermediate image D1 and intermediate image D2 in the first intermediate image processing means 103M and second intermediate image processing means 103H.

FIG. 25(A) shows a characteristic curve (the first characteristic) of the amplification factors to be applied to intermediate image D1 and intermediate image D2 in the first intermediate image processing means 103M and second intermediate image processing means 103H or the amplification factors D103MA to be determined by the amplification factor determining means 103MA and the amplification factors D103HA to be determined by the amplification factor determining means 103HA, in order to suppress the occurrence of overshoot. In order to prevent the occurrence of overshoot, these amplification factors should decrease as the pixel values in the input image DIN increase. For example, the amplification factor may be B1 if the pixel value in the input image DIN is 0, and may decrease by a factor k11 as the pixel value varies from 0 to a value A11, then by a factor k12 as the pixel value varies from value A11 to a value A12, and then by a factor k13 when the pixel value exceeds value A11. Because the amplification factor should clearly be greater than 0, if the amplification factor determined as described above has a negative value, the value is changed to 0.

If the amplification factor is expressed as G and the values of pixels in the input image DIN are expressed as L, this relationship is expressed as:

[Mathematical expression 2]

$$G = \begin{cases} 0 & \text{if } (G' < 0) \\ G' & \text{if } (0 \le G') \end{cases} \quad (2)$$

where
$G' =$ $$\begin{cases} B1 - k11 \cdot L & \text{if } (0 \le L < A11) \\ B1 - k11 \cdot A11 - k12\left(\dfrac{L-}{A11}\right) & \text{if } (A11 \le L < A12) \\ B1 - k11 \cdot A11 - k12\left(\dfrac{A12-}{A11}\right) - k13\left(\dfrac{L-}{A12}\right) & \text{if } (A12 \le L) \end{cases}$$

The first amplification factor determining means 511h shown in FIG. 23 and the first amplification factor determining means 511v shown in FIG. 24 output amplification factors determined in accordance with the first characteristic as indicated in FIG. 25(A) and expression (2).

FIG. 25(B) shows a characteristic curve (the second characteristic) of the amplification factors to be applied to intermediate image D1 and intermediate image D2 in the first intermediate image processing means 103M and second intermediate image processing means 103H or the amplification factors D103MA to be determined by the amplification factor determining means 103MA and the amplification factors D103HA to be determined by the amplification factor determining means 103HA, in order to suppress the occurrence of undershoot. In order to prevent the occurrence of undershoot, these amplification factors should decrease as the pixel value in the input image DIN decreases. In other words, the amplification factor should increase as the pixel value in the input image DIN increases. For example, the amplification factor may be B2 if the pixel value in the input image DIN is 0, and may increase by a factor k21 as the pixel value varies from 0 to a value A21, then by a factor k22 as the pixel value varies from value A21 to a value A22, and then by a factor k23 when the pixel value exceeds value A22.

If the amplification factor is expressed as G and the values of pixels in the input image DIN are expressed as L, this relationship is expressed as:

[Mathematical expression 3]

$$G = \begin{cases} 0 & \text{if } (G' < 0) \\ G' & \text{if } (0 \le G') \end{cases} \quad (3)$$

where
$G' =$ $$\begin{cases} B2 + k21 \cdot L & \text{if } (0 \le L < A21) \\ B2 + k21 \cdot A21 + k22\left(\dfrac{L-}{A21}\right) & \text{if } (A21 \le L < A22) \\ B2 + k21 \cdot A21 + k22\left(\dfrac{A22-}{A21}\right) - k23\left(\dfrac{L-}{A22}\right) & \text{if } (A22 \le L) \end{cases}$$

The second amplification factor determining means 512h shown in FIG. 23 and the second amplification factor determining means 512v shown in FIG. 24 output amplification factors determined in accordance with the second characteristic as indicated in FIG. 25(B) and expression (3).

The amplification factors as indicated above are appropriate for the following reason.

Intermediate image D1 is generated by performing high-pass filter processing and then performing low-pass filter processing on the input image DIN. The high-pass filter processing corresponds to subtraction of a local mean value from the value of each pixel in the input image DIN. If a pixel of interest in the input image DIN has a large pixel value, there is a high probability that the output value given to the pixel after high-pass filter processing will also have a large positive value.

The low-pass filter processing is equivalent to obtaining a local mean value of the input data. Accordingly, if the high-pass filter processing outputs a large positive value, there is a high probability that the output value of the low-pass filter processing will also be a large positive value.

Intermediate image D2 is obtained by performing non-linear processing on intermediate image D1 in the non-linear processing means 2A and then performing high-pass filter processing in the high-frequency component image generating means 2B. Since the non-linear processing means 2A amplifies intermediate image D1 only around zero-crossing points, it can be basically supposed that where intermediate image D1 has a large positive value, the image D2A output by the non-linear processing means 2A will also have a large positive value. If image D2A has a large positive value, there is a high probability that the intermediate image D2 obtained as a result of high-pass filter processing on image D2A will also have a large positive value.

To summarize the above, where the input image DIN has large pixel values, there is a high probability that the pixel values in intermediate images D1 and D2 will also have large positive values. In other words, an excessive amount of correction will be added by intermediate image D1 or intermediate image D2, and overshoot is likely to occur.

Conversely, where the input image DIN has small pixel values, there is a high probability that the pixel values in intermediate images D1 and D2 will have large negative values. In other words, an excessive amount of correction is subtracted by intermediate image D1 or intermediate image D2, and undershoot is likely to occur.

It can be anticipated that the amount of correction added or subtracted can be controlled so as to be kept from becoming excessively large by decreasing the amplification factor applied to intermediate image D1 or intermediate image D2 as the pixel value in the input image DIN increases if the pixel value in intermediate image D1 or intermediate image D2 is positive and by decreasing the amplification factor applied to intermediate image D1 or intermediate image D2 as the pixel value in the input image DIN decreases if the pixel value in intermediate image D1 or intermediate image D2 is negative. In other words, it can be anticipated that overshoot and undershoot can be controlled so that they are unlikely to occur.

This type of process (that makes overshoot and undershoot unlikely to occur) can be performed by determining the sign in intermediate image D1 or intermediate image D2 and by determining amplification factors D103MA or amplification factors D103HA on the basis of a monotonically decreasing function such that the amplification factor decreases as the pixel value in the input image DIN increases, as indicated in FIG. 25(A) or expression (2), if the sign is positive, or by determining amplification factors D103MA or amplification factors D103HA on the basis of a monotonically increasing function such that the amplification factor decreases as the pixel value in the input image DIN decreases, as indicated in FIG. 25(B) or expression (3), if the sign is negative.

As described above, the image processing apparatus in the second embodiment can perform image enhancement processing while suppressing the occurrence of overshoot and undershoot. Excessive occurrence of overshoot or undershoot in an image causes part of the image to flicker, which is visually irritating, so the image processing apparatus in the second embodiment is highly advantageous in terms of visual characteristics.

In the image processing apparatus according to the second embodiment, although amplification factors for intermediate images D1 and D2 are determined in the first intermediate image processing means 103M and second intermediate image processing means 103H in order to suppress the occurrence of overshoot and undershoot, the only necessary information is the pixel values in the input image DIN and the sign of the pixel values in intermediate image D1 or intermediate image D2 (the image itself). Therefore, the amplification factors can be determined with a simple circuit, and the addition of the first intermediate image processing means 103M and second intermediate image processing means 103H causes only a small increase in circuit size.

The relationship between the amplification factors determined by the first intermediate image processing means 103M and the second intermediate image processing means 103H and the pixel values in the input image DIN is not limited to the relationship explained in the description of this embodiment; for the first characteristic for preventing the occurrence of overshoot, it is only necessary for the amplification factor to decrease as the pixel value in the input image DIN increases, and for the second characteristic for preventing the occurrence of undershoot, it is only necessary for the amplification factor to decrease as the pixel value in the input image DIN decreases. Moreover, if the above characteristics are satisfied, the coefficient in expression (2) or expression (3) or the form of the function itself may vary among the horizontal amplification factor determining means 103MAh, vertical amplification factor determining means 103MAv, horizontal amplification factor determining means 103HAh, and vertical amplification factor determining means 103HAv.

The horizontal amplification factor determining means 103MAh is not limited to the structure illustrated in FIG. 23; the structure shown in FIG. 26, for example, may also be used. The horizontal amplification factor determining means 103MAh shown in FIG. 26 includes a sign decision means 52h, a coefficient determining means 54h, and an amplification factor determining means 55h. The sign decision means 52h determines the sign (positive or negative) of the pixel value in image D1h; its determination is reported to the coefficient determining means 54h by a signal D52h. On the basis of this output D52h of the sign decision means 52h, the coefficient determining means 54h determines a certain group of coefficients D54h (k1, k2, k3, A1, A2, B) as given by expression (4) below if the sign of the pixel value in image D1h is positive.

[Mathematical expression 4]

$$k1 = -k11$$
$$k2 = -k12$$
$$k3 = -k13$$
$$A1 = A11$$
$$A2 = A12$$
$$B = B1$$

(4)

If the sign of the pixel value in image D1h is negative, the coefficient determining means 54h determines the group of coefficients D54h (k1, k2, k3, A1, A2, B) as given by expression (5) below.

[Mathematical expression 5]

$$k1 = k21$$
$$k2 = k22$$
$$k3 = k23$$
$$A1 = A21$$
$$A2 = A22$$
$$B = B2$$

(5)

On the basis of the coefficients D54h, the amplification factor determining means 55h calculates the horizontal amplification factor D103MAh by expression (6) below.

[Mathematical expression 6]

$$G = \begin{cases} 0 & \text{if } (G' < 0) \\ G' & \text{if } (0 \le G') \end{cases}$$

(6)

where $$G' = \begin{cases} B + k1 \cdot L & \text{if } (0 \le L < A1) \\ B + k1 \cdot A1 + k2\left(\dfrac{L-}{A1}\right) & \text{if } (A1 \le L < A2) \\ B + k1 \cdot A1 + k2\left(\dfrac{A2-}{A1}\right) - k3\left(\dfrac{L-}{A2}\right) & \text{if } (A2 \le L) \end{cases}$$

When the coefficients are substituted, it is clear that expression (6) becomes equivalent to expression (2) if the sign of the pixel value in image D1h is positive, and expression (6) becomes equivalent to expression (3) if the sign of the pixel value in image D1h is negative. Therefore, the same output horizontal amplification factor D103MAh is obtained as from the structure illustrated in FIG. 23. On the other hand, since the structure illustrated in FIG. 26 allows the operation in the amplification factor determining means 55h to be expressed by a single relation and allows characteristics to be switched just by changing the coefficients in accordance with the sign in image D1h, the size of the operation circuit can be reduced. The vertical amplification factor determining means 103MAv, horizontal amplification factor determining means 103HAh, and vertical amplification factor determining means 103HAv may also be structured as described above, providing the same effect.

Although an example in which an amplification factor is calculated from the value of each pixel in the input image DIN has been described in this embodiment, the values of an amplification factor corresponding to the pixel values in the input image DIN may also be prestored in the form of a look-up table (LUT). If this type of LUT is used, the need for the calculations in expression (2), expression (3), or expression (6) is eliminated, so that the processing in the horizontal amplification factor determining means 103MAh, vertical amplification factor determining means 103MAv, horizontal amplification factor determining means 103HAh, and vertical amplification factor determining means 103HAv can be simplified.

In the embodiment described above, both the horizontal amplification factor determining means 103MAh and the vertical amplification factor determining means 103MAv of the first intermediate image processing means 103M have a first amplification factor determining means (511h, 511v) for outputting an amplification factor in accordance with a first characteristic such that the amplification factor decreases as the pixel value in the input image increases, a second amplification factor determining means (512h, 512v) for outputting an amplification factor in accordance with a second characteristic such that the amplification factor decreases as the pixel value in the input image decreases, a sign decision means (52h, 52v) for determining the sign of the pixel value in the first intermediate image D1, and a selecting means (53h, 53v) for selecting and outputting either the amplification factor output by the first amplification factor determining means (511h, 511v) or the amplification factor output by the second amplification factor determining means (512h, 512v) in accordance with the determination made by the sign decision means, but only one of the horizontal amplification factor determining means 103MAh and vertical amplification factor determining means 103MAv need have the structure described above; the other may have a different structure.

It has been explained with reference to FIG. 26 that both the horizontal amplification factor determining means 103MAh and the vertical amplification factor determining means 103MAv may include a sign decision means (52h) for determining the sign of the pixel value in the first intermediate image, a coefficient determining means (54h) for outputting certain coefficients on the basis of the determination made by the sign decision means (52h), and an amplification factor determining means (55h) for determining the amplification factor by using the pixel values in the input image and the coefficients output by the sign decision means (52h), but only one of the horizontal amplification factor determining means 103MAh and vertical amplification factor determining means 103MAv need have the structure described above; the other may have a different structure.

The same applies to the horizontal amplification factor determining means 103HAh and the vertical amplification factor determining means 103HAv in the second intermediate image processing means 103H.

Third Embodiment

Figure 27:
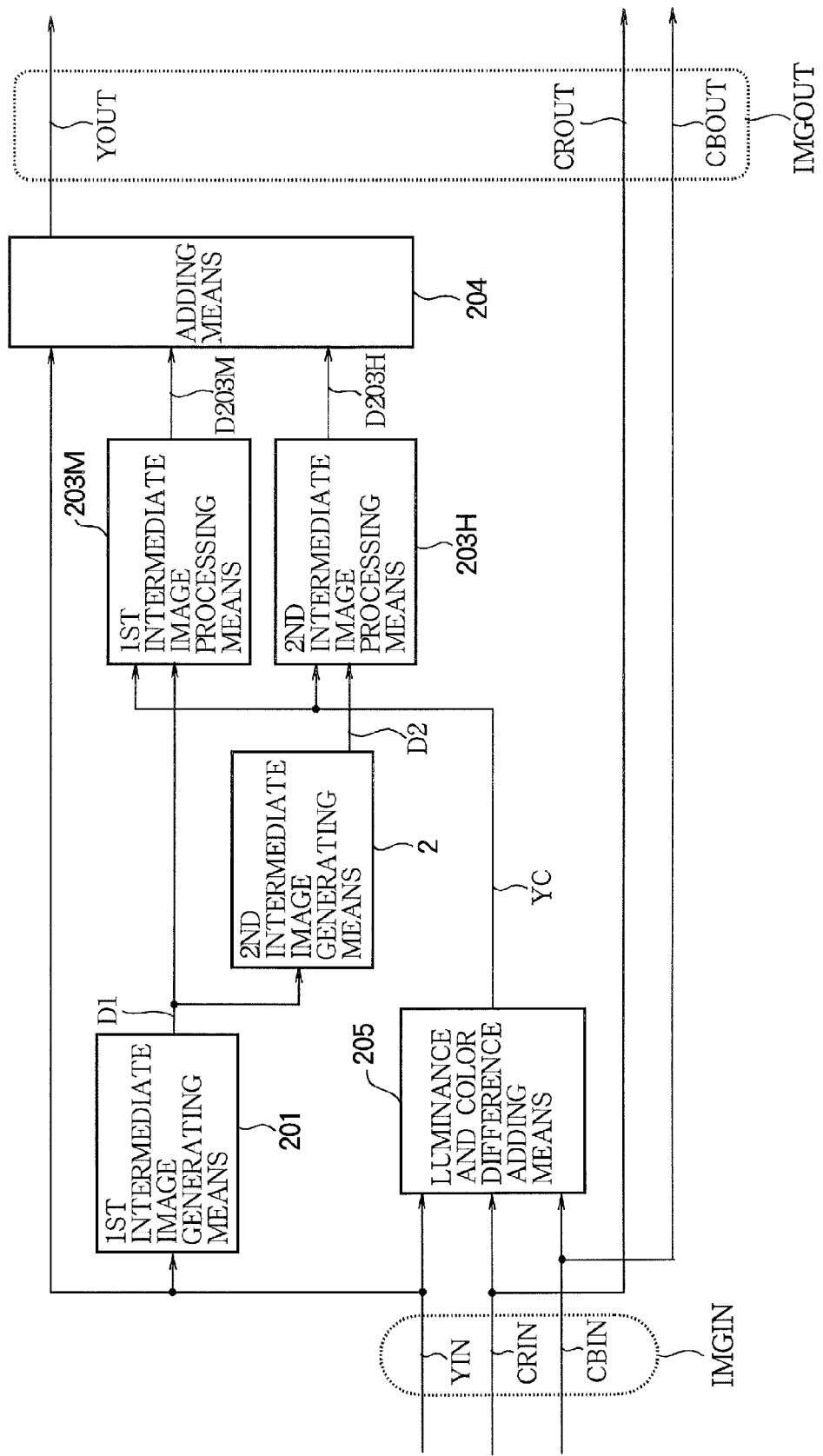
FIG. 27 is a block diagram illustrating the structure of an image processing apparatus according to a third embodiment of the invention.

FIG. 27 is a diagram illustrating an exemplary structure of an image processing apparatus according to a third embodiment of the invention.

The illustrated image processing apparatus receives an input image IMGIN and outputs an output image IMGOUT. The input image IMGIN is a color image including a signal YIN (input luminance image YIN) representing a luminance component and signals CRIN and CBIN representing color difference components. Of the color difference components, the CRIN signal (input CR image CRIN) represents the Cr component and the CBIN signal (input CB image CBIN) represents the Cb component. The output image IMGOUT is also a color image and includes a signal YOUT (output luminance image YOUT) representing a luminance component and signals CROUT and CBOUT representing color difference components. Of the color difference components, the CROUT signal (output CR image CROUT) represents the Cr component and the CBOUT signal (output CB image CBOUT) represents the Cb component.

The image processing apparatus in the third embodiment includes a first intermediate image generating means 201, a second intermediate image generating means 2, a luminance and color difference adding means 205, a first intermediate image processing means 203M, a second intermediate image processing means 203H, and an adding means 204.

The first intermediate image generating means 201 generates an intermediate image D1 (the first intermediate image) by extracting components in a particular frequency band (components from a first frequency (a first predetermined frequency) to a second frequency (a second predetermined frequency)) from the input luminance image YIN.

The second intermediate image generating means 2 generates an intermediate image D2 (the second intermediate image) by carrying out certain processing, which will be described later, on intermediate image D1.

The luminance and color difference adding means 205 generates a summed luminance and color difference image YC obtained by weighted addition of the input luminance image YIN, the input CR image CRIN, and the input CB image CBIN, which will be described later.

The first intermediate image processing means 203M generates an intermediate image D203M (the third intermediate image) by carrying out certain processing, which will be described later, on intermediate image D1.

The second intermediate image processing means 203H generates an intermediate image D203H (the fourth intermediate image) by carrying out certain processing, which will be described later, on intermediate image D2.

The adding means 204 adds the input luminance image YIN, intermediate image D203M, and intermediate image D203H together.

The image processing apparatus illustrated in this embodiment processes only the luminance component. While the output image of the adding means 204 is output as the output luminance image YOUT, the input CR image CRIN is output directly as the output CR image CROUT, and the input CB image CBIN is output directly as the output CB image CBOUT.

The first intermediate image generating means 201 performs the same processing on the input luminance image YIN as performed on the input image DIN by the first intermediate image generating means 1 in the first embodiment. It can therefore have the same structure as the first intermediate image generating means 1 in the first embodiment.

The operation and structure of the second intermediate image generating means 2 are the same as the operation and structure of the second intermediate image generating means 2 in the first embodiment, so a description will be omitted.

Figure 28:
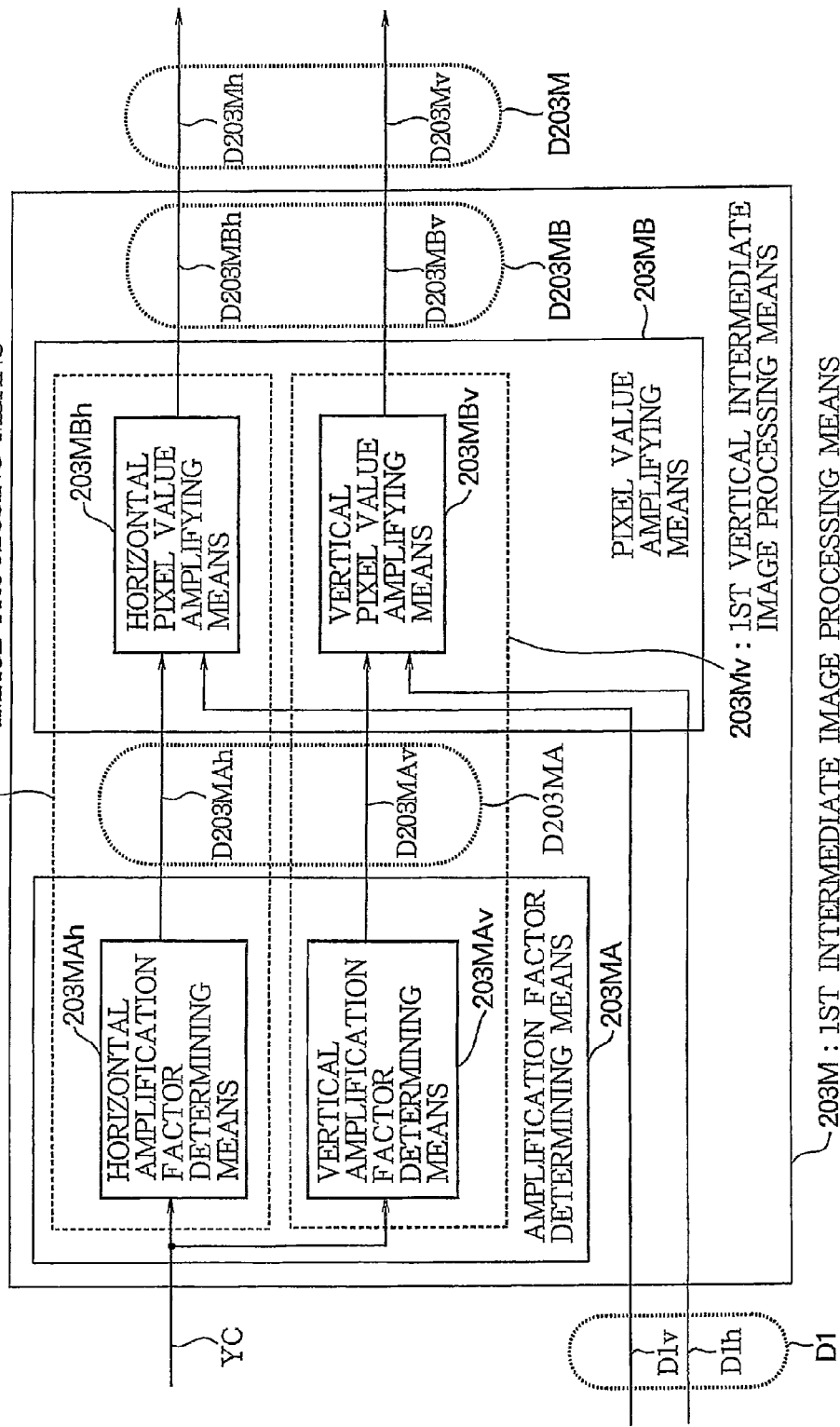
FIG. 28 is a block diagram illustrating an exemplary structure of the first intermediate image processing means 203M in FIG. 27.

FIG. 28 is a diagram illustrating an exemplary structure of the first intermediate image processing means 203M; the illustrated first intermediate image processing means 203M includes an amplification factor determining means 203MA and a pixel value amplifying means 203MB. The amplification factor determining means 203MA determines amplification factors D203MA on the basis of pixel values in the summed luminance and color difference image YC, which will be described later.

The pixel value amplifying means 203MB amplifies pixel values in intermediate image D1 in accordance with the amplification factors D203MA determined by the amplification factor determining means 203MA, and outputs the result as an intermediate image D203MB. The first intermediate image processing means 203M outputs intermediate image D203MB as intermediate image D203M.

The amplification factor determining means 203MA includes a horizontal amplification factor determining means 203MAh and a vertical amplification factor determining means 203MAv, and the pixel value amplifying means 203MB includes a horizontal pixel value amplifying means 203MBh and a vertical pixel value amplifying means 203MBv. The horizontal amplification factor determining means 203MAh and the horizontal pixel value amplifying means 203MBh constitute a first horizontal intermediate image processing means 203Mh; the vertical amplification factor determining means 203MAv and the vertical pixel value amplifying means 203MBv constitute a first vertical intermediate image processing means 203Mv.

Figure 29:
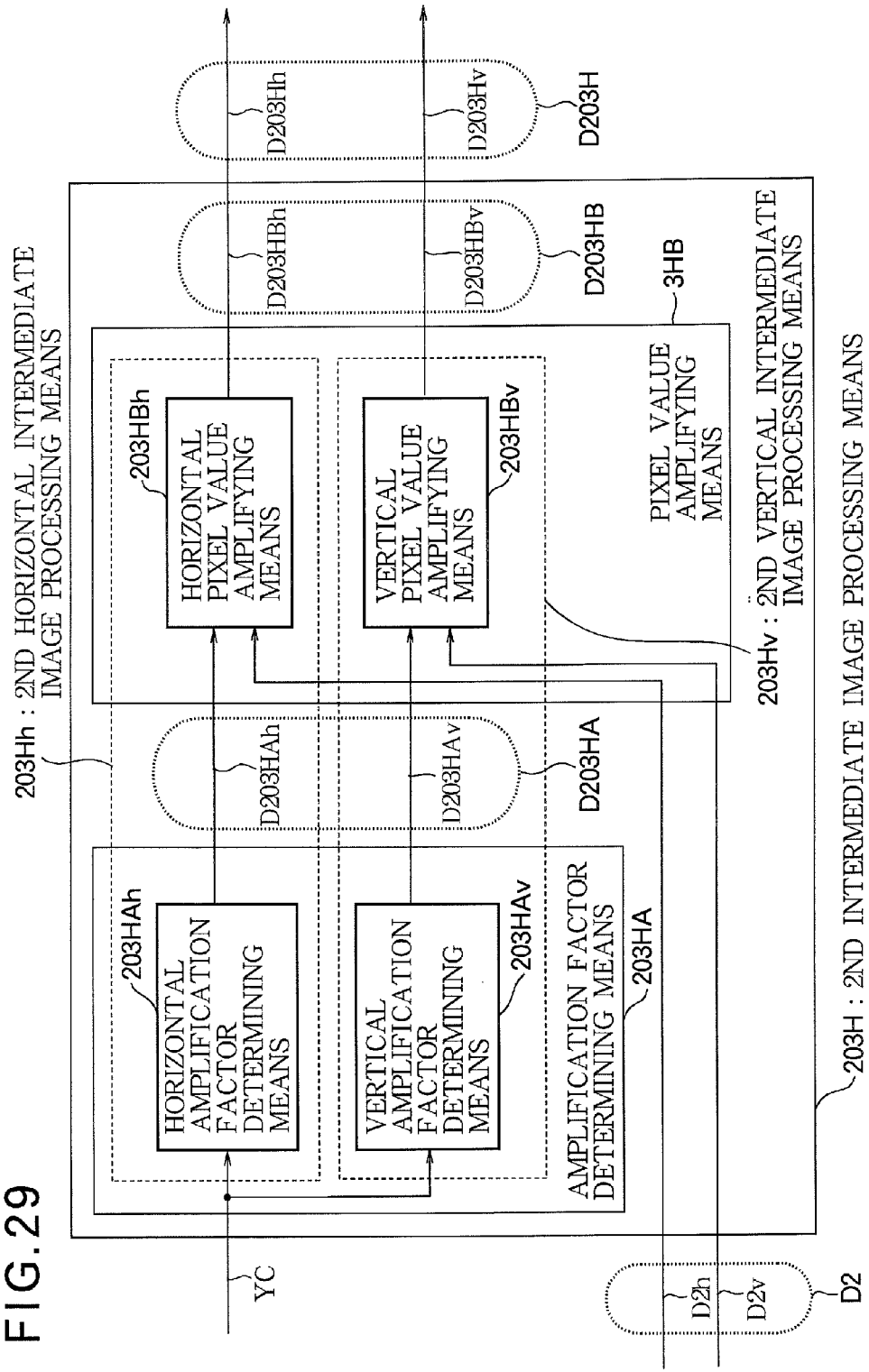
FIG. 29 is a block diagram illustrating an exemplary structure of the second intermediate image processing means 203H in FIG. 27.

FIG. 29 is a diagram illustrating an exemplary structure of the second intermediate image processing means 203H. The illustrated second intermediate image processing means 203H includes an amplification factor determining means 203HA and a pixel value amplifying means 203HB. The amplification factor determining means 203HA determines amplification factors D203HA on the basis of the pixel values in the summed luminance and color difference image YC, which will be described later.

The pixel value amplifying means 203HB amplifies the pixel values in intermediate image D2 in accordance with the amplification factors D203HA determined by the amplification factor determining means 203HA, and outputs the result as an intermediate image D203HB. The second intermediate image processing means 203H outputs intermediate image D203HB as intermediate image D203H.

The amplification factor determining means 203HA includes a horizontal amplification factor determining means 203HAh and a vertical amplification factor determining means 203HAv, and the pixel value amplifying means 203HB includes a horizontal pixel value amplifying means 203HBh and a vertical pixel value amplifying means 203HBv. The horizontal amplification factor determining means 203HAh and the horizontal pixel value amplifying means 203HBh constitute a second horizontal intermediate image processing means 203Hh; the vertical amplification factor determining means 203HAv and the vertical pixel value amplifying means 203HBv constitute a second vertical intermediate image processing means 203Hv.

The adding means 204 generates the output luminance image YOUT by adding intermediate image D203M and intermediate image D203H to the input luminance image YIN.

The detailed operation of the image processing apparatus according to the third embodiment will be described below. As noted above, the operation of the first intermediate image generating means 201 and the second intermediate image generating means 2 is the same as in the first embodiment, so descriptions will be omitted.

First the detailed operation of the luminance and color difference adding means 205 will be described. The luminance and color difference adding means 205 generates a summed luminance and color difference image YC by performing, on each pixel, a weighted addition of the pixel value in the input luminance image YIN, the absolute value of the pixel value in the input CR image CRIN, and the absolute value of the pixel value in the input CB image CBIN. That is, the summed luminance and color difference image YC is obtained from the input luminance image YIN, the input CR image CRIN, and the input CB image CBIN by use of the following expression.

$$YC = Ky \cdot YIN + Kcr \cdot |CRIN| + Kcb \cdot |CBIN| \qquad (7)$$

Here, Ky, Kcr, and Kcb are weighting coefficients.

Next the detailed operation of the first intermediate image processing means 203M will be described.

In the first intermediate image processing means 203M, the amplification factor determining means 203MA determines amplification factors D203MA from the pixel values in the summed luminance and color difference image YC. As described earlier, the pixel values in the first intermediate image D1 are amplified in accordance with amplification factors D203MA. Since the first intermediate image D1 includes an image D1$h$ and an image D1$v$, amplification factors D203MAh for image D1$h$ and amplification factors D203MAv for image D1$v$ are determined as amplification factors D203MA. The amplification factor determining means 203MA includes a horizontal amplification factor determining means 203MAh and a vertical amplification factor determining means 203MAv. The horizontal amplification factor determining means 203MAh determines amplification factors D203MAh on the basis of the pixel values in the summed luminance and color difference image YC; the vertical amplification factor determining means 203MAv determines amplification factors D203MAv on the basis of the pixel values in the summed luminance and color difference image YC; amplification factors D203MAh and amplification factors D203MAv are output from the amplification factor determining means 203MA as amplification factors D203MA.

The operation of the horizontal amplification factor determining means 203MAh and the vertical amplification factor determining means 203MAv will now be described in further detail.

FIGS. 30(A) and 30(C) are diagrams representing the summed luminance and color difference image YC, image D1$h$, and image D1$v$: FIG. 30(A) represents the summed luminance and color difference image YC; FIG. 30(B) represents image D1$h$; FIG. 30(C) represents image D1$v$. The horizontal and vertical axes in FIGS. 30(A) and 30(C) correspond to the horizontal and vertical directions in the image and indicate coordinate values. The pixel value of the pixel in the summed luminance and color difference image YC in a position indicated by x on the horizontal axis and y on the vertical axis is denoted YC(xy). In image D1$h$, the pixel value of the pixel in the position indicated by x on the horizontal axis and y on the vertical axis is denoted D1$h$(xy). In image D1$v$, the pixel value of the pixel in the position indicated by x on the horizontal axis and y on the vertical axis is denoted D1$v$(xy).

The horizontal amplification factor determining means 203MAh determines an amplification factor for each pixel in image D1$h$ from the pixel value in the corresponding position in the summed luminance and color difference image YC. The amplification factor is determined from the value of the pixel with the same coordinates in the summed luminance and color difference image YC; the amplification factor for pixel value D1$h$(11) is determined from pixel value YC(11), the amplification factor for pixel value D1$h$(12) is determined from pixel value YC(12), and in general, the amplification factor for pixel value D1*h*(xy) is determined from pixel value YC(xy); the result is output as amplification factor D203MA*h*.

The vertical amplification factor determining means 203MA*v* determines an amplification factor for each pixel in image D1*v* from the pixel value in the corresponding positions in the summed luminance and color difference image YC. The amplification factor is determined from the pixel value in the corresponding position in the summed luminance and color difference image YC; the amplification factor for pixel value D1*v*(11) is determined from pixel value YC(11), the amplification factor for pixel value D1*v*(12) is determined from pixel value YC(12), and in general, the amplification factor for pixel value D1*v*(xy) is determined from pixel value YC(xy); the result is output as amplification factor D203MA*v*.

The pixel value amplifying means 203MB amplifies the pixel values in the first intermediate image D1 in accordance with amplification factors D203MA. Since the first intermediate image D1 includes image D1*h* and image D1*v*, the pixel value amplifying means 203MB includes a horizontal pixel value amplifying means 203MB*h* for amplifying the pixel values in image D1*h* and a vertical pixel value amplifying means 203MB*v* for amplifying the pixel values in image D1*v*. The horizontal pixel value amplifying means 203MB*h* outputs an image D203MB*h* obtained by amplifying the pixel values in image D1*h* in accordance with amplification factors D203MA*h*, and the vertical pixel value amplifying means 203MB*v* outputs an image D203MB*v* obtained by amplifying the pixel values in image D1*v* in accordance with amplification factors D203MA*v*. Image D203MB*h* and image D203MB*v* are output from the pixel value amplifying means 203MB as image D203MB.

Image D203MB is output from the first intermediate image processing means 203M as intermediate image D203M. Intermediate image D203M includes an image D203M*h* corresponding to image D203MB*h* and an image D203M*v* corresponding to image D203MB*v*.

The first intermediate image processing means 203M operates as described above.

Next the operation of the second intermediate image processing means 203H will be described. A comparison of FIGS. 28 and 29 indicates that the second intermediate image processing means has the same structure as the first intermediate image processing means except that the input signals are the summed luminance and color difference image YC and intermediate image D2, and the intermediate image D203H output by the second intermediate image processing means 203H is obtained by performing, on intermediate image D2, the same processing as performed on intermediate image D1 by the first intermediate image processing means 203M. Since the details of the operation of the second intermediate image processing means 203H are clear from the detailed description of the operation of the first intermediate image processing means 203M given above, a description of the detailed operation of the second intermediate image processing means 203H will be omitted.

Finally the operation of the adding means 204 will be described. The adding means 204 generates an output luminance image YOUT by adding the input luminance image YIN, intermediate image D203M, and intermediate image D203H together. The output image IMGOUT comprising the output luminance image YOUT of the adding means 204 and the output CR image CROUT and the output CB image CBOUT are output from the image processing apparatus as the final output image.

Intermediate image D203M includes image D203M*h* and image D203M*v*, and intermediate image D203H includes image D203H*h* and image D203H*v*, so to add the input luminance image YIN, intermediate image D203M, and intermediate image D203H together means to add images D203M*h*, D203M*v*, D203H*h*, and D203H*v* to the input luminance image YIN.

The addition in the adding means 204 is not limited to simple addition; weighted addition may be performed. That is, images D203M*h*, D203M*v*, D203H*h*, and D203H*v* may be amplified by different amplification factors before being added to the input luminance image YIN.

An example in which the image processing apparatus in this embodiment is utilized as part of an image display apparatus will be described below. The description will clarify the effects of the image processing apparatus in this embodiment.

FIG. 31 illustrates an image display apparatus utilizing the image processing apparatus according to this embodiment. In the illustrated image display apparatus, an image corresponding to the original image IMGORG is displayed on a monitor U203.

If the image size of the original image IMGORG is smaller than the image size of the monitor U203, the color image enlarging means U201 outputs an image IMGU201 obtained by enlarging the original image IMGORG. The image can be enlarged by the bicubic method, for example.

The image processing apparatus U202 in this embodiment receives image IMGU201 as an input image IMGIN and outputs an image DU202 obtained by performing the processing described above on the input image IMGIN. Image DU202 is displayed on the monitor U203.

Since image DU202 includes a luminance signal (Y) and color difference signals (Cr, Cb) (sometimes referred to as YCbCr signals below), they are generally converted to red (R), green (G), and blue (B) color signals (sometimes referred to as RGB signals below) before the image is displayed on the monitor U203. Conversion between the YCbCr format and the RGB format is described in recommendation BT601 of the International Telecommunication Union (ITU) and elsewhere. Conversion from the RGB format to the YCbCr format is performed as follows:

$$Y = 0.299R + 0.587G + 0.114B$$

$$Cr = 0.500R - 0.419G - 0.081B$$

$$Cb = -0.169R - 0.331G + 0.500B \quad (8)$$

Conversion from the YCbCr format to the RGB format is performed as follows.

$$R = 1.000Y + 1.402Cr + 0.000Cb$$

$$G = 1.000Y - 0.714Cr - 0.344Cb$$

$$B = 1.000Y + 0.000Cr + 1.772Cb \quad (9)$$

The coefficients shown in expressions (8) and (9) are exemplary, and this embodiment is not limited thereto. If the input image has eight-bit data, the values of Cr and Cb are usually rounded off within the range from −127 to 128.

First the operation and effects of the color image enlarging means U201 will be described on the assumption that the number of pixels in the original image IMGORG is half of the number of pixels in the monitor U203 in both the horizontal and vertical directions.

The color image enlarging means U201 includes an image enlarging means U201Y for generating an image DU201Y by enlarging the image YORG representing the luminance component of the original image IMGORG, an image enlarging means U201CR for generating an image DU201CR by enlarging an image CRORG representing the Cr component, and an image enlarging means U201CB for generating an image DU201CB by enlarging an image CBORG representing the Cb component. The image enlarging means U201Y, image enlarging means U201CR, and image enlarging means U201CB can have the same structure and can operate in the same way as the image enlarging means U1 in the first embodiment, described with reference to FIG. 10, so a detailed description will be omitted.

As described in the first embodiment, by adding intermediate image D1 and intermediate image D2 to the input image DIN, image enhancement processing can be carried out.

Although the first and second intermediate images D1 and D2 are not added to the input image YIN in this embodiment, the effects that would be obtained by adding the first and second intermediate images will be described; then the effects of adding the third and fourth intermediate images D203M and D203H instead of the first and second intermediate images D1 and D2 will be described.

Figure 32:
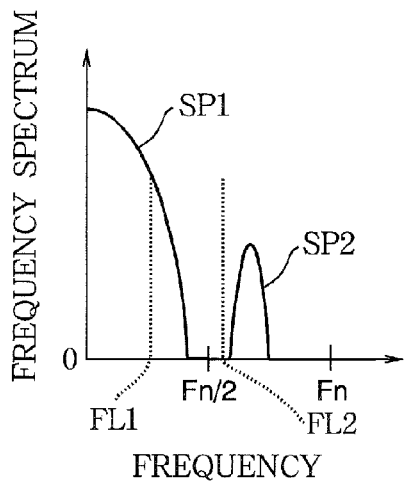
FIGS. 32(A) to 32(E) are diagrams showing frequency spectra and frequency responses to illustrate the operation of the first intermediate image generating means 201.
Figure 32:
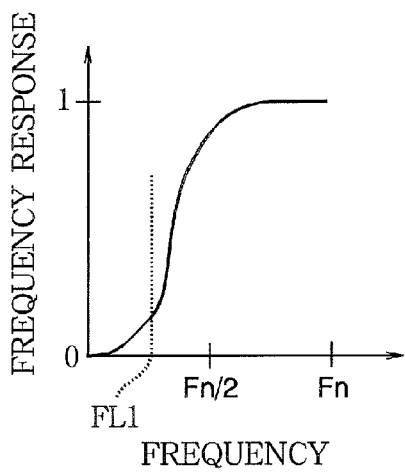
Figure 32:
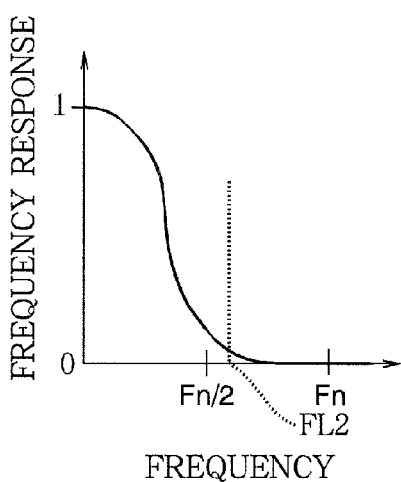
Figure 32:
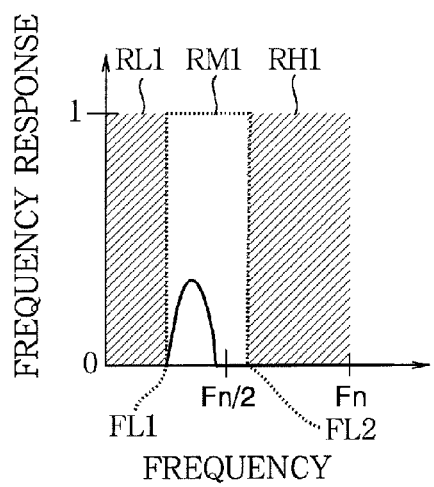
Figure 32E:
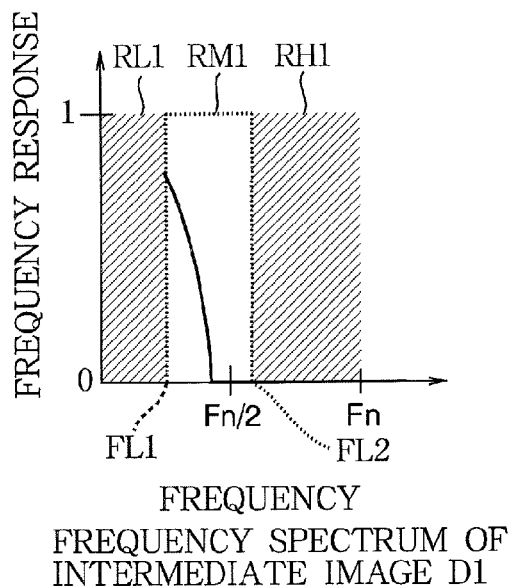

First, the effect of adding intermediate image D1 will be described. From a comparison with the first embodiment, it is clear that intermediate image D1 is obtained by excluding the fold-over component from the high-frequency component in the input luminance image YIN, and corresponds to the high-frequency component near the Nyquist frequency of the original image DORG, as shown in FIG. 32(E). The spectral intensity near the Nyquist frequency of the original image DORG is weakened by the enlargement processing in the color image enlarging means U201, as described with reference to FIG. 32(D). The spectral intensity weakened by the enlargement processing can be made up for by adding intermediate image D1. Since the fold-over component has been excluded from intermediate image D1, spurious signals such as overshoot, jaggies, and ringing are not enhanced.

Next the effect of adding intermediate image D2 will be described. A comparison with the first embodiment makes it clear that intermediate image D2 is the high-frequency component corresponding to sampling interval S1. Adding image D2 can supply a high-frequency component in the band above the Nyquist frequency of the original image DORG, so the perceived image resolution can be increased.

To summarize, by adding intermediate image D1 and image D2 to the input luminance image YIN, high-frequency components can be added without enhancing the fold-over component. Since information obtained from the luminance component is predominant in the image resolution perceived by the human eye, the processing described above can improve the perceived image resolution.

The addition of high-frequency components generated as described above to the input luminance image YIN can sharpen the image and improve its image quality, but excessive addition of high-frequency components can lower the image quality instead. A comparison with the first embodiment makes it clear that overshoot or undershoot can occur if the input luminance image YIN contains a step-edge-like change in luminance.

If overshoot occurs in the input luminance image YIN, the luminance signal increases more than necessary. Expression (9) indicates that if the value of the luminance signal (Y) increases, after conversion to the RGB format, the values of R, G, and B become large because the first term on the right-hand side of the expressions for R, G, and B increases.

Large values of R, G, B make the color approach white. Approaching white means that the color becomes pale. In areas that were nearly colorless to begin with, the added paleness is relatively unnoticeable, but if colors near a colored edge become pale, only the colors around the edge become pale, which looks unnatural.

Such deterioration in image quality is apt to occur, in other words, if the magnitude of the luminance added by intermediate image D1 or intermediate image D2 (the correction amount) becomes too large in a colored area. An adjustment to prevent the amount of correction due to intermediate image D1 or intermediate image D2 from becoming larger than necessary can therefore be considered.

In one conceivable method of keeping the correction amount from becoming larger than necessary, colored areas in which a large amount of correction is given by intermediate image D1 or intermediate image D2 are detected, and an appropriate gain is applied to decrease the amount of correction made by intermediate image D1 or intermediate image D2 in the detected part.

Whether an area is colored can be decided from its saturation (expressible as the square root of the sum of the squares of Cr and Cb). A colored area has large saturation values. The square root of the sum of the squares of Cr and Cb can be approximated by the sum of the absolute values of Cr and Cb. This is because an increase in the absolute value of Cr or Cb increases the square root of the sum of the squares of Cr and Cb values. Calculation of the sum of absolute values is simpler than calculation of the square root of the sum of squares, so the circuit size can be smaller.

Whether the amount of correction given by intermediate image D1 or intermediate image D2 will be large can be determined to some extent from the pixel values in the input luminance image YIN. The reason will be described below.

Intermediate image D1 is generated by performing high-pass filter processing and then performing low-pass filter processing on the input luminance image YIN. The high-pass filter processing corresponds to subtraction of a local mean value from the value of each pixel in the input luminance image YIN. If a pixel of interest in the input luminance image YIN has a large pixel value, there is a high probability that the output value given to the pixel after high-pass filter processing will also have a large positive value.

The low-pass filter processing is equivalent to obtaining a local mean value of the input data. Accordingly, if the high-pass filter processing outputs a large positive value, there is a high probability that the output value of the low-pass filter processing will also have a large positive value.

Intermediate image D2 is obtained by performing non-linear processing in the non-linear processing means 2A and then high-pass filter processing in the high-frequency component image generating means 2B on intermediate image D1. Since the non-linear processing means 2A amplifies intermediate image D1 only around zero-crossing points, if intermediate image D1 has a large positive value, it can be basically supposed that the image D2A output by the non-linear processing means 2A will also have a large positive value. If image D2A has a large positive value, there is a high probability that the intermediate image D2 obtained as a result of high-pass filter processing of image D2A will also have a large positive value.

To summarize the above, if the input luminance image YIN has a large pixel value, there is a high probability that the pixel values in intermediate image D1 and intermediate D2 will have large positive values. In other words, if the input luminance image YIN has a large pixel value, it can be concluded to some extent that the amount of correction given by intermediate image D1 or intermediate image D2 will be large.

For the reasons described above, it can be considered that if a pixel value in the input luminance image YIN, the absolute value of a pixel value in the input CR image CRIN, or the absolute value of a pixel value in the input CB image CBIN is large, the corresponding pixel may be corrected by such a large amount as to produce a pale color when the converted to the RGB format.

Moreover, if a pixel value in the input luminance image YIN, the absolute value of a pixel value in the input CR image CRIN, or the absolute value of a pixel value in the input CB image CBIN is large, the weighted sum will also have a large value.

This embodiment prevents colors near a colored edge from becoming pale by performing weighted addition of the pixel value in the input luminance image YIN, the absolute value of the pixel value in the input CR image CRIN, and the absolute value of the pixel value in the input CB image CBIN, according to expression (7) to generate the summed luminance and color difference image YC, and decreasing the amplification factors applied to intermediate image D1 or intermediate image D2 as the pixel value in the summed luminance and color difference image YC increases.

This relationship between the amplification factor (GAIN) and the pixel value (L) in the summed luminance and color difference image YC is expressed as, for example:

[Mathematical expression 7]

$$GAIN = \begin{cases} 0 & \text{if } (G' < 0) \\ G' & \text{if } (0 \leq G') \end{cases} \quad (10)$$

where $$G' = \begin{cases} B - k1 \cdot L & \text{if } (0 \leq L < A1) \\ B - k1 \cdot A1 - k2\left(\dfrac{L-}{A1}\right) & \text{if } (A1 \leq L < A2) \\ B - k1 \cdot A1 - k2\left(\dfrac{A2-}{A1}\right) - k3\left(\dfrac{L-}{A2}\right) & \text{if } (A2 \leq L) \end{cases}$$

Figure 33:
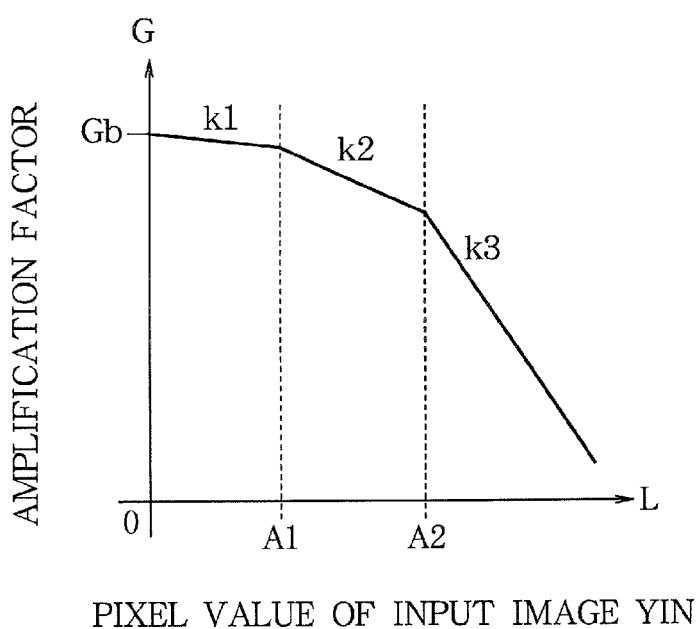
FIG. 33 is a diagram showing the relationship between the pixel values L in the summed luminance and color difference image YC and the amplification factors in the first intermediate image processing means 203M and second intermediate image processing means 203H.

FIG. 33 is a diagram showing the relationship between the amplification factor (GAIN) given by expression (10) and the pixel value (L) in the summed luminance and color difference image YC. The amplification factor takes a certain value B if the pixel value in the summed luminance and color difference image YC is 0, and decreases by a factor k1 as the pixel value varies from 0 to a value A1, then by a factor k2 as the pixel value varies from value A1 to a value A2, and then by a factor k3 when the pixel value exceeds value A2.

In short, a process that prevents colors near a colored edge from becoming pale can be carried out by determining amplification factors D203MA or amplification factors D203HA on the basis of a monotonically decreasing function such that the amplification factor decreases as the pixel value in the summed luminance and color difference image YC increases, as indicated by FIG. 33 or expression (10).

As described above, the image processing apparatus in the third embodiment can perform image enhancement processing while preventing colors near a colored edge from becoming pale. Pale colors near a colored edge would be perceived as unnatural by the human eye, so the image processing apparatus in the third embodiment is highly advantageous in terms of visual characteristics.

In the image processing apparatus in the third embodiment, although the first intermediate image processing means 203M and second intermediate image processing means 203H determine amplification factors for intermediate image D1 and intermediate image D2 in order to prevent colors near colored edges from becoming pale, the only necessary information is the weighted sums of the pixel values in the input luminance image YIN, the absolute values of the pixel values in the input CR image CRIN, and the absolute values of the pixel values in the input CB image CBIN. Therefore, the amplification factors can be determined with a simple circuit, and the circuit size is only slightly increased.

The relationship between the amplification factors determined by the first intermediate image processing means 203M and second intermediate image processing means 203H and the pixel value in the summed luminance and color difference image YC is not limited to the relationship described in this embodiment; it need only be a relationship in which the amplification factor decreases as the pixel value in the summed luminance and color difference image YC increases.

Fourth Embodiment

Figure 34:
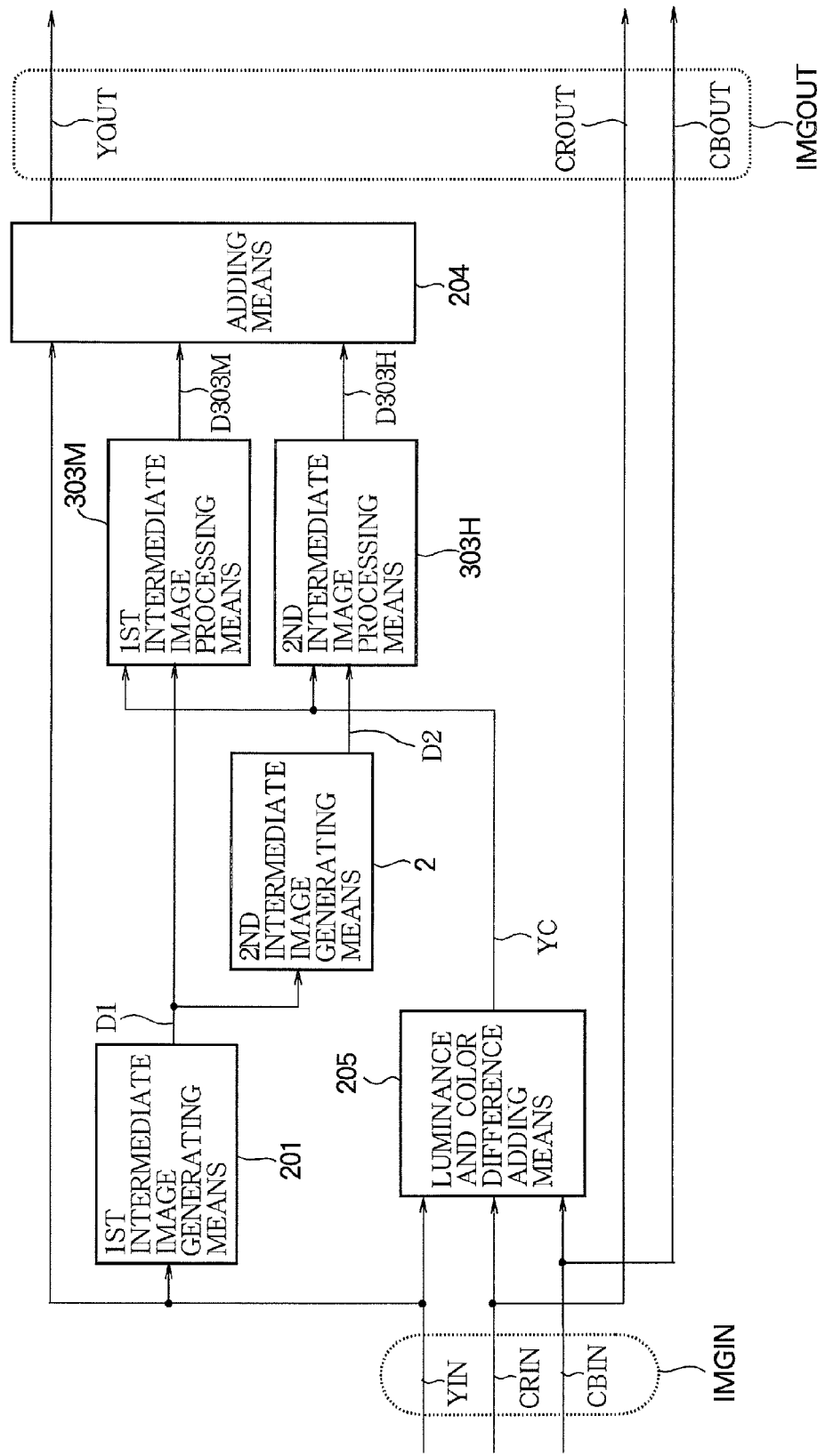
FIG. 34 is a block diagram illustrating the structure of an image processing apparatus according to a fourth embodiment of the invention.

FIG. 34 is a diagram illustrating an exemplary structure of an image processing apparatus according to a fourth embodiment of the invention.

The illustrated image processing apparatus receives an input image IMGIN and outputs an output image IMGOUT, as described in the third embodiment. The input image IMGIN is a color image and includes an input luminance image YIN, an input CR image CRIN, and an input CB image CBIN. The output image IMGOUT is also a color image and includes an output luminance image YOUT, an output CR image CROUT, and an output CB image CBOUT.

The image processing apparatus in the fourth embodiment includes a first intermediate image generating means 201, a second intermediate image generating means 2, a luminance and color difference adding means 205, a first intermediate image processing means 303M, a second intermediate image processing means 303H, and an adding means 204.

The first intermediate image generating means 201, second intermediate image generating means 2, luminance and color difference adding means 205, and adding means 204 have the same structure and operate in the same way as the means having the same reference characters in the third embodiment.

The first intermediate image processing means 303M generates an intermediate image D303M (the third intermediate image) by carrying out certain processing, which will be described later, on intermediate image D1.

The second intermediate image processing means 303H generates an intermediate image D303H (the fourth intermediate image) by carrying out certain processing, which will be described later, on intermediate image D2.

The image processing apparatus illustrated in this embodiment processes only the luminance component. While the image output by the adding means 204 is output as the output luminance image YOUT, the input CR image CRIN is output directly as the output CR image CROUT, and the input CB image CBIN is output directly as the output CB image CBOUT.

Figure 35:
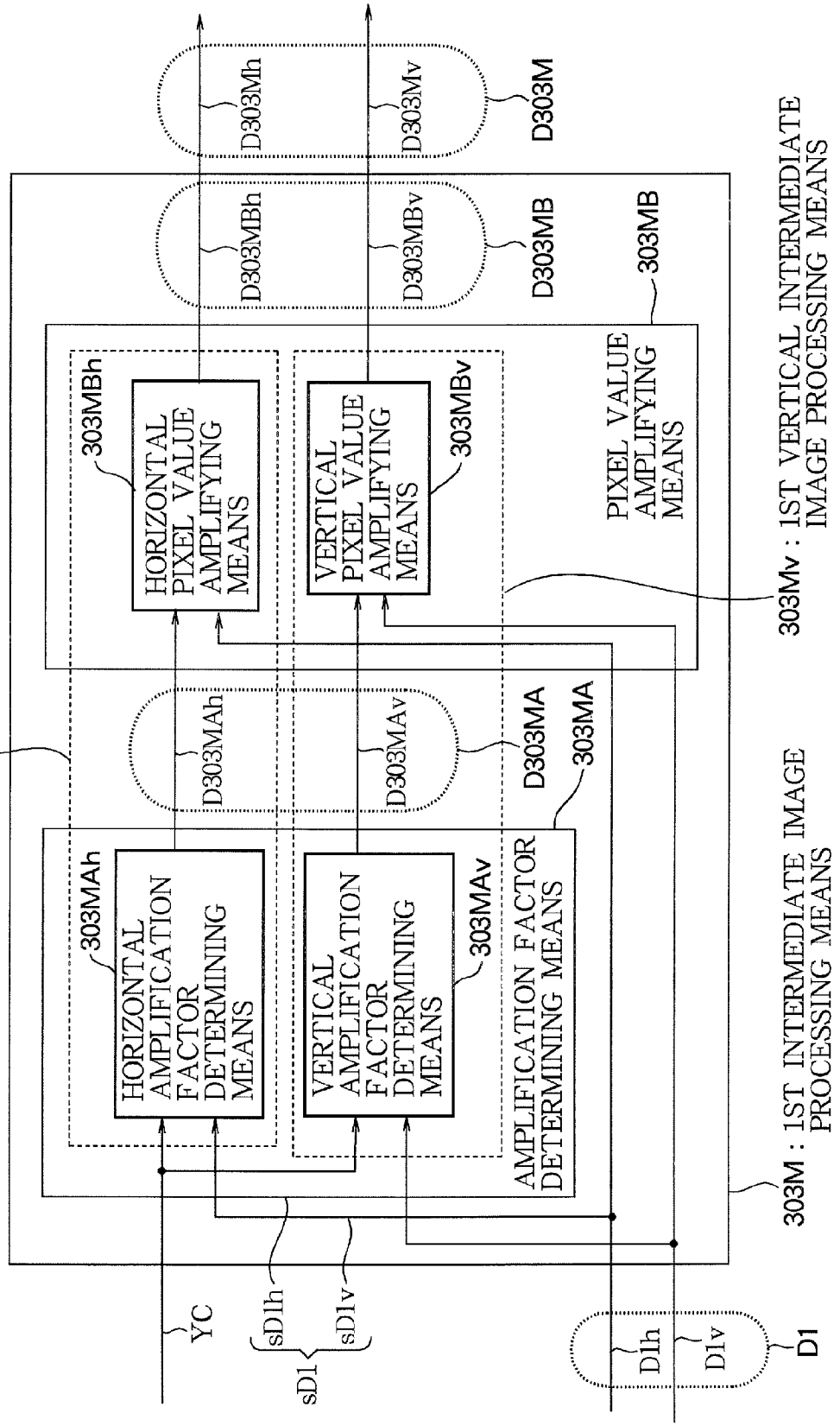
FIG. 35 is a block diagram illustrating an exemplary structure of the first intermediate image processing means 303M in FIG. 34.

FIG. 35 is a diagram illustrating an exemplary structure of the first intermediate image processing means 303M; the illustrated first intermediate image processing means 303M includes an amplification factor determining means 303MA and a pixel value amplifying means 303MB. The amplification factor determining means 303MA determines amplification factors D303MA on the basis of pixel values in a summed luminance and color difference image YC, which will be described later. The pixel value amplifying means 303MB amplifies pixel values in intermediate image D1 in accordance with the amplification factors D303MA determined by the amplification factor determining means 303MA, and outputs the result as an intermediate image D303MB. The first intermediate image processing means 303M outputs intermediate image D303MB as intermediate image D303M.

The amplification factor determining means 303MA includes a horizontal amplification factor determining means 303MAh and a vertical amplification factor determining means 303MAv, and the pixel value amplifying means 303MB includes a horizontal pixel value amplifying means 303MBh and a vertical pixel value amplifying means 303MBv. The horizontal amplification factor determining means 303MAh and the horizontal pixel value amplifying means 303MBh constitute a first horizontal intermediate image processing means 303Mh; the vertical amplification factor determining means 303MAv and the vertical pixel value amplifying means 303MBv constitute a first vertical intermediate image processing means 303Mv.

Figure 36:
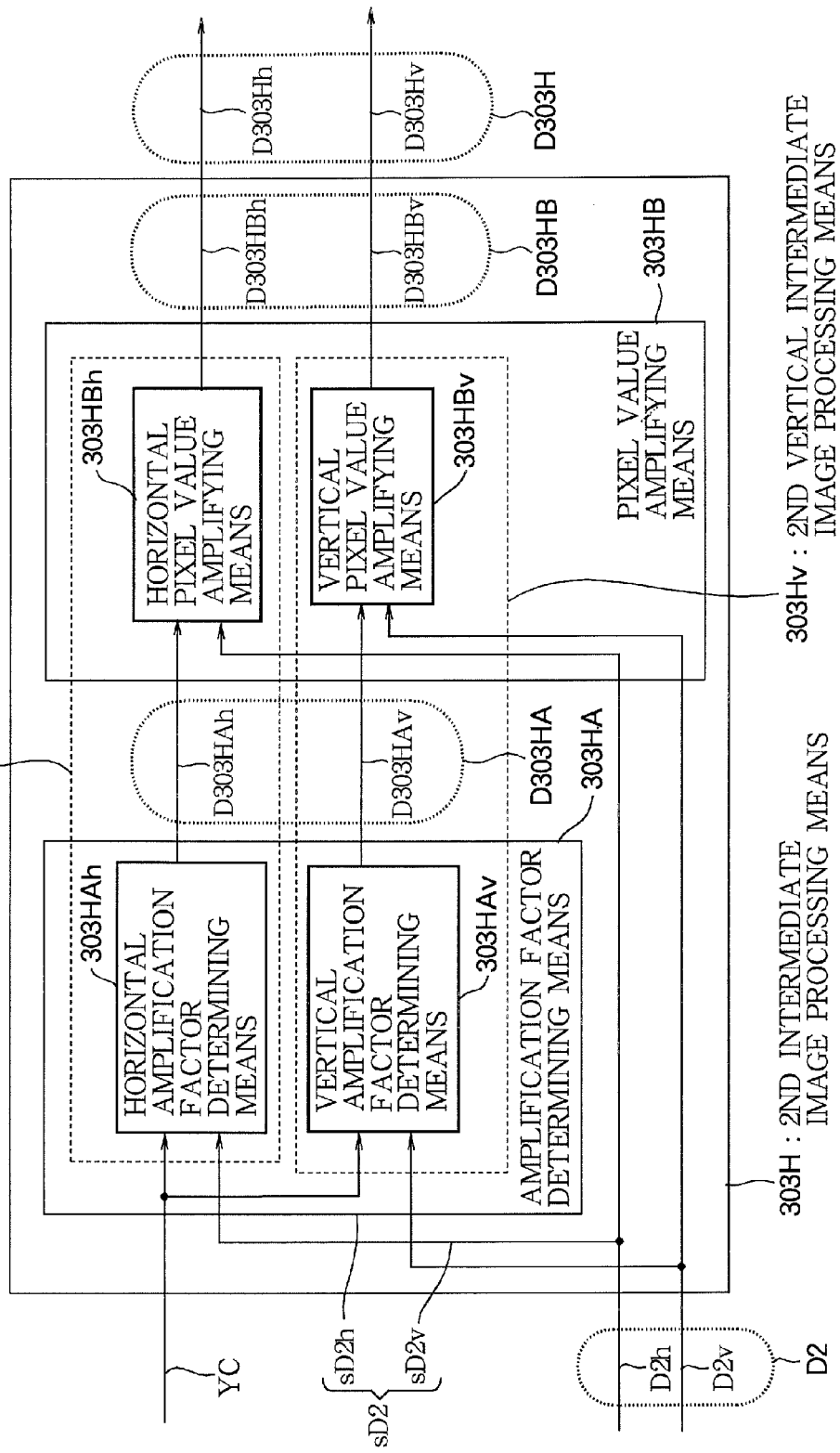
FIG. 36 is a block diagram illustrating an exemplary structure of the second intermediate image processing means 303H in FIG. 34.

FIG. 36 is a diagram illustrating an exemplary structure of the second intermediate image processing means 303H. The illustrated second intermediate image processing means 303H includes an amplification factor determining means 303HA and a pixel value amplifying means 303HB. The amplification factor determining means 303HA determines amplification factors D303HA on the basis of the pixel values in the summed luminance and color difference image YC, which will be described later.

The pixel value amplifying means 303HB amplifies the pixel values in intermediate image D2 in accordance with the amplification factors D303HA determined by the amplification factor determining means 303HA, and outputs the result as an intermediate image D303HB. The second intermediate image processing means 303H outputs intermediate image D303HB as intermediate image D303H.

The amplification factor determining means 303HA includes a horizontal amplification factor determining means 303HAh and a vertical amplification factor determining means 303HAv, and the pixel value amplifying means 303HB includes a horizontal pixel value amplifying means 303HBh and a vertical pixel value amplifying means 303HBv. The horizontal amplification factor determining means 303HAh and horizontal pixel value amplifying means 303HBh constitute a second horizontal intermediate image processing means 303Hh; the vertical amplification factor determining means 303HAv and vertical pixel value amplifying means 303HBv constitute a second vertical intermediate image processing means 303Hv.

The detailed operation of the image processing apparatus according to the fourth embodiment will be described below.

The detailed operation of the first intermediate image generating means 201, the second intermediate image generating means 2, the luminance and color difference adding means 205, and the adding means 204 is the same as in the third embodiment, so descriptions will be omitted.

First, the detailed operation of the first intermediate image processing means 303M will be described.

In the first intermediate image processing means 303M, the amplification factor determining means 303MA determines amplification factors D303MA from the pixel values in the summed luminance and color difference image YC and the signs sD1 of the pixel values in intermediate image D1. Since the first intermediate image D1 includes an image D1$h$ and an image D1$v$, the signs sD1 include a sign sD1$h$ representing the sign in image D1$h$ and a sign sD1$v$ representing the sign in image D1$v$. As described earlier, the pixel values in the first intermediate image D1 are amplified in accordance with amplification factors D303MA. Since the first intermediate image D1 includes image D1$h$ and image D1$v$, amplification factors D303MAh for image D1$h$ and amplification factors D303MAv for image D1$v$ are determined as amplification factors D303MA. The amplification factor determining means 303MA includes a horizontal amplification factor determining means 303MAh and a vertical amplification factor determining means 303MAv. The horizontal amplification factor determining means 303MAh determines amplification factors D303MAh on the basis of the pixel values in the summed luminance and color difference image YC and the signs sD1$h$ of the pixel values in intermediate image D1$h$; the vertical amplification factor determining means 303MAv determines amplification factors D303MAv on the basis of the pixel values in the summed luminance and color difference image YC and the signs sD1$v$ of the pixel values in intermediate image D1$v$; amplification factors D303MAh and amplification factors D303MAv are output from the amplification factor determining means 303MA as amplification factors D303MA.

The operation of the horizontal amplification factor determining means 303MAh and the vertical amplification factor determining means 303MAv will now be described in further detail.

Figure 37:
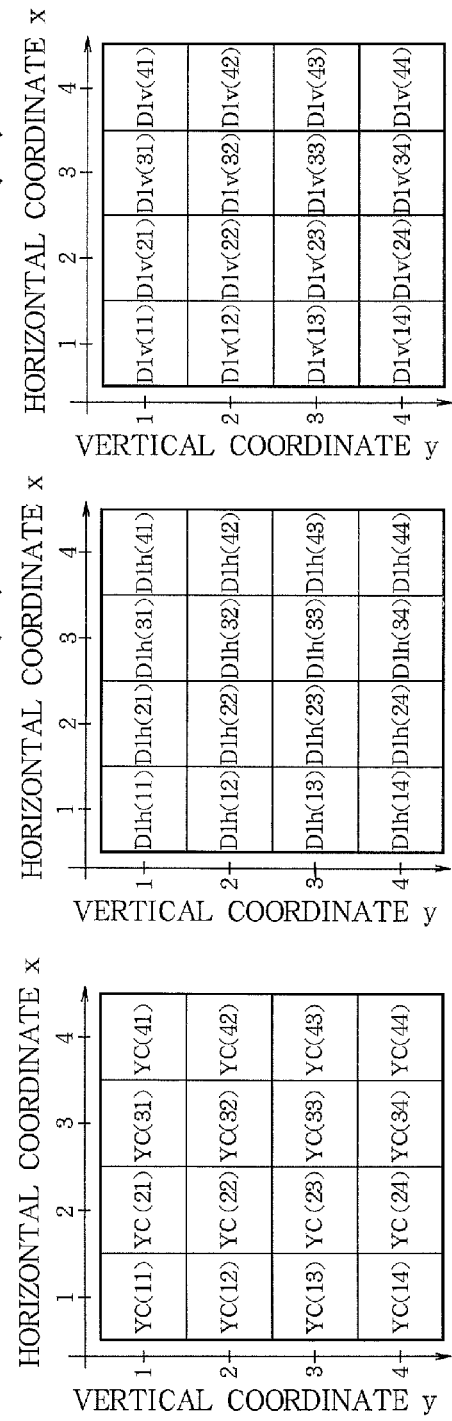
FIGS. 37(A) to 37(E) are diagrams showing the arrangement of pixels in the summed luminance and color difference image YC, image D1h, and image D1v and the arrangement of information indicating the reference characters of the pixels.

FIGS. 37(A) and 37(E) are diagrams representing the summed luminance and color difference image YC, image D1$h$, image D1$v$, the sign sD1$h$ of the pixel value in intermediate image D1$h$, and the sign sD1$v$ of the pixel value in image D1$v$: FIG. 37(A) represents the summed luminance and color difference image YC; FIG. 37(B) represents image D1$h$; FIG. 37(C) represents image D1$v$; FIG. 37(D) represents sign sD1$h$; FIG. 37(E) represents sign sD1$v$. The horizontal and vertical axes in FIGS. 37(A) and 37(E) correspond to the horizontal and vertical directions in the image and indicate coordinate values. The pixel value of the pixel in the summed luminance and color difference image YC in a position indicated by x on the horizontal axis and y on the vertical axis is denoted YC(xy). In image D1$h$, the pixel value of the pixel in the position indicated by x on the horizontal axis and y on the vertical axis is denoted D1$h$(xy). In image D1$v$, the pixel value of the pixel in the position indicated by x on the horizontal axis and y on the vertical axis is denoted D1$v$(xy). In the sign sD1$h$ of a pixel value in image D1$h$, the sign of the pixel in the position indicated by x on the horizontal axis and y on the vertical axis is denoted sD1$h$(xy). In the sign sD1$v$ of a pixel value in image D1$v$, the sign of the pixel in the position indicated by x on the horizontal axis and y on the vertical axis is denoted sD1$v$(xy).

The horizontal amplification factor determining means 303MAh determines an amplification factor for each pixel in image D1$h$ from the pixel value in the corresponding position in the summed luminance and color difference image YC and the sign of the pixel value in the corresponding position in image D1$h$. The amplification factor is determined from the value of the pixel with the same coordinates in the summed luminance and color difference image YC and the sign of the pixel value with the same coordinates in image D1$h$; the amplification factor for pixel value D1$h$(11) is determined from pixel value YC(11) and sign sD1$h$(11), the amplification factor for pixel value D1$h$(12) is determined from pixel value YC(12) and sign sD1$h$(12), and in general, the amplification factor for pixel value D1$h$(xy) is determined from pixel value YC(xy) and sign sD1$h$(xy); the result is output as amplification factor D303MAh.

The vertical amplification factor determining means 303MAv determines an amplification factor for each pixel in image D1$v$ from the pixel value in the corresponding position in the summed luminance and color difference image YC and the sign of the pixel value in the corresponding position in image D1v. The amplification factor is determined from the value of the pixel with the same coordinates in the summed luminance and color difference image YC and the sign of the value of the pixel with the same coordinates in image D1v; the amplification factor for pixel value D1v(11) is determined from pixel value YC(11) and sign sD1v(11), the amplification factor for pixel value D1v(12) is determined from pixel value YC(12) and sign sD1v(12), and in general, the amplification factor for pixel value D1v(xy) is determined from pixel value YC(xy) and sign sD1v(xy); the result is output as amplification factor D303MAv.

The pixel value amplifying means 303MB amplifies the pixel values in the first intermediate image D1 in accordance with amplification factors D303MA. Since the first intermediate image D1 includes image D1h and image D1v, the pixel value amplifying means 303MB includes a horizontal pixel value amplifying means 303MBh for amplifying the pixel values in image D1h and a vertical pixel value amplifying means 303MBv for amplifying the pixel values in image D1v. The horizontal pixel value amplifying means 303MBh outputs an image D303MBh obtained by amplifying the pixel values in image D1h in accordance with amplification factors D303MAh, and the vertical pixel value amplifying means 303MBv outputs an image D303MBv obtained by amplifying the pixel values in image D1v in accordance with amplification factors D303MAv. Image D303MBh and image D303MBv are output from the pixel value amplifying means 303MB as image D303MB.

Image D303MB is output from the first intermediate image processing means 303M as intermediate image D303M. Intermediate image D303M includes an image D303Mh corresponding to image D303MBh and an image D303Mv corresponding to image D303MBv.

The first intermediate image processing means 303M operates as described above.

Next the operation of the second intermediate image processing means 303H will be described. A comparison of FIGS. 35 and 36 indicates that the second intermediate image processing means has the same structure as the first intermediate image processing means except that the input signals are the summed luminance and color difference image YC and intermediate image D2, and the intermediate image D303H output by the second intermediate image processing means 303H is obtained by performing, on intermediate image D2, the same processing as performed on intermediate image D1 by the first intermediate image processing means 303M. Since the details of the operation of the second intermediate image processing means 303H are clear from the detailed description of the operation of the first intermediate image processing means 303M given above, a description of the detailed operation of the second intermediate image processing means 303H will be omitted.

An example in which the image processing apparatus in this embodiment is utilized as part of an image display apparatus will be described below. The image processing apparatus in this embodiment can be utilized as part of, for example, the image display apparatus illustrated in FIG. 31.

By the adding of intermediate image D1 and intermediate image D2 to the input luminance image YIN, high-frequency components can be added without enhancing the fold-over component, and the perceived image resolution can be improved, as indicated in the description of the third embodiment.

The addition of high-frequency components generated as described above to the input image can sharpen the image and improve its image quality, but excessive addition of high-frequency components can lower the image quality instead by causing overshoot or undershoot to occur in positions where the input luminance image YIN contains a step-edge-like change.

Overshoot occurs when the sign of the pixel value in intermediate image D1 or intermediate image D2 is positive. Undershoot occurs when the sign of the pixel value in intermediate image D1 or intermediate image D2 is negative.

Problems that could be caused by the occurrence of overshoot and the occurrence of undershoot will be considered separately below, and how this embodiment prevents each problem from occurring will also be described.

First, overshoot will be described.

If overshoot occurs in the input luminance image YIN, the luminance signal increases more than necessary. Expression (9) indicates that if the value of the luminance signal (Y) increases, after conversion to the RGB format, the values of R, G, and B become large because the first term on the right-hand side of the expressions for R, G, and B increases.

Large values of R, G, B make the color approach white. Approaching white means that the color becomes pale. In areas that were nearly colorless to begin with, the added paleness is relatively unnoticeable, but if colors near a colored edge become pale, only the colors around the edge become pale, which looks unnatural.

Such deterioration in image quality is apt to occur, in other words, if the magnitude of the luminance added by intermediate image D1 or intermediate image D2 (the correction amount) becomes too large in a colored area when the sign of the pixel value in intermediate image D1 or intermediate image D2 is positive. An adjustment to prevent the amount of correction due to intermediate image D1 or intermediate image D2 from becoming larger than necessary in a colored area can therefore be considered.

In one conceivable method of keeping the correction amount from becoming larger than necessary, colored areas in which a large amount of correction is given by intermediate image D1 or intermediate image D2 are detected when the sign of the pixel value in intermediate image D1 or intermediate image D2 is positive, and an appropriate gain is applied to decrease the amount of correction made by intermediate image D1 or intermediate image D2 in the detected part.

Whether an area is colored can be decided from its saturation (expressible as the square root of the sum of the squares of Cr and Cb). A colored area has large saturation values. The square root of the sum of the squares of Cr and Cb can be approximated by the sum of the absolute values of Cr and Cb. This is because an increase in the absolute value of Cr or Cb increases the square root of the sum of the squares of Cr and Cb values. Calculation of the sum of absolute values is simpler than calculation of the square root of the sum of squares, so the circuit size can be smaller.

Whether the amount of correction given by intermediate image D1 or intermediate image D2 will be large can be determined to some extent from the pixel values in the input luminance image YIN. The reason will be described below.

Intermediate image D1 is generated by performing high-pass filter processing and then performing low-pass filter processing on the input luminance image YIN. The low-pass filter processing is equivalent to obtaining a local mean value of the input data. Accordingly, if the high-pass filter processing outputs a large positive value, there is a high probability that the output value of the low-pass filter processing will also have a large positive value, and the amount of correction given by intermediate image D1 is likely to have a large value.

The high-pass filter processing corresponds to subtraction of a local mean value from the value of each pixel in the input luminance image YIN. If a pixel of interest in the input luminance image YIN has a large pixel value and if pixels in its vicinity have small pixel values, the output value given to the pixel after high-pass filter processing will also have a large positive value.

Conversely, if a pixel of interest in the input luminance image YIN has a small pixel value, the output value after high-pass filter processing will not have a large positive value.

If a pixel of interest in the input luminance image YIN has a large pixel value, there is a high probability that the output value given to the pixel after high-pass filter processing will also have a large positive value.

The low-pass filter processing is equivalent to obtaining a local mean value of the input data. Accordingly, if the high-pass filter processing outputs a large positive value, there is a high probability that the output value of the low-pass filter processing will also have a large positive value.

To summarize the above, if a pixel of interest in the input luminance image YIN has a large pixel value, there is a high probability that the amount of correction given by intermediate image D1 will also have a large value.

Intermediate image D2 is obtained by performing non-linear processing in the non-linear processing means 2A and then high-pass filter processing in the high-frequency component image generating means 2B on intermediate image D1. Since the non-linear processing means 2A amplifies intermediate image D1 only around zero-crossing points, if intermediate image D1 has a large positive value, it can be basically supposed that the image D2A output by the non-linear processing means 2A will also have a large positive value. If image D2A has a large positive value, there is a high probability that the intermediate image D2 obtained as a result of high-pass filter processing of image D2A will also have a large positive value.

To summarize the above, if the input luminance image YIN has a large pixel value, there is a high probability that the pixel values in intermediate image D1 and intermediate image D2 will have large positive values. In other words, if the input luminance image YIN has a large pixel value, it can be concluded to some extent that the amount of correction given by intermediate image D1 or intermediate image D2 will be large.

For the reasons described above, it can be supposed that if a pixel value in the input luminance image YIN, the absolute value of a pixel value in the input CR image CRIN, or the absolute value of a pixel value in the input CB image CBIN is large, the corresponding pixel may be corrected by such a large amount as to produce a pale color when converted to the RGB format.

Moreover, if a pixel value in the input luminance image YIN, the absolute value of a pixel value in the input CR image CRIN, or the absolute value of a pixel value in the input CB image CBIN is large, the weighted sum will also have a large value.

This embodiment prevents colors near a colored edge from becoming pale by performing weighted addition of the pixel value in the input luminance image YIN, the absolute value of the pixel value in the input CR image CRIN, and the absolute value of the pixel value in the input CB image CBIN according to expression (7) to generate the summed luminance and color difference image YC, and decreasing the amplification factors applied to intermediate image D1 or intermediate image D2 as the pixel value in the summed luminance and color difference image YC increases when the sign of the pixel value in intermediate image D1 or intermediate image D2 is positive.

This relationship between the amplification factor (GAIN) and the pixel values (L) of the summed luminance and color difference image YC is expressed as, for example:

[Mathematical expression 8]

$$\text{GAIN} = \begin{cases} 0 & \text{if } (G' < 0) \\ G' & \text{if } (0 \le G') \end{cases} \quad (11)$$

where $$G' = \begin{cases} pB - pk1 \cdot L & \text{if } (0 \le L < pA1) \\ pB - pk1 \cdot pA1 - pk2\left(\dfrac{L-}{pA1}\right) & \text{if } (pA1 \le L < pA2) \\ pB - pk1 \cdot pA1 - pk2\left(\dfrac{pA2-}{pA1}\right) - pk3\left(\dfrac{L-}{pA2}\right) & \text{if } (pA2 \le L) \end{cases}$$

Figure 38:
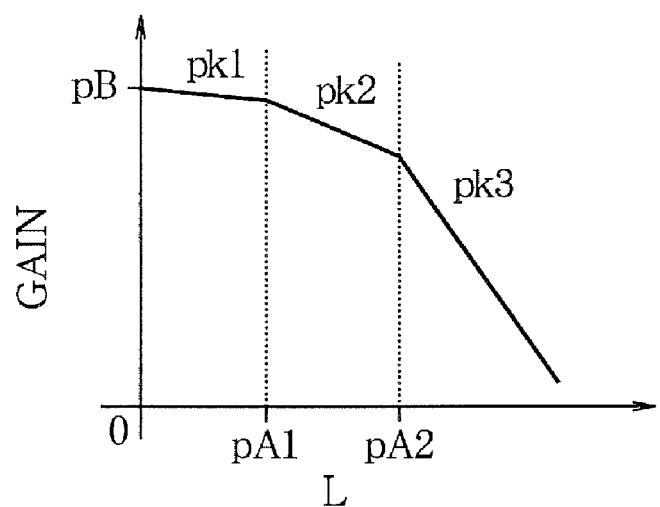
FIGS. 38(A) and 38(B) are diagrams showing the relationship between the pixel values L of the summed luminance and color difference image YC and the amplification factors in the first intermediate image processing means 303M and second intermediate image processing means 303H.
Figure 38:
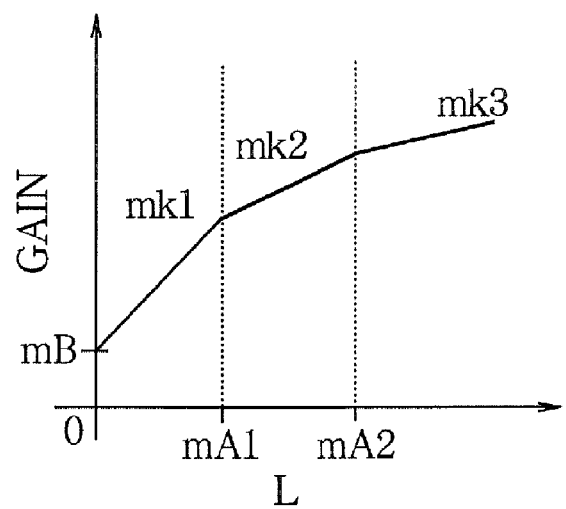

FIG. 38(A) is a diagram showing the relationship between the amplification factor (GAIN) and the pixel value (L) in the summed luminance and color difference image YC, given by expression (11). The amplification factor takes a certain value pB if the pixel value in the summed luminance and color difference image YC is 0, decreases by a factor pk1 as the pixel value varies from 0 to a value pA1, decreases by a factor pk2 as the pixel value varies from pA1 to a value pA2, then decreases by a factor pk3 when the pixel value exceeds value pA2.

In short, a process that prevents colors near a colored edge from becoming pale can be carried out by determining amplification factors D303MA or amplification factors D303HA on the basis of a monotonically decreasing function such that the amplification factor decreases as the pixel value in the summed luminance and color difference image YC increases, as indicated in FIG. 38(A) or expression (11).

Next undershoot will be described.

If undershoot occurs in the input luminance image YIN, the luminance signal decreases more than necessary. Expression (9) indicates that if the value of the luminance signal (Y) decreases, after conversion to the RGB format, the values of R, G, and B become small because the first term on the right-hand side of the expressions for R, G, and B decreases.

Small values of R, G, B make the color approach black. If colors near an edge become black, a false black border, which looks unnatural, appears around the edge.

Such deterioration in image quality is apt to occur, in other words, if the magnitude of the luminance subtracted by intermediate image D1 or intermediate image D2 (the correction amount) becomes too large when the sign of the pixel value in intermediate image D1 or intermediate image D2 is negative. An adjustment to prevent the amount of correction from becoming larger than necessary should therefore be considered if the sign of the pixel value in intermediate image D1 or intermediate image D2 is negative.

In one conceivable method of keeping the correction amount from becoming larger than necessary, if the sign of the pixel value in intermediate image D1 or intermediate image D2 is negative, areas in which a large amount of correction is given are detected, and an appropriate gain is applied to decrease the amount of correction made by intermediate image D1 or intermediate image D2 in the detected part.

Whether the amount of correction given by intermediate image D1 or intermediate image D2 will be large (a negative value having a large absolute value) can be determined to some extent from the pixel values in the input luminance image YIN. The reason will be described below.

Intermediate image D1 is generated by performing high-pass filter processing and then performing low-pass filter processing on the input luminance image YIN. The high-pass filter processing corresponds to subtraction of a local mean value from the value of each pixel in the input luminance image YIN. If a pixel of interest in the input luminance image YIN has a small pixel value, there is a high probability that the output value given to the pixel after the high-pass filter processing will be a negative value having a large absolute value.

The low-pass filter processing is equivalent to obtaining a local mean value of the input data. Accordingly, if the high-pass filter processing outputs a negative value having a large absolute value, there is a high probability that the output value of the low-pass filter processing will also be a negative value having a large absolute value.

Intermediate image D2 is obtained by performing non-linear processing in the non-linear processing means 2A and then high-pass filter processing in the high-frequency component image generating means 2B on intermediate image D1. Since the non-linear processing means 2A amplifies intermediate image D1 only around zero-crossing points, if intermediate image D1 has a negative value with a large absolute value, it can be basically supposed that the image D2A output by the non-linear processing means 2A will also have a negative value with a large absolute value. If image D2A has a negative value with a large absolute value, there is a high probability that the intermediate image D2 obtained as a result of high-pass filter processing of image D2A will also have a negative value with a large absolute value.

To summarize the above, if the input luminance image YIN has a small pixel value, there is a high probability that the pixel value in intermediate image D1 or intermediate image D2 will also have a small negative value. In other words, if the input luminance image YIN has a small pixel value, it can be concluded to some extent that the amount of correction given by intermediate image D1 or intermediate image D2 will have a large value.

For the reasons described above, it can be supposed that if a pixel value in the input luminance image YIN is small, the corresponding pixel may be corrected by such a large amount as to produce a black color when converted to the RGB format.

This embodiment prevents a false border from appearing near the edge by decreasing the amplification factors applied to intermediate image D1 or intermediate image D2 as the pixel value in the summed luminance and color difference image YC, instead of the pixel value in the input luminance image YIN, decreases when the sign of the pixel value in intermediate image D1 or intermediate image D2 is negative.

This relationship between the amplification factor (GAIN) and the pixel value (L) in the summed luminance and color difference image YC is expressed as, for example:

[Mathematical expression 9]

$$\text{GAIN} = \begin{cases} 0 & \text{if } (G' < 0) \\ G' & \text{if } (0 \leq G') \end{cases} \quad (12)$$

where $$G' = \begin{cases} mB + mk1 \cdot L & \text{if } (0 \leq L < mA1) \\ mB + mk1 \cdot mA1 + mk2\left(\dfrac{L-}{mA1}\right) & \text{if } (mA1 \leq L < mA2) \\ mB + mk1 \cdot mA1 + mk2\left(\dfrac{mA2-}{mA1}\right) + mk3\left(\dfrac{L-}{mA2}\right) & \text{if } (mA2 \leq L) \end{cases}$$

FIG. 38(B) is a diagram showing the relationship between the amplification factor (GAIN) and the pixel value (L) in the summed luminance and color difference image YC, given by expression (12). The amplification factor takes a certain value mB if the pixel value in the summed luminance and color difference image YC is 0, and increases by a factor mk1 as the pixel value varies from 0 to a value mA1, by a factor mk2 as the pixel value varies from value mA1 to a value mA2, and then by a factor mk3 when the pixel value exceeds value mA2.

The process of preventing colors near a colorless edge from approaching black can be carried out by performing the processing described above. Since the absolute value of the pixel values in the input CR image CRIN and the absolute value of the pixel values in the input CB image CBIN are close to zero in a colorless area, the relationship in magnitude among the pixel values in the summed luminance and color difference image YC can be considered to express the relationship in magnitude among the pixel values in the input luminance image YIN directly. Therefore, using the summed luminance and color difference image YC instead of the input luminance image YIN near a colorless edge is reasonable.

Conversely, the absolute value of the pixel value in the input CR image CRIN and the absolute value of the pixel value in the input CB image CBIN can take large values near a colored edge, and the relationship in magnitude among the pixel values in the summed luminance and color difference image YC does not necessarily express the relationship in magnitude among the pixel values in the input luminance image YIN directly. If the absolute value of a pixel value in the input CR image CRIN or a pixel value in the input CB image CBIN is large when the pixel value in the input luminance image YIN is small, the pixel value in the summed luminance and color difference image YC becomes large while the pixel value in the input luminance image YIN is small.

Since low luminance implies a small absolute value of the color difference signals in many natural images, it is seldom that the absolute value of the pixel value in the input CR image CRIN or the pixel value in the input CB image CBIN is large while the pixel value in the input luminance image YIN is small. Therefore, controlling the amplification factors for intermediate image D1 or intermediate image D2 by using the pixel values in the summed luminance and color difference image YC instead of the pixel values in the input luminance image YIN can be considered to cause few practical problems.

In short, a process that prevents colors near an edge from approaching black can be carried out by determining amplification factors D303MA or amplification factors D303HA on the basis of a monotonically increasing function such that the amplification factor increases as the pixel value in the summed luminance and color difference image YC increases, as indicated in FIG. 38(B) or expression (12).

As described above, the image processing apparatus in the fourth embodiment can perform image enhancement processing while preventing colors near an edge from becoming pale or approaching black. Pale colors or colors approaching black near an edge would be perceived as unnatural by the human eye, so the image processing apparatus in the fourth embodiment is highly advantageous in terms of visual characteristics.

In the image processing apparatus in the fourth embodiment, although the first intermediate image processing means 303M and second intermediate image processing means 303H determine amplification factors for intermediate image D1 and intermediate image D2, the only necessary information is the weighted sums of the pixel values in the input luminance image YIN, the absolute values of the pixel values in the input CR image CRIN, the absolute values of the pixel values in the input CB image CBIN, and the sign of the pixel value in intermediate image D1 or intermediate image D2. Therefore, the amplification factors can be determined with a simple circuit, and the circuit size is only slightly increased.

For example, when expression (11) and expression (12) are compared, they differ only in the parameters used therein, such as coefficients and threshold values. That is, the amplification factor determining means 303MA or the pixel value amplifying means 303MB can be configured by a coefficient switching means for varying coefficients k1, k2, and k3, threshold values A1 and A2, and the value of a numerical value B responsive to the signs of the pixel values in intermediate image D1 or intermediate image D2 and a calculation means capable of calculating the following expression expressed by using the coefficients k1, k2, and k3, threshold values A1 and A2, and numerical value B:

[Mathematical expression 10]

$$GAIN = \begin{cases} 0 & \text{if } (G' < 0) \\ G' & \text{if } (0 \le G') \end{cases} \quad (13)$$

where $$G' = \begin{cases} B + k1 \cdot L & \text{if } (0 \le L < A1) \\ B + k1 \cdot A1 + k2(L - A1) & \text{if } (A1 \le L < A2) \\ B + k1 \cdot A1 + k2(A2 - A1) + k3(L - A2) & \text{if } (A2 \le L) \end{cases}$$

The switching means should select −pk1, −pA2, pA1, pA2, and pB when the sign of the pixel value is positive, and should select mk1, mk2, mk3, mA1, mA2, and mB when the sign of the pixel value is negative. The calculation expressed by expression (13) should be performed by using the selected values as k1, k2, k3, A1, A2, and B, respectively.

In the embodiment described above, the first intermediate image processing means 303M determines the amplification factors D303MA on the basis of the output YC of the luminance and color difference adding means 205 and the sign sD1 of the pixel values in the first intermediate image D1, and the second intermediate image processing means 303H determines the amplification factors D303HA on the basis of the output YC of the luminance and color difference adding means 205 and the sign sD2 of the pixel values in the second intermediate image D2, but only one of the first intermediate image processing means 303M and second intermediate image processing means 303H need determine the amplification factors by the method described above; the other may determine the amplification factors by a different method.

The relationship between the amplification factors determined by the first intermediate image processing means 303M and second intermediate image processing means 303H and the pixel value in the summed luminance and color difference image YC is not limited to the relationship described in this embodiment; it need only be a relationship in which the amplification factor decreases as the pixel value in the summed luminance and color difference image YC increases when the sign of intermediate image D1 or D2 is positive, and decreases as the pixel value in the summed luminance and color difference image YC decreases when the sign of intermediate image D1 or D2 is negative.

Fifth Embodiment

Figure 39:
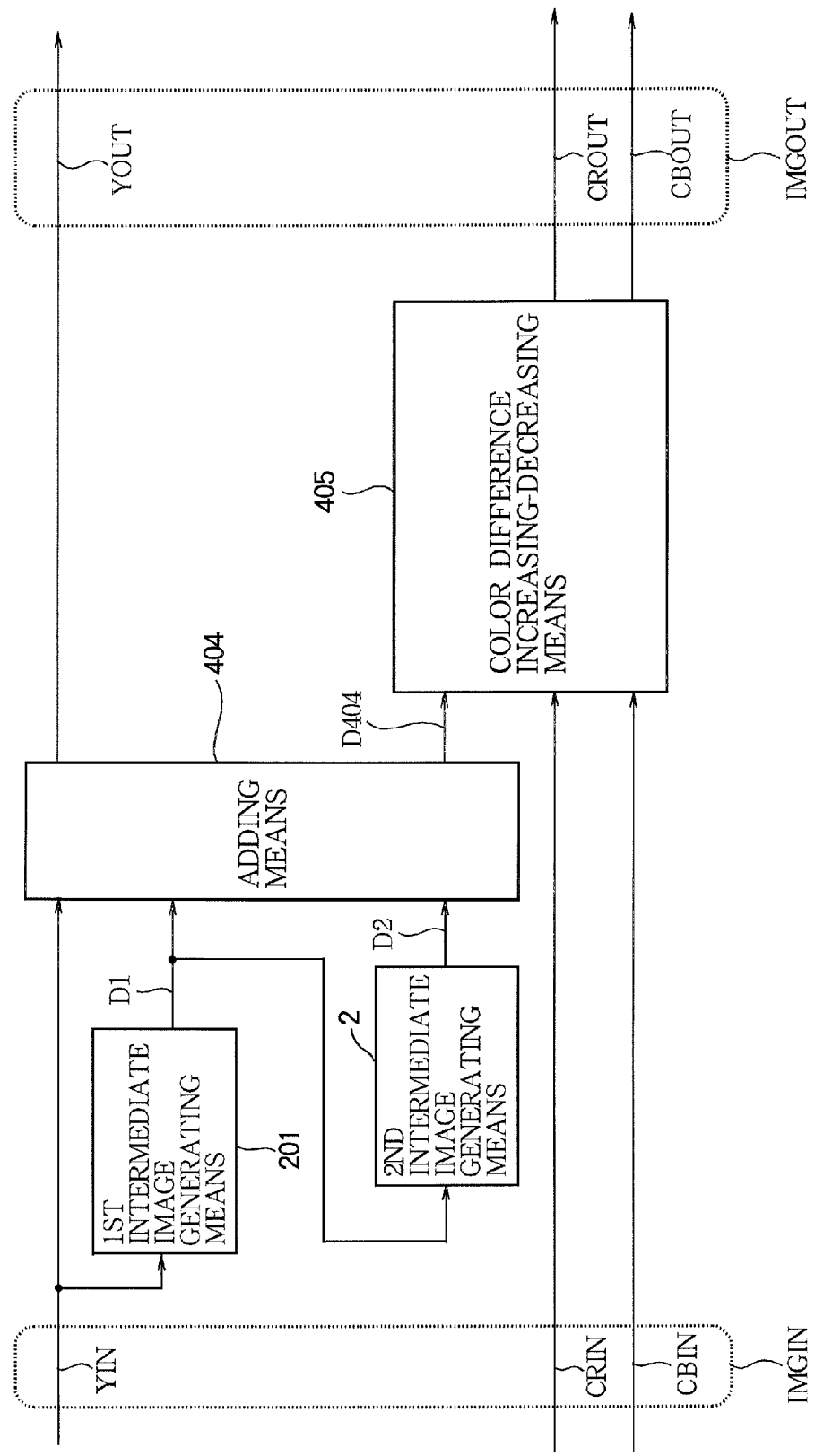
FIG. 39 is a block diagram illustrating the structure of an image processing apparatus according to a fifth embodiment of the invention.

FIG. 39 is a diagram illustrating the structure of an image processing apparatus according to a fifth embodiment of the invention.

The illustrated image processing apparatus receives an input image IMGIN and outputs an output image IMGOUT, as described in the third embodiment. The input image IMGIN is a color image and includes an input luminance image YIN, an input CR image CRIN, and an input CB image CBIN. The output image IMGOUT is also a color image and includes an output luminance image YOUT, an output CR image CROUT, and an output CB image CBOUT.

The illustrated image processing apparatus includes a first intermediate image generating means 201, a second intermediate image generating means 2, an adding means 404, and a color difference increasing-decreasing means 405.

The first intermediate image generating means 201 and second intermediate image generating means 2 have the same structure and operate in the same way as the means having the same reference characters in the third embodiment.

The color difference increasing-decreasing means 405 carries out certain processing, which will be described later, on the input CR image CRIN and input CB image CBIN and outputs the output CR image CROUT and output CB image CBOUT.

The adding means 404 adds the input luminance image YIN, intermediate image D1, and intermediate image D2 together, outputs the resulting sum as the output luminance image YOUT, and also outputs the result of adding intermediate image D1 and intermediate image D2 together as a summed high-frequency component image D404.

Figure 40:
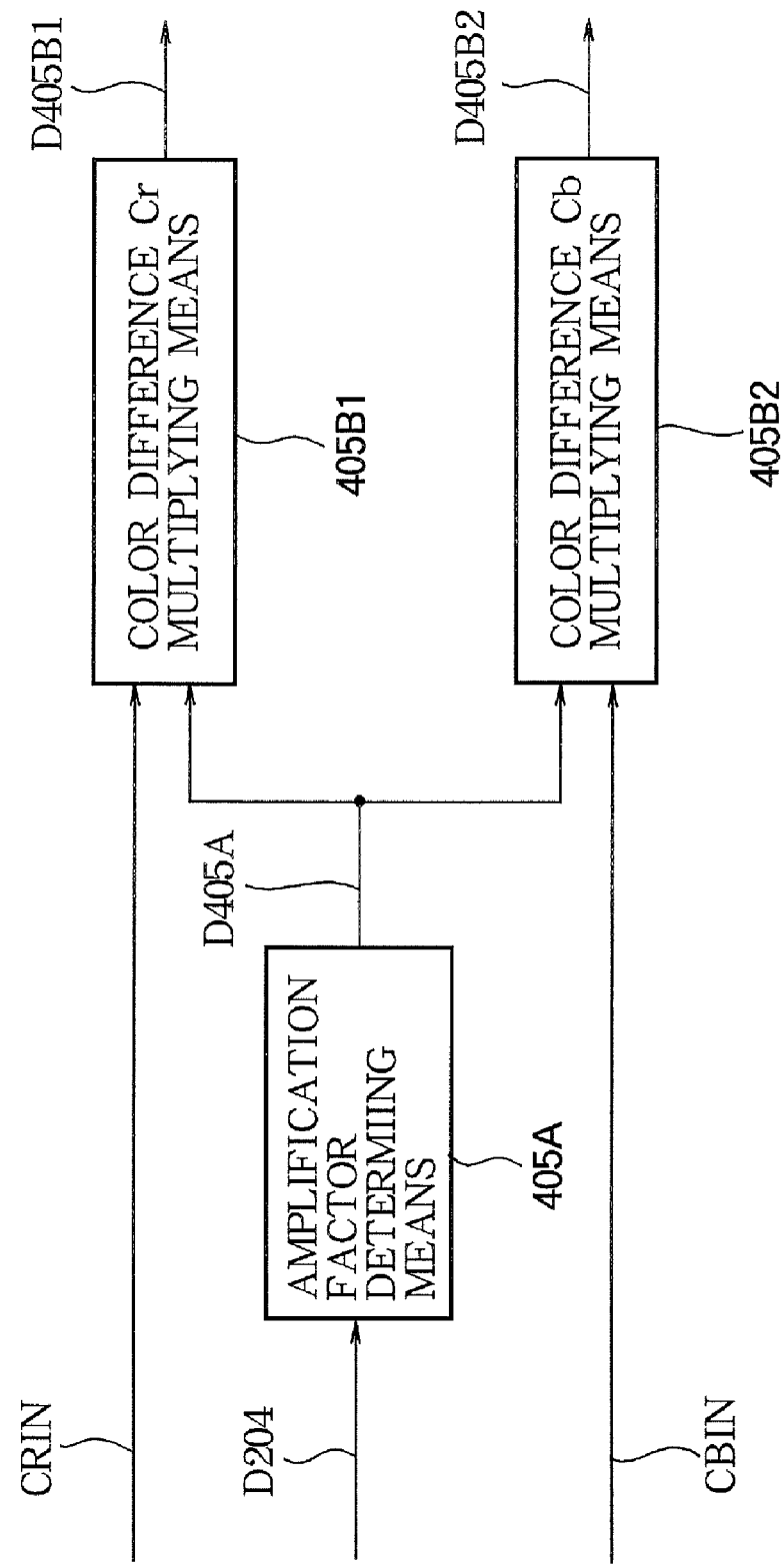
FIG. 40 is a block diagram illustrating an exemplary structure of the color difference increasing-decreasing means 405 in FIG. 39.

FIG. 40 is a diagram illustrating an exemplary structure of the color difference increasing-decreasing means 405; the illustrated color difference increasing-decreasing means 405 includes an amplification factor determining means 405A, a color difference Cr multiplying means 405B1 (the first color difference multiplication means), and a color difference Cb multiplying means 405B2 (the second color difference multiplication means).

The amplification factor determining means 405A determines an amplification factor D405A on the basis of the summed high-frequency component image D404.

The color difference Cr multiplying means 405B1 increases or decreases the pixel values in the input CR image CRIN on the basis of the values of the amplification factor D405A and outputs the result as an image D405B1.

The color difference Cb multiplying means 405B2 increases or decreases the pixel values in the input CB image CBIN on the basis of the values of the amplification factor D405A and outputs the result as an image D405B2.

The detailed operation of the image processing apparatus according to the fifth embodiment will be described below.

The detailed operation of the first intermediate image generating means 201 and second intermediate image generating means 2 is the same as in the third embodiment, so descriptions will be omitted.

Next the operation of the adding means 404 will be described. The adding means 404 adds intermediate image D1 and intermediate image D2 together and outputs the resulting sum as the summed high-frequency component image D404. The adding means 404 also adds the summed high-frequency component image D404 (the sum of intermediate image D1 and intermediate image D2) to the input luminance image YIN and outputs the resulting sum as the output luminance image YOUT. The output luminance image YOUT is output from the image processing apparatus as part of the final output image IMGOUT.

Intermediate image D1 includes an image D1h and an image D1v, and intermediate image D2 includes an image D2h and an image D2v, so to add intermediate image D1 and intermediate image D2 together means to add images D1h, D1v, D2h, and D2v all together.

The addition in the adding means 404 is not limited to simple addition; weighted addition may be performed. That is, the summed high-frequency component image D404 may be obtained by amplifying images D1h, D1v, D2h, and D2v by different amplification factors and then adding them together.

The detailed operation of the color difference increasing-decreasing means 405 will next be described. In the color difference increasing-decreasing means 405, the amplification factor determining means 405A determines the amplification factor D405A on the basis of the summed high-frequency component image D404. An amplification factor D405A is determined for each pixel.

Figures 41A, 41B, 41C:
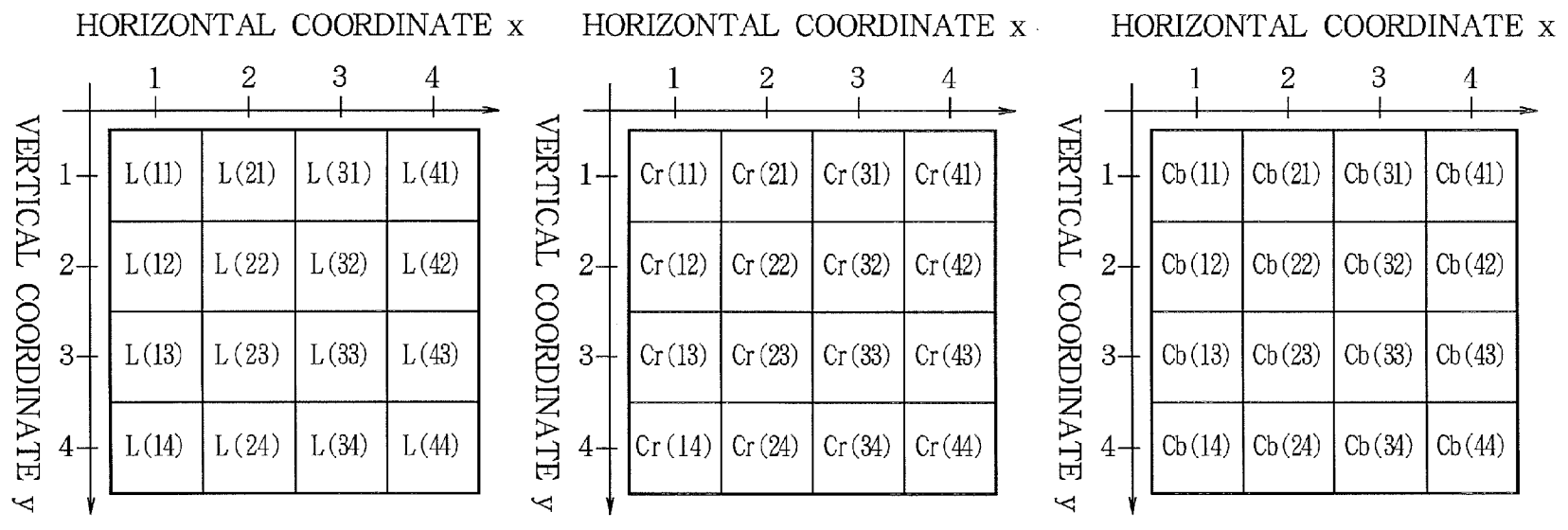

FIGS. 41(A) to 41(C) are diagrams showing the arrangement of pixels in the summed high-frequency component image D404, input CR image CRIN, and input CB image CBIN: FIG. 41(A) represents the summed high-frequency component image D404; FIG. 41(B) represents the input CR image CRIN; FIG. 41(C) represents the input CB image CBIN. The horizontal and vertical axes in FIGS. 41(A) to 41(C) correspond to the horizontal and vertical directions in the image and indicate coordinate values. The pixel value of the pixel in the summed high-frequency component image D404 in a position indicated by x on the horizontal axis and y on the vertical axis is denoted L(xy). In the input CR image CRIN, the pixel value of the pixel in the position indicated by x on the horizontal axis and y on the vertical axis is denoted Cr(xy). In the input CB image CBIN, the pixel value of the pixel in the position indicated by x on the horizontal axis and y on the vertical axis is denoted Cb(xy).

The amplification factor determining means 405A determines an amplification factor for each pixel in the input CR image CRIN and input CB image CBIN on the basis of the pixel value in the corresponding position in the summed high-frequency component image D404. The amplification factor is determined from the value of the pixel with the same coordinates in the summed high-frequency component image D404; the amplification factor for pixel values Cr(11) and Cb(11) is determined from pixel value L(11), the amplification factor for the pixel value Cr(12) and Cb(12) is determined from pixel value L(12), and in general, the amplification factor for pixel value Cr(xy) and Cb(xy) is determined from pixel value L(xy); the results are output as amplification factor D405A.

Figure 42:
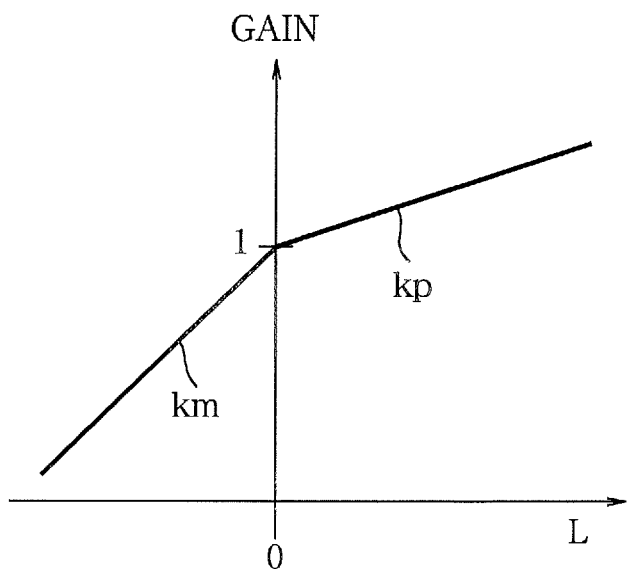
FIG. 42 is a diagram showing an exemplary relationship between the pixel values L of the summed high-frequency component image D404 and the amplification factor GAIN determined by the amplification factor determining means 405A.

FIG. 42 is a diagram showing the relationship between a pixel value (indicated as L below) in the summed high-frequency component image D404 and the amplification factor (indicated as GAIN below) determined by the amplification factor determining means 405A.

As shown in the diagram, if L is zero (0), GAIN is unity; if L is a positive value, GAIN is greater than unity; if L is a negative value, GAIN is less than unity. This L–GAIN relationship can be expressed by, for example, the following expression:

[Mathematical expression 11]

$$\text{GAIN} = \begin{cases} 1 + kp \cdot L & \text{if } (L > 0) \\ 1 & \text{if } (L = 0) \\ 1 - km \cdot |L| & \text{if } (L < 0) \end{cases} \quad (14)$$

In this expression kp and km are predetermined coefficients taking positive values; kp indicates the slope of the curve in FIG. 42 in the region where L is greater than zero (L>0); km indicates the slope of the curve in FIG. 42 in the region where L is less than zero (L<0).

GAIN always takes positive values. In the calculation of GAIN as expressed by expression (14), if the value of km is sufficiently small with respect to the values that L can take, GAIN can always take positive values. If L is a signed eight-bit integer value, L can take values ranging from −128 to 127. Therefore, km needs to be a value smaller than $1/128$. In general, if L can take values greater than or equal to −ML (ML is a positive value), km may be 1/ML or less. This prevents GAIN from taking a negative value. This restriction on km can be derived easily from the minimum possible value of L.

The color difference Cr multiplying means 405B1 multiplies the pixel values in the input CR image CRIN by the amplification factor D405A and outputs the resulting product as image D405B1. If the amplification factor D405A is greater than unity, the pixel value in the input CR image CRIN is amplified; if the amplification factor D405A is less than unity, the pixel value in the input CR image CRIN decreases; if the amplification factor D405A is unity, the pixel value in the input CR image CRIN is maintained. If the pixel value in the summed high-frequency component image D404 is positive, the value of the amplification factor D405A is greater than unity; if the pixel value is negative, the value of the amplification factor D405A is less than unity; if the pixel value is zero, the value of the amplification factor D405A is unity. Accordingly, the pixel value in the input CR image CRIN is amplified if the pixel value in the summed high-frequency component image D404 is positive, decreased if the pixel value in the summed high-frequency component image D404 is negative, and maintained if the pixel value in the summed high-frequency component image D404 is zero.

The color difference Cb multiplying means 405B2 multiplies the pixel values in the input CB image CBIN by the amplification factor D405A and outputs the resulting product as image D405B2. If the amplification factor D405A is greater than unity, the pixel value in the input CB image CBIN is amplified; if the amplification factor D405A is less than unity, the pixel value in the input CB image CBIN decreases; if the amplification factor D405A is unity, the pixel value in the input CB image CBIN is maintained. If the pixel value in the summed high-frequency component image D404 is positive, the value of the amplification factor D405A becomes greater than unity; if the pixel value is negative, the value of the amplification factor D405A becomes less than unity; if the pixel value is zero, the value of the amplification factor D405A becomes unity. Accordingly, the pixel value in the input CB image CBIN is amplified if the pixel value in the summed high-frequency component image D404 is positive, decreased if the pixel value in the summed high-frequency component image D404 is negative, and maintained if the pixel value in the summed high-frequency component image D404 is zero.

Image D405B1 is output as the output CR image CROUT, and image D405B2 is output as the output CB image CBOUT. The output CR image CROUT and output CB image CBOUT are output from the image processing apparatus as part of the final output image IMGOUT.

The color difference increasing-decreasing means 405 operates as described above.

An example in which the image processing apparatus in this embodiment is utilized as part of an image display apparatus will be described below. The image processing apparatus in this embodiment can be utilized as part of the image display apparatus illustrated in FIG. 31, for example.

In the image processing apparatus in this embodiment, intermediate image D1 and intermediate image D2 are added to the input luminance image YIN. As described earlier, by adding intermediate image D1 and intermediate image D2 to the input luminance image YIN, high-frequency components can be added without enhancing the fold-over component, and the perceived image resolution can be improved.

The addition of high-frequency components generated as described above to the input image can sharpen the image and improve its image quality, but excessive addition of high-frequency components can lower the image quality instead; overshoot or undershoot can occur in a position where the input luminance image YIN has a step-edge-like change.

If overshoot occurs in the input luminance image YIN, the luminance signal increases more than necessary. Expression (9) indicates that if the value of the luminance signal (Y) increases, the first term on the right-hand side of the expressions for R, G, and B after conversion to the RGB format increases, so R, G, and B have large values.

Large values of R, G, B make the color approach white. Approaching white means that the color becomes pale. In areas that were nearly colorless to begin with, the added paleness is relatively unnoticeable, but if colored areas (areas having relatively high saturation) become pale around edges, only the colors around the edges become pale, which looks unnatural.

In other words, if the magnitude of luminance (the correction amount) added by intermediate image D1 or intermediate image D2 (or summed high-frequency component image D404) becomes too large in a colored area, the luminance becomes too large in relation to the color differences, and the colors become pale. Arguing from the opposite direction, if the correction amount becomes too small a negative value, the luminance may become too small in relation to the color differences, and colors may become too dark. That is, the shades of colors in colored areas may be changed around the edges.

The cause of this problem is that when the correction amount is a positive value, the color differences become relatively small in relation to the luminance, but when the correction amount is a negative value, the color differences become relatively large in relation to the luminance.

In this embodiment, by increasing or decreasing the color difference signals appropriately in accordance with the correction amount, the color differences can be prevented from becoming relatively small or large in relation to the luminance.

When the correction amount is a positive value, the color difference signals are amplified to prevent the color differences from becoming relatively small; when the correction amount is a negative value, the color difference signals are attenuated to prevent the color differences from becoming relatively large.

In the image processing apparatus in this embodiment, the color difference increasing-decreasing means 405 increases or decreases the values of the color difference signals in accordance with the pixel value in the summed high-frequency component image D404. If the pixel value in the summed high-frequency component image D404 is positive, a value greater than unity is output from the amplification factor determining means 405A as amplification factor D405A, and the color difference Cr multiplying means 405B1 and color difference Cb multiplying means 405B2 amplify the color difference signals. If the pixel values in the summed high-frequency component image D404 is negative, a value less than unity is output from the amplification factor determining means 405A as amplification factor D405A, and the color difference Cr multiplying means 405B1 and color difference Cb multiplying means 405B2 attenuate the color difference signals. Therefore, the problem described above can be prevented.

As described above, the image processing apparatus in the fifth embodiment can perform image enhancement processing while preventing shades of colors near a colored edge from changing. A change in shades of colors near a colored edge would be perceived as unnatural by the human eye, so the image processing apparatus in the fifth embodiment is highly advantageous in terms of visual characteristics.

The multiplication of pixel values in the input CR image CRIN and input CB image CBIN by the same amplification factor D405A brings about a change in shades of colors (or saturation). Since the ratio between the pixel values in the input CR image CRIN and input CB image CBIN does not change, hues will not change. Accordingly, the image processing apparatus according to the fifth embodiment can correct the shades of colors near an edge without changing hues.

The relationship between the amplification factor D405A determined by the amplification factor determining means 405A and the pixel values in the summed high-frequency component image D404 is not limited to the relationship expressed by expression (14); it need only be a relationship in which GAIN takes values greater than unity when the pixel value in the summed high-frequency component image D404 is positive and takes values less than unity when the pixel value in the summed high-frequency component image D404 is negative. In order to correct color-difference signals more effectively, however, as the pixel values in the summed high-frequency component image D404 take on increasing positive values, the amplification factor D405A should also increase, and that as the pixel values in the summed high-frequency component image D404 take on decreasing negative values, the amplification factor D405A should be a decreasing positive value less than unity.

The above notwithstanding, it suffices for the amplification factor D405A to increase monotonically with the pixel value in the summed high-frequency component image D405A.

The range of the amplification factor D405A may also be limited in order to prevent the color difference signals from being over-corrected. That is, threshold values TH1 and TH2 may be set (TH1>1, 1>TH2>0) and the relationship between the amplification factor (GAIN) and the pixel value (L) in the summed luminance and color-difference image YC may be defined as:

[Mathematical expression 12]

$$\text{GAIN} = \begin{cases} TH1 & \text{if } (G' > TH1) \\ G' & \text{if } (TH1 \geq G' \geq TH2) \\ TH2 & \text{if } (TH2 > G') \end{cases} \quad (15)$$

where $$G' = \begin{cases} 1 + kp \cdot L & \text{if } (L > 0) \\ 1 & \text{if } (L = 0) \\ 1 - km \cdot L & \text{if } (L < 0) \end{cases}$$

Figure 43:
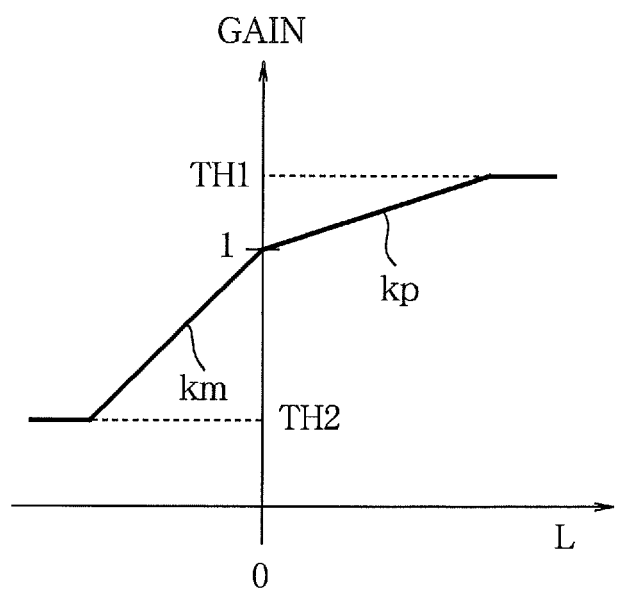
FIG. 43 is a diagram showing another exemplary relationship between the pixel values L of the summed high-frequency component image D404 and the amplification factor GAIN determined by the amplification factor determining means 405A.

The symbols kp and km in expression (15) are as described in relation to expression (14). The relationship between the amplification factor GAIN and the pixel value L expressed by expression (15) is as shown in FIG. 43.

By setting upper and lower limits on the value of the amplification factor (GAIN) by threshold values in this way, overcorrection of the color difference components in the color difference increasing-decreasing means 405 can be prevented.

Besides expression (14) and expression (15), various other modifications of the relationship between GAIN and L may be considered. Although the color difference Cr multiplying means 405B1 and color difference Cb multiplying means 405B2 use the same amplification factor in the description given above, the color difference Cr multiplying means 405B1 and the color difference Cb multiplying means 405B2 may use different amplification factors.

In the image processing apparatus in the first to fifth embodiments, the first intermediate image generating means 1 or first intermediate image generating means 201 and the second intermediate image generating means 2 perform image processing in the horizontal direction and the vertical direction in parallel. Accordingly, the effects described above can be obtained not just in the horizontal or vertical direction but in any direction.

Considered in the frequency domain, the image processing apparatus in the first to fifth embodiments generates the image D2B corresponding to high-frequency components near the Nyquist frequency ±Fn of the input image DIN or input luminance image YIN on the basis of the components in the input image DIN or input luminance image YIN near half of the Nyquist frequency of the original image DORG, ±Fn/2, (or in a particular frequency band), in a frequency band from the origin to Fn. Even if the frequency components near the Nyquist frequency ±Fn have been lost in the input image DIN or input luminance image YIN (or input image IMGIN), frequency components near the Nyquist frequency ±Fn can be supplied by image D2B. In other words, since the input image DIN or input luminance image YIN is given frequency components on the high-frequency side, the perceived image resolution of the output image DOUT or output luminance image YOUT (or the output image IMGOUT) can be increased.

The location used as the particular frequency band is not limited to the vicinity of ±Fn/2. The frequency band to be used can be changed by changing the frequency response of the high-frequency component image generating means 1A and low-frequency component image generating means 1B appropriately.

In the description of the first to fifth embodiments given above, an image enlargement process was given as an exemplary process in which frequency components near the Nyquist frequency Fn are lost, but that is not the only cause of the loss of frequency components near the Nyquist frequency Fn in the input image DIN or input luminance image YIN; noise suppression and various other causes can also be considered. Therefore, the use of the image processing apparatus of the invention is not limited to processing following image enlargement processing.

Sixth Embodiment

The first to fifth embodiments have been described as examples of implementation of the invention by hardware. However, part or all of the structure illustrated in FIG. 1 can also be implemented by software. Processing in that case will be described with reference to FIG. 44 and FIGS. 45 to 64.

Figure 44:
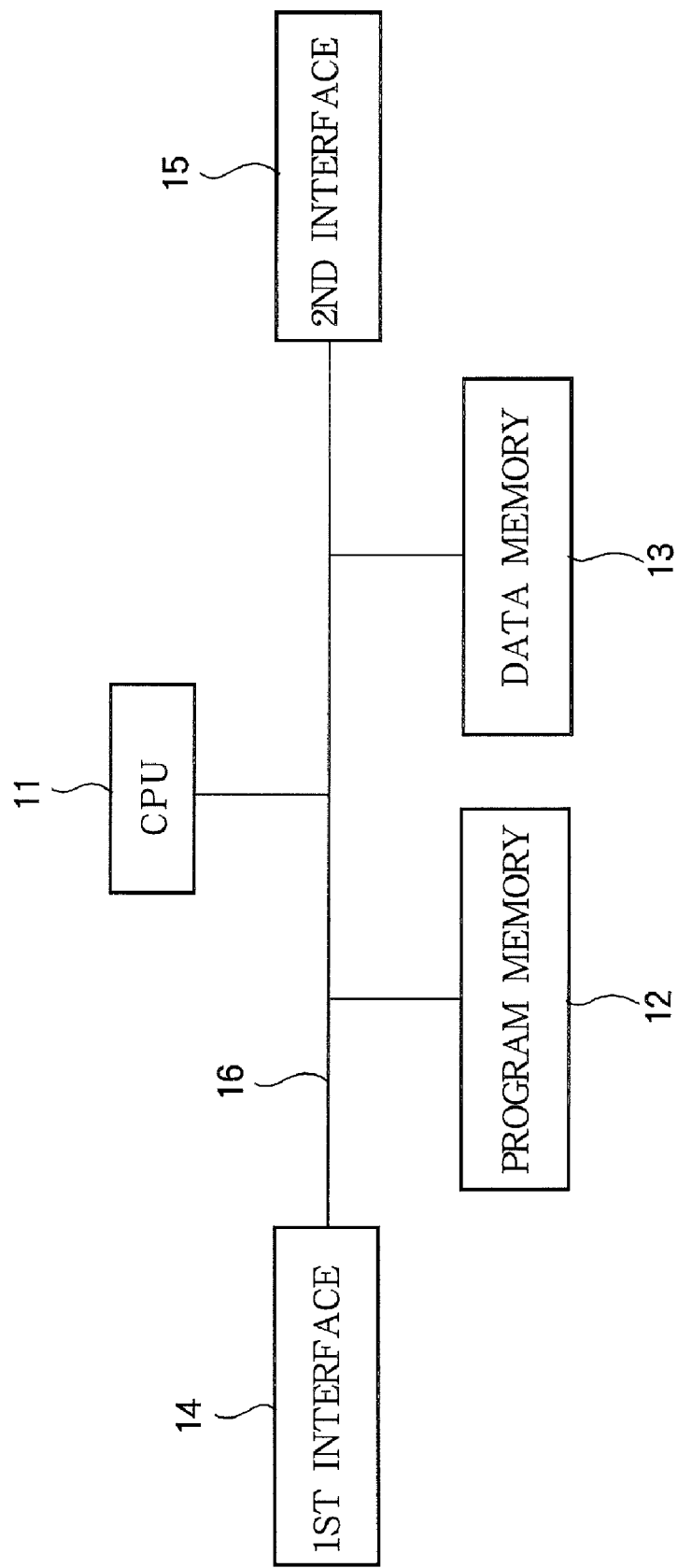
FIG. 44 is a block diagram illustrating the structure of an image processing apparatus according to a sixth embodiment of the invention.

FIG. 44 illustrates the image processing apparatus used in the sixth to tenth embodiments. The illustrated image processing apparatus includes a CPU 11, a program memory 12, a data memory 13, a first interface 14, and a second interface 15, and a bus 16 for interconnecting these components. The CPU 11 operates in accordance with a program stored in the program memory 12, stores a variety of data in the data memory 13 during the course of its operations, and can be used as the image processing apparatus U2 in the display apparatus illustrated in FIG. 9, for example, in place of the image processing apparatus illustrated in FIG. 1 or 20, for example, or as the image processing apparatus U202 in the display apparatus illustrated in FIG. 31, for example, in place of the image processing apparatus illustrated in FIG. 27, 34, or 39.

First an example of the use of the image processing apparatus illustrated in FIG. 44 in place of the image processing apparatus illustrated in FIG. 1 will be described. In this case, the image DU1 output from the image enlarging means U1 shown in FIG. 9 is supplied as the input image DIN through the first interface 14; the CPU 11 performs the same processing as performed in the image processing apparatus illustrated in FIG. 1; the output image DOUT generated as the result of the processing is supplied as image DU2 through the second interface 15 to the monitor U3 in the image processing apparatus illustrated in FIG. 9, for example, and is displayed by the monitor U3.

Figure 45:
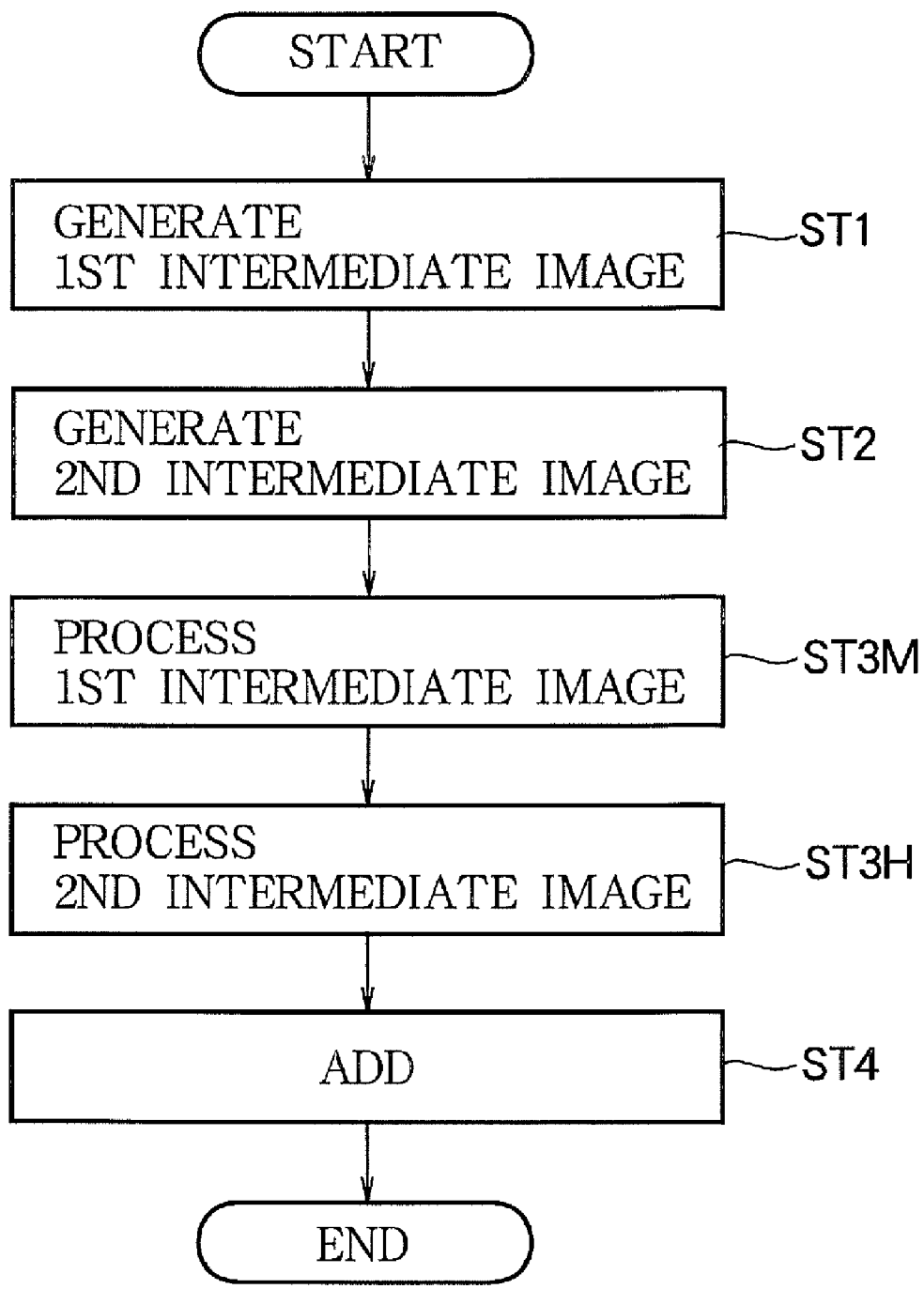
FIG. 45 is a flowchart illustrating processing steps in the image processing method according to the sixth embodiment.

FIG. 45 is a flowchart illustrating an image processing method according to the sixth embodiment of the invention, implemented by giving the image processing apparatus in FIG. 44 the same functions as the image processing apparatus in the first embodiment. The illustrated image processing method includes a first intermediate image generating step ST1, a second intermediate image generating step ST2, a first intermediate image processing step ST3M, a second intermediate image processing step ST3H, and an adding step ST4.

Figure 46:
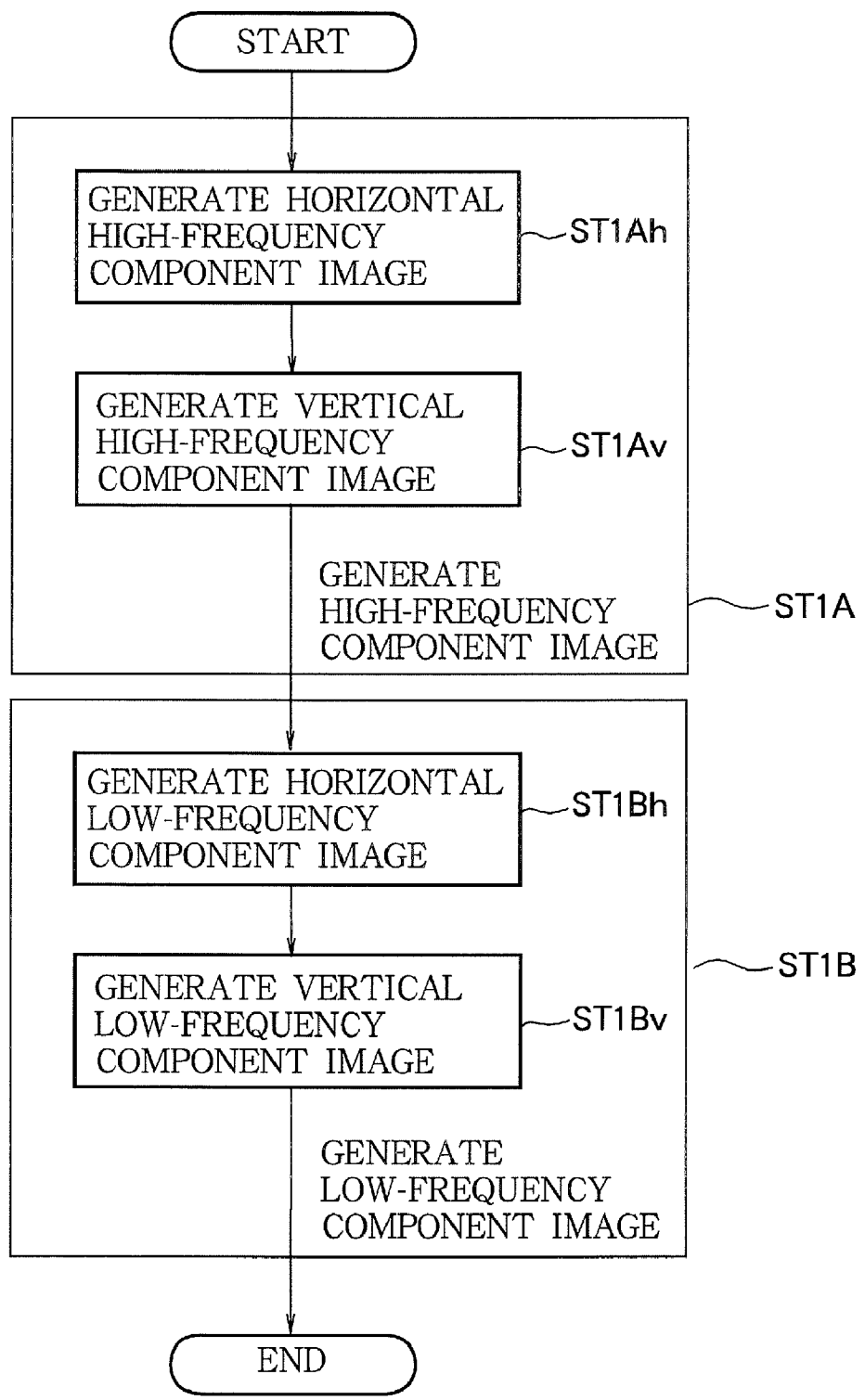
FIG. 46 is a flowchart illustrating processing in the first intermediate image generating step ST1 in FIG. 45.

The first intermediate image generating step ST1 includes, as shown in FIG. 46, a high-frequency component image generating step ST1A and a low-frequency component image generating step ST1B.

The high-frequency component image generating step ST1A includes a horizontal high-frequency component image generating step ST1Ah and a vertical high-frequency component image generating step ST1Av, and the low-frequency component image generating step ST1B includes a horizontal low-frequency component image generating step ST1Bh and a vertical low-frequency component image generating step ST1Bv.

Figure 47:
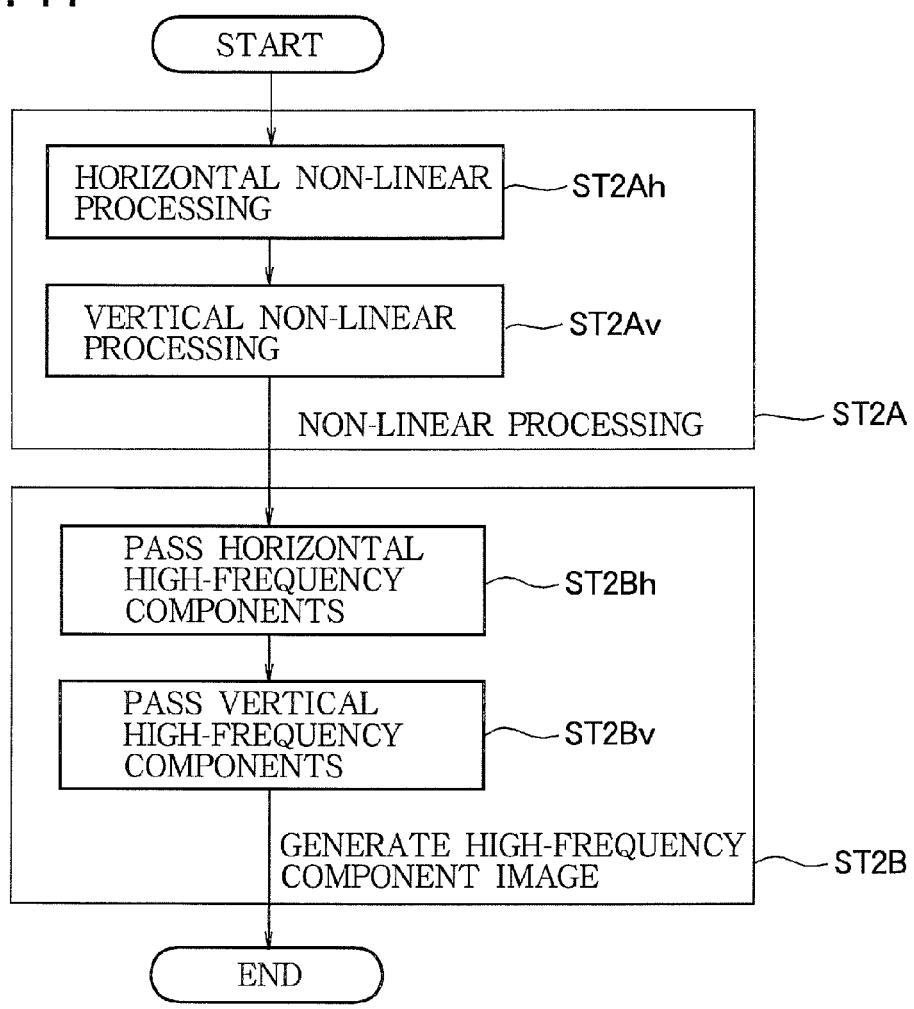
FIG. 47 is a flowchart illustrating processing in the second intermediate image generating step ST2 in FIG. 45.

The second intermediate image generating step ST2 includes, as shown in FIG. 47, a non-linear processing step ST2A and a high-frequency component image generating step ST2B.

The non-linear processing step ST2A includes a horizontal non-linear processing step ST2Ah and a vertical non-linear processing step ST2Av, and the high-frequency component image generating step ST2B includes a horizontal high-frequency component passing step ST2Bh and a vertical high-frequency component passing step ST2Bv.

Figure 48:
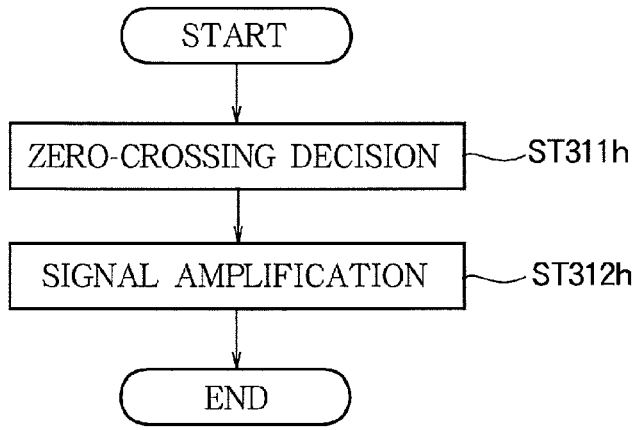
FIG. 48 is a flowchart illustrating processing in the horizontal non-linear processing step ST2Ah in FIG. 47.

The horizontal non-linear processing step ST2Ah includes, as shown in FIG. 48, a zero-crossing decision step ST311h and a signal amplification step ST312h, and the vertical non-linear processing step ST2Av includes, as shown in FIG. 48, a zero-crossing decision step ST311v and a signal amplification step ST312v.

Figure 50:
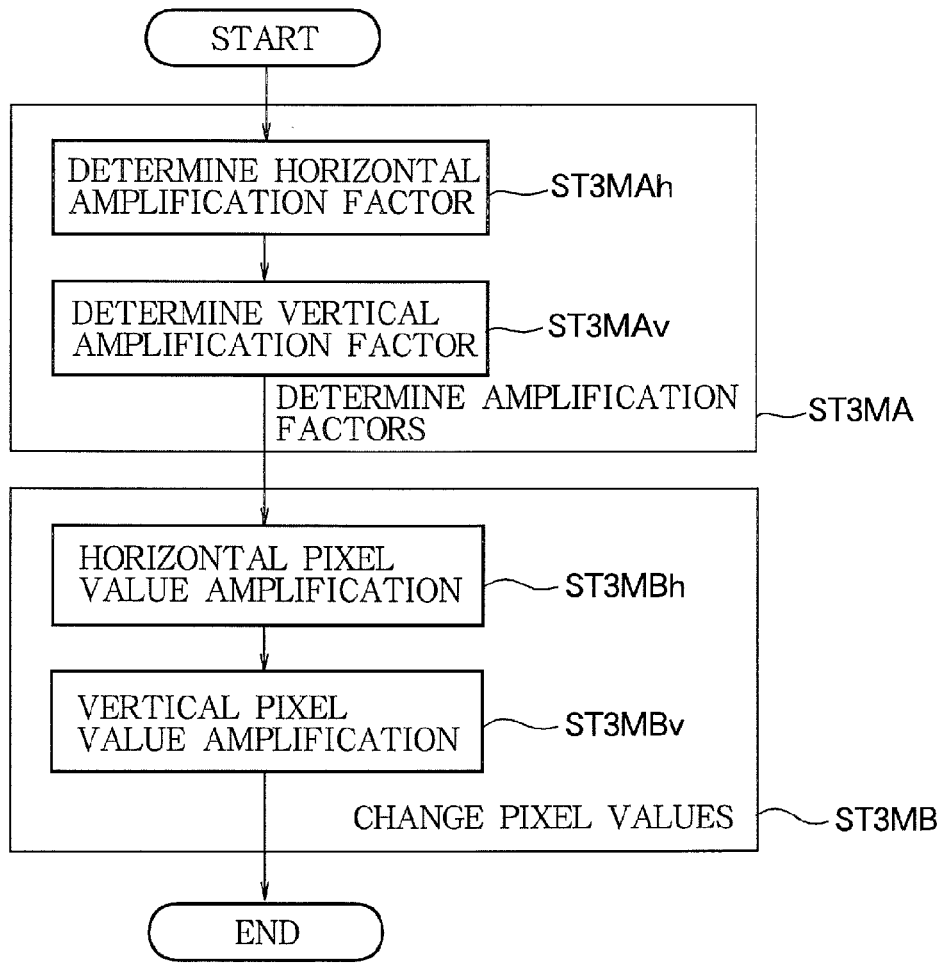
FIG. 50 is a flowchart illustrating processing in the first intermediate image processing step ST3M in FIG. 45.

The first intermediate image processing step ST3M includes, as shown in FIG. 50, an amplification factor determining step ST3MA and a pixel value changing step ST3MB.

Figure 51:
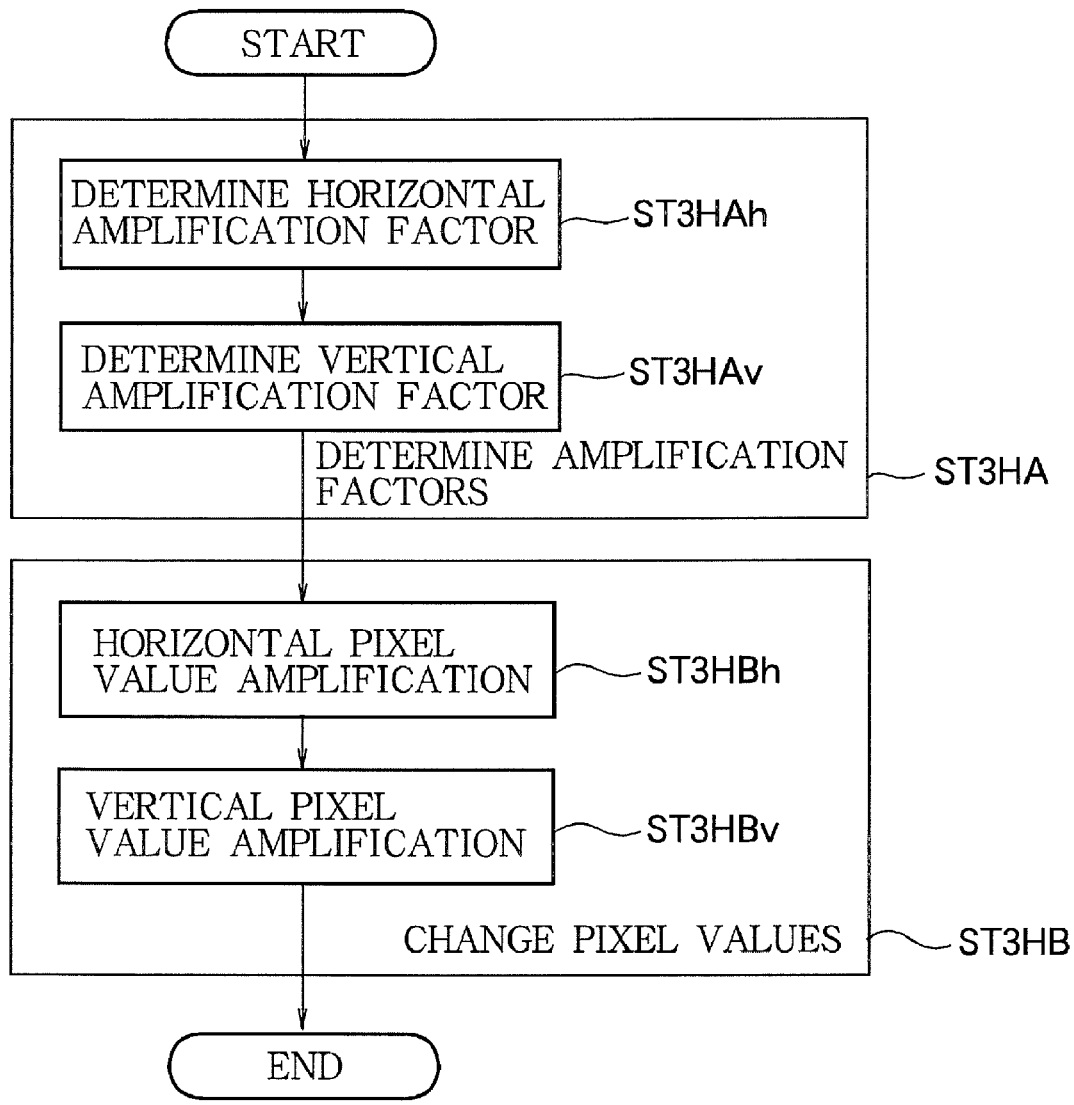
FIG. 51 is a flowchart illustrating processing in the second intermediate image processing step ST3H in FIG. 45.

The second intermediate image processing step ST3H includes, as shown in FIG. 51, an amplification factor determining step ST3HA and a pixel value changing step ST3HB.

First the operation of the first intermediate image generating step ST1 will be described with reference to the flowchart in FIG. 46.

In the high-frequency component image generating step ST1A, the following processing is performed on an input image DIN input in an image input step, which is not shown.

In the horizontal high-frequency component image generating step ST1Ah, horizontal high-pass filter processing is performed to generate an image D1Ah by extracting horizontal high-frequency components from the input image DIN.

In the vertical high-frequency component image generating step St1Av, vertical high-pass filter processing is performed to generate an image D1Av by extracting vertical high-frequency components from the input image DIN.

The high-frequency component image generating step ST1A performs the same processing as performed by the high-frequency component image generating means 1A, generating an image D1A including image D1Ah and image D1Av from the input image DIN. The operations performed are equivalent to the operations performed by the high-frequency component image generating means 1A.

In the low-frequency component image generating step ST1B, the following processing is performed on image D1A. In the horizontal low-frequency component image generating step ST1Bh, horizontal low-pass filter processing is performed to generate an image D1Bh by extracting horizontal low-frequency components from image D1Ah.

In the vertical low-frequency component image generating step ST1Bv, vertical low-pass filter processing is performed to generate an image D1Bv by extracting vertical low-frequency components from image D1Av.

The low-frequency component image generating step ST1B performs the same processing as performed by the low-frequency component image generating means 1B, generating an image D1B including image D1Bh and image D1Bv from image D1A. The operations performed are equivalent to the operations performed by the low-frequency component image generating means 1B.

The first intermediate image generating step ST1 operates as described above, using image D1Bh as an image D1h, using image D1Bv as an image D1v, and outputting an intermediate image D1 including image D1h and image D1v. The above operations are equivalent to the operations performed by the first intermediate image generating means 1.

Next the operation of the second intermediate image generating step ST2 will be described with reference to the flowcharts in FIGS. 47 to 49.

In the non-linear processing step ST2A, the following processing is performed on intermediate image D1.

In the horizontal non-linear processing step ST2Ah, processing is performed according to the flowchart shown in FIG. 48 to generate an image D2Ah from image D1h. The processing according to the flowchart shown in FIG. 48 is as follows. The pixel values in image D1h are checked for changes in the horizontal direction in the zero-crossing decision step ST311h. A point where the pixel value changes from positive to negative or from negative to positive is identified as a zero-crossing point, and the pixels to the left and right of the zero-crossing point are reported to the signal amplification step ST312h. In the signal amplification step ST312h, the pixel values of the pixels reported as being to the left and right of the zero-crossing point are amplified in image D1h, and the image is output as image D2Ah. That is, image D2Ah is generated in the non-linear processing step ST2Ah by performing on image D1h the same processing as performed by the horizontal non-linear processing means 2Ah.

Figure 49:
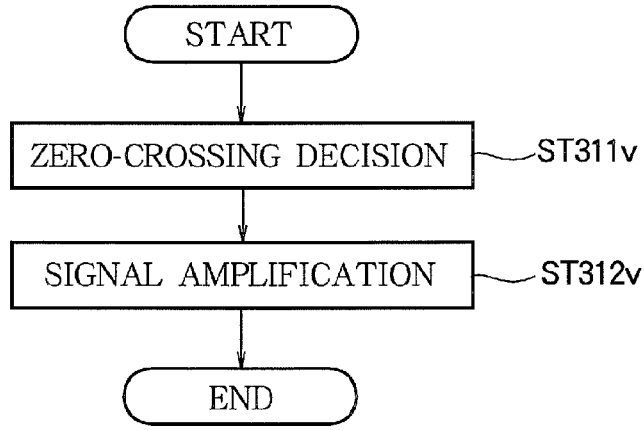
FIG. 49 is a flowchart illustrating processing in the vertical non-linear processing step ST2Av in FIG. 47.

In the vertical non-linear processing step ST2Av, processing is performed according the flowchart shown in FIG. 49 to generate an image D2Av from image D1v. The processing according to the flowchart shown in FIG. 49 is as follows. The pixel values in image D1v are checked for changes in the vertical direction in the zero-crossing decision step ST311v. A point where the pixel value changes from positive to negative or from negative to positive is identified as a zero-crossing point, and the pixels immediately above and below the zero-crossing point are reported to the signal amplification step ST312v. In the signal amplification step ST312v, the pixel values of the pixels reported as being immediately above and below the zero-crossing point are amplified in image D1v, and the image is output as image D2Av. That is, image D2Av is generated in the non-linear processing step ST2Av by performing on image D1v the same processing as performed in the vertical non-linear processing means 2Av.

The non-linear processing step ST2A operates as described above to generate an image D2A including images D2Ah and D2Av. The above operations are equivalent to the operations performed by the non-linear processing means 2A.

In the high-frequency component image generating step ST2B, the following processing is performed on image D2A.

An image D2Bh is generated by performing horizontal high-pass filter processing on image D2Ah in the horizontal high-frequency component image generating step ST2Bh. The horizontal high-frequency component image generating step ST2Bh performs processing similar to that performed in the horizontal high-frequency component image generating means 2Bh.

Next, an image D2Bv is generated by performing vertical high-pass filter processing on image D2Av in the vertical high-frequency component image generating step ST2Bv. The vertical high-frequency component image generating step ST2Bv thus performs processing similar to that performed by the vertical high-frequency component image generating means 2Bv.

The high-frequency component image generating step ST2B operates as described above to generate an image D2B including image D2Bh and image D2Bv. The above operations are equivalent to the operations performed by the high-frequency component image generating means 2B.

The second intermediate image generating step ST2 operates as described above, outputting image D2B as an intermediate image D2. That is, it outputs an intermediate image D2 including image D2Bh as image D2*h* and image D2Bv as image D2*v*. The above operations are equivalent to the operations performed by the second intermediate image generating means 2.

Next the operation of the first intermediate image processing step ST3M will be described with reference to the flowchart in FIG. 50.

The amplification factor determining step ST3MA in the first intermediate image processing step ST3M determines amplification factors for the pixel values of pixels in intermediate image D1. Since intermediate image D1 includes image D1*h* and image D1*v*, amplification factors are determined for each of the pixels in images D1*h* and D1*v*. An amplification factor is determined for each pixel in image D1*h* in the horizontal amplification factor determining step ST3MAh, and an amplification factor is determined for each pixel in image D1*v* in the vertical amplification factor determining step ST3MAv. The horizontal amplification factor determining step ST3MAh operates like the horizontal amplification factor determining means 3MAh, and the vertical amplification factor determining step ST3MAv operates like the vertical amplification factor determining means 3MAv, so descriptions will be omitted.

In the pixel value changing step ST3MB, the pixel values of pixels in intermediate image D1 are amplified in accordance with the amplification factors determined in the amplification factor determining step ST3MA. Since intermediate image D1 includes image D1*h* and image D1*v*, the pixel values in each of images D1*h* and D1*v* are amplified. An image D3MBh is generated by amplifying each pixel value in image D1*h* in accordance with the amplification factor determined in the horizontal amplification factor determining step ST3MAh. An image D3MBv is generated by amplifying each pixel value in image D1*v* in accordance with the amplification factor determined in the vertical amplification factor determining step ST3MAv. These operations are the same as the operations performed by the pixel value amplifying means 3MB.

An intermediate image D3M including an image D3Mh equivalent to image D3MBh and an image D3Mv equivalent to image D3MBv is generated in the first intermediate image processing step ST3M. By operating as described above, the first intermediate image processing step ST3M operates in the same way as the first intermediate image processing means 3M.

Next, the operation of the second intermediate image processing step ST3H will be described with reference to the flowchart in FIG. 51.

The amplification factor determining step ST3HA in the second intermediate image processing step ST3H determines amplification factors for the pixel values of the pixels in intermediate image D2. Since intermediate image D2 includes image D2*h* and image D2*v*, an amplification factor is determined for each pixel value in image D2*h* and image D2*v*. An amplification factor for each pixel in image D2*h* is determined in the horizontal amplification factor determining step ST3HAh, and an amplification factor for each pixel in image D2*v* is determined in the vertical amplification factor determining step ST3HAv. The horizontal amplification factor determining step ST3HAh operates like the horizontal amplification factor determining means 3HAh, and the vertical amplification factor determining step ST3HAv operates like the vertical amplification factor determining means 3HAv, so descriptions will be omitted.

In the pixel value changing step ST3HB, the pixel values of pixels in intermediate image D2 are amplified in accordance with the amplification factors determined in the amplification factor determining step ST3HA. Since intermediate image D2 includes image D2*h* and image D2*v*, the pixel values in each of images D2*h* and D2*v* are amplified. An image D3HBh is generated by amplifying each pixel value in image D2*h* in accordance with the amplification factor determined in the horizontal amplification factor determining step ST3HAh. An image D3HBv is generated by amplifying each pixel value in image D2*v* in accordance with the amplification factor determined in the vertical amplification factor determining step ST3HAv. These operations are the same as the operations performed by the pixel value amplifying means 3HB.

An intermediate image D3H including an image D3Hh equivalent to image D3HBh and an image D3Hv equivalent to image D3HBv is generated in the second intermediate image processing step ST3H. By operating as described above, the second intermediate image processing step ST3H operates in the same way as the second intermediate image processing means 3H.

In the adding step ST4, the input image DIN, intermediate image D3M, and intermediate image D3H are added together to generate the output image DOUT. Intermediate image D3M includes image D3Mh and image D3Mv, and intermediate image D3H includes image D3Hh and image D3Hv, so images D3Mh, D3Mv, D3Hh, and D3Hv are added to the input image DIN in the adding step ST4. The addition of images D3Mh, D3Mv, D3Hh, and D3Hv to the input image DIN may be simple addition or weighted addition. The output image DOUT is output as a final output image by the image processing method in this embodiment. By operating as described above, the adding step ST4 operates equivalently to the adding means 4.

The image processing method in this embodiment operates as described above.

As is clear from the preceding description, the image processing method in this embodiment and the image processing apparatus in the first embodiment operate equivalently. Therefore, the image processing method in this embodiment has the same effects as the image processing apparatus in the first embodiment. If the image processing method described above is carried out in the image processing apparatus U2 in the image display apparatus shown in FIG. 9, for example, the image processed by the image processing method can be displayed by the image display apparatus shown in FIG. 9.

Seventh Embodiment

The second embodiment was described as an example of implementation of the invention by hardware. However, part or all of the structure illustrated in FIG. 20 can also be implemented by software. The image processing apparatus used in that case has the same structure as shown in FIG. 44.

The image processing apparatus is used as, for example, the image processing apparatus U2 forming part of the display apparatus illustrated in FIG. 9, as in the sixth embodiment. The image DU1 output from the image enlarging means U1 is supplied as the input image DIN through the first interface 14; the CPU 11 performs the same processing as performed in the image processing apparatus in FIG. 20; the output image DOUT generated as the result of the processing is supplied as image DU2 through the second interface 15 to, for example, the monitor U3 in FIG. 9, and displayed by the monitor U3.

Figure 52:
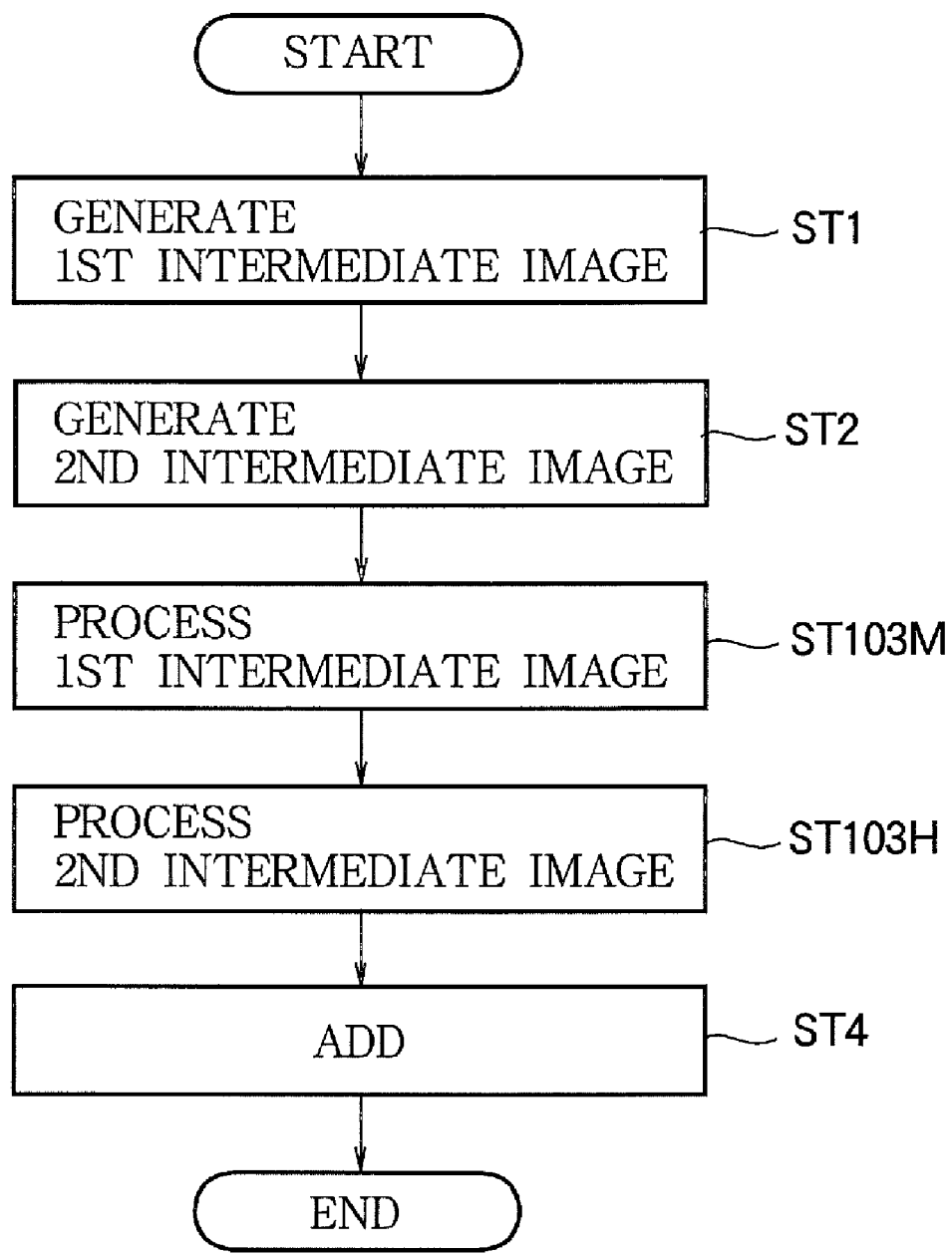
FIG. 52 is a flowchart illustrating processing steps in a seventh embodiment of the invention.

FIG. 52 is a flowchart illustrating an image processing method according to the seventh embodiment of the invention, implemented by giving the image processing apparatus in FIG. 44 the same functions as the image processing apparatus in the second embodiment. The illustrated image processing method includes a first intermediate image generating step ST1, a second intermediate image generating step ST2, a first intermediate image processing step ST103M, a second intermediate image processing step ST103H, and an adding step ST4. The first intermediate image generating step ST1, second intermediate image generating step ST2, and adding step ST4 have the same structure as in the sixth embodiment and operate in the same way, so descriptions will be omitted.

Figure 53:
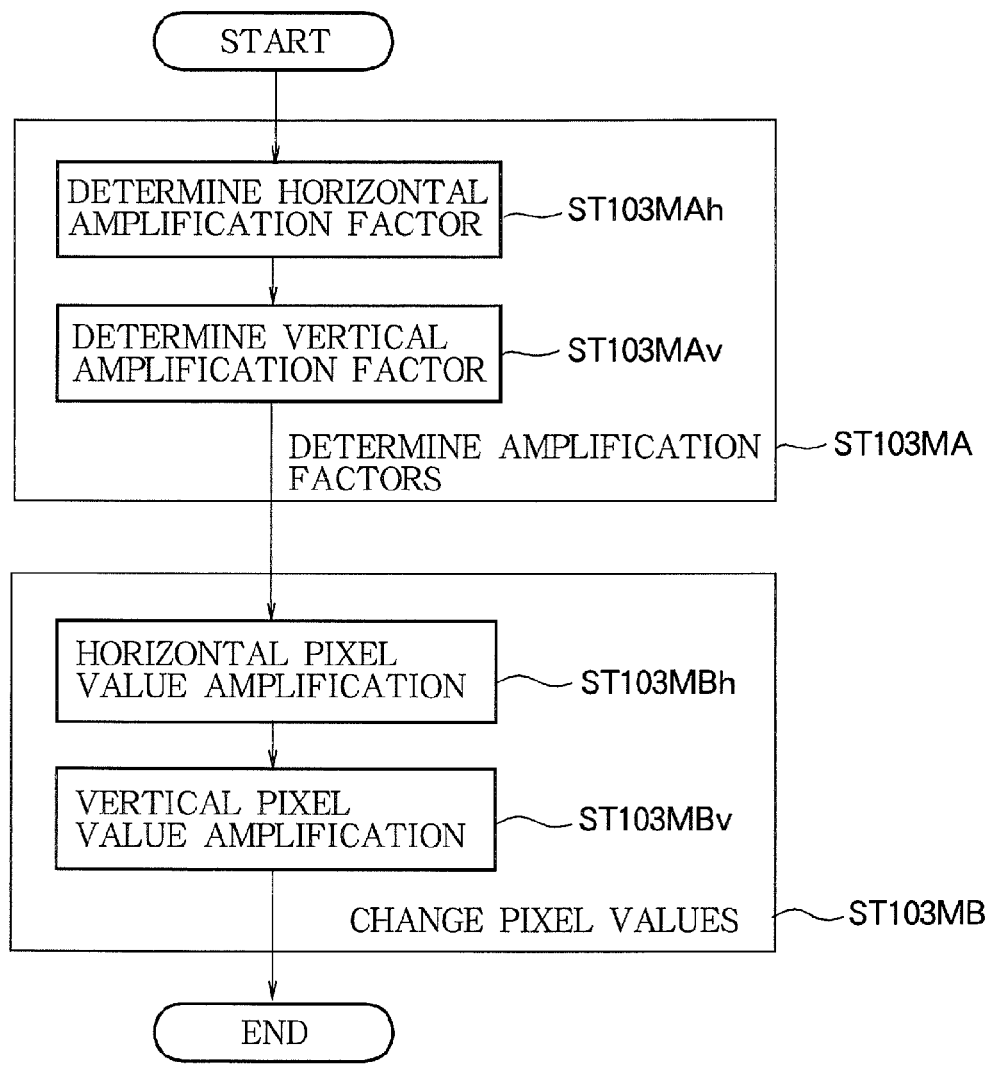
FIG. 53 is a flowchart illustrating processing in the first intermediate image processing step ST103M in FIG. 52.

The first intermediate image processing step ST103M includes, as shown in FIG. 53, an amplification factor determining step ST103MA and a pixel value changing step ST103MB.

Figure 54:
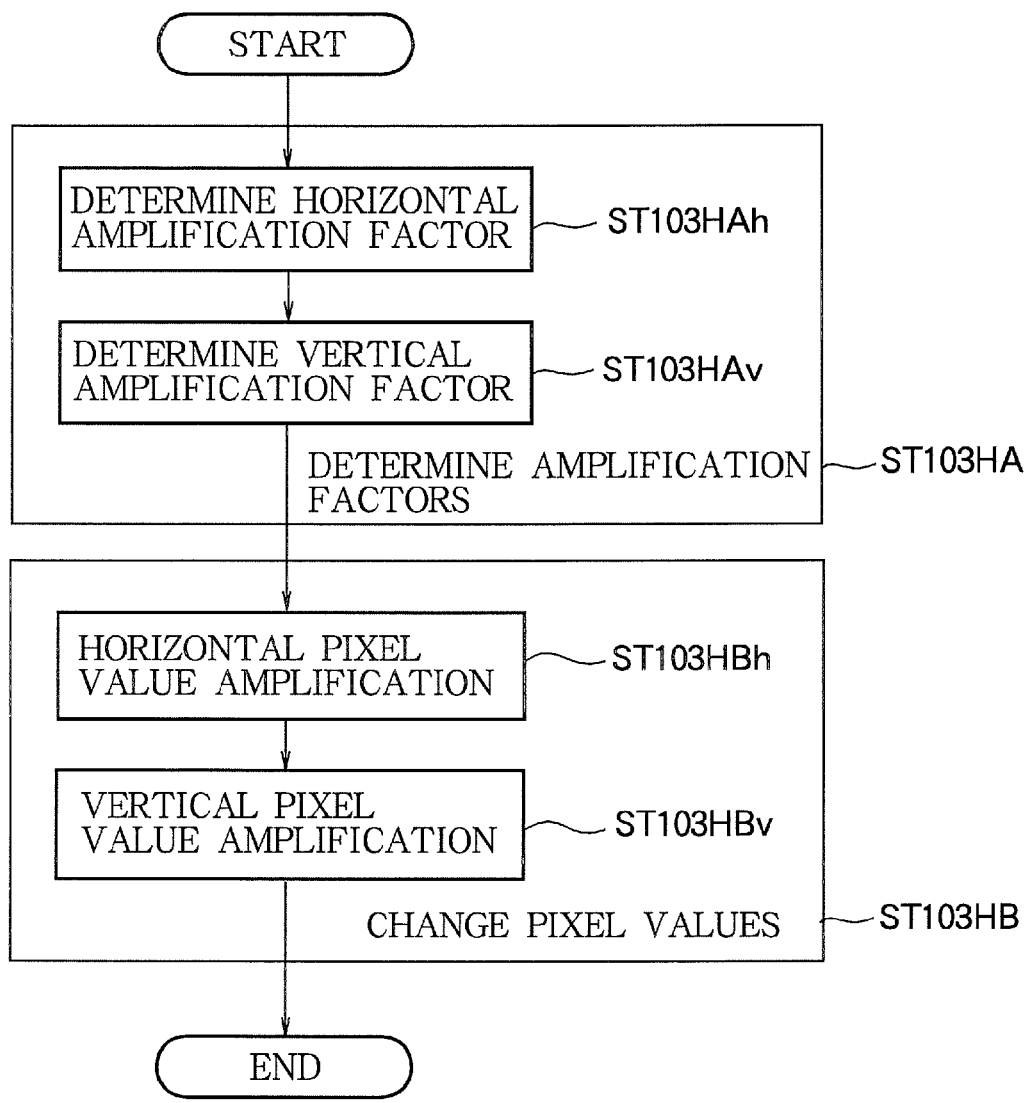
FIG. 54 is a flowchart illustrating processing in the second intermediate image processing step ST103H in FIG. 52.

The second intermediate image processing step ST103H includes, as shown in FIG. 54, an amplification factor determining step ST103HA and a pixel value changing step ST103HB.

First, the operation of the first intermediate image processing step ST103M will be described with reference to the flowchart in FIG. 53.

The amplification factor determining step ST103MA in the first intermediate image processing step ST103M determines amplification factors for the pixel values of pixels in intermediate image D1. Since intermediate image D1 includes image D1$h$ and image D1$v$, an amplification factor is determined for each pixel in image D1$h$ and image D1$v$. The amplification factor for each pixel in image D1$h$ is determined in a horizontal amplification factor determining step ST103MAh, and the amplification factor for each pixel in image D1$v$ is determined in a vertical amplification factor determining step ST103MAv.

Figure 55:
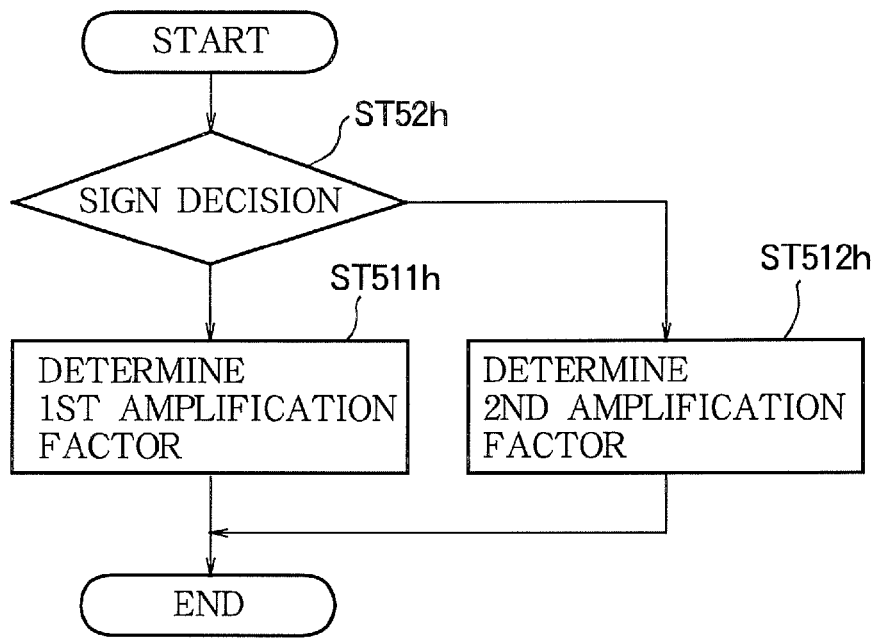
FIG. 55 is a flowchart illustrating processing in a horizontal amplification factor determining step ST103MAh in FIG. 53.

FIG. 55 is a flowchart illustrating the operation of the horizontal amplification factor determining step ST103MAh. In a sign determining step ST52$h$, first the sign (positive or negative) of the pixel value of each pixel in image D1$h$ is determined. If the sign in image D1$h$ is positive, the amplification factor is determined by a first amplification factor determining step ST511$h$. If the sign in image D1$h$ is negative, the amplification factor is determined by a second amplification factor determining step ST512$h$. The first amplification factor determining step ST511$h$ determines the amplification factor in accordance with the pixel value of each pixel in input image DIN according to the first characteristic described in the second embodiment. The second amplification factor determining step ST512$h$ determines the amplification factor in accordance with the pixel value of each pixel in input image DIN according to the second characteristic described in the second embodiment. The operation of the horizontal amplification factor determining step ST103MAh described above is the same as the operation of the horizontal amplification factor determining means 103MAh.

Figure 56:
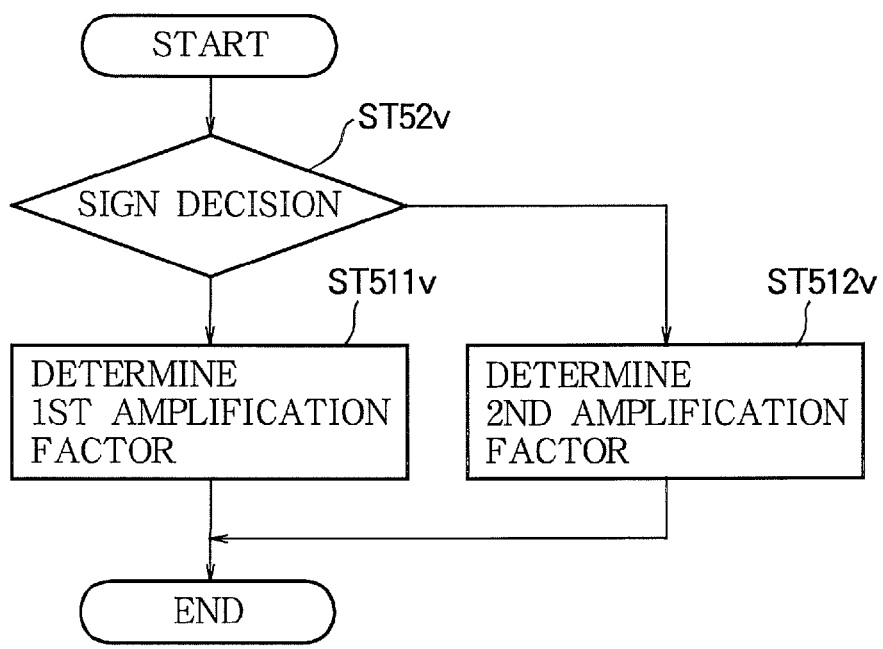
FIG. 56 is a flowchart illustrating processing in a vertical amplification factor determining step ST103MAv in FIG. 53.

FIG. 56 is a flowchart illustrating the operation of the vertical amplification factor determining step ST103MAv. In a sign determining step ST52$v$, first the sign (positive or negative) of the pixel value of a pixel in image D1$v$ is determined. If the sign of the pixel value in image D1$v$ is positive, the amplification factor is determined by a first amplification factor determining step ST511$v$. If the sign of the pixel value in image D1$v$ is negative, the amplification factor is determined by a second amplification factor determining step ST512$v$. The first amplification factor determining step ST511$v$ determines the amplification factor in accordance with the pixel value of each pixel in input image DIN according to the first characteristic described in the second embodiment. The second amplification factor determining step ST512$v$ determines the amplification factor in accordance with the pixel value of each pixel in input image DIN according to the second characteristic described in the second embodiment. The operation of the vertical amplification factor determining step ST103MAv described above is the same as the operation of the vertical amplification factor determining means 103MAv.

In the pixel value changing step ST103MB, the pixel values of pixels in intermediate image D1 are amplified in accordance with the amplification factors determined in the amplification factor determining step ST103MA. Since intermediate image D1 includes image D1$h$ and image D1$v$, the pixel values in each of images D1$h$ and D1$v$ are amplified. An image D103MBh is generated by amplifying each pixel value in image D1$h$ in accordance with the amplification factor determined in the horizontal amplification factor determining step ST103MAh. An image D103MBv is generated by amplifying each pixel value in image D1$v$ in accordance with the amplification factor determined in the vertical amplification factor determining step ST103MAv. These operations are the same as the operations performed by the pixel value amplifying means 103MB.

An intermediate image D103M including an image D103Mh equivalent to image D103MBh and an image D103Mv equivalent to image D103MBv is generated in the first intermediate image processing step ST103M. By operating as described above, the first intermediate image processing step ST103M operates in the same way as the first intermediate image processing means 103M.

Next, the operation of the second intermediate image processing step ST103H will be described with reference to the flowchart in FIG. 54.

The amplification factor determining step ST103HA in the second intermediate image processing step ST103H determines amplification factors for the pixel values of pixels in intermediate image D2. Since intermediate image D2 includes image D2$h$ and image D2$v$, an amplification factor is determined for each pixel in images D2$h$ and D2$v$. The amplification factor for each pixel in image D2$h$ is determined in the horizontal amplification factor determining step ST103HAh, and the amplification factor for each pixel in image D2$v$ is determined in the vertical amplification factor determining step ST103HAv. The horizontal amplification factor determining step ST103HAh operates like the horizontal amplification factor determining means 103HAh, and the vertical amplification factor determining step ST103HAv operates like the vertical amplification factor determining means 103HAv, so descriptions will be omitted.

In the pixel value changing step ST103HB, the pixel values of pixels in intermediate image D2 are amplified in accordance with the amplification factors determined in the amplification factor determining step ST103HA. Since intermediate image D2 includes image D2$h$ and image D2$v$, the pixel values in each of images D2$h$ and D2$v$ are amplified. An image D103HBh is generated by amplifying each pixel value in image D2$h$ in accordance with the amplification factor determined in the horizontal amplification factor determining step ST103HAh. An image D103HBv is generated by amplifying each pixel value in image D2$v$ in accordance with the amplification factor determined in the vertical amplification factor determining step ST103HAv. These operations are the same as the operations performed by the pixel value amplifying means 103HB.

An intermediate image D103H including an image D103Hh equivalent to image D103HBh and an image D103Hv equivalent to image D103HBv is generated in the second intermediate image processing step ST103H. By operating as described above, the second intermediate image processing step ST103H operates in the same way as the second intermediate image processing means 103H.

The image processing method in this embodiment operates as described above.

As is clear from the preceding description, the image processing method in this embodiment and the image processing apparatus in the second embodiment operate equivalently. Therefore, the image processing method in this embodiment has the same effects as the image processing apparatus in the second embodiment. If the image processing method described above is carried out in the image processing apparatus U2 in the image display apparatus illustrated in FIG. 9, for example, the image processed by the image processing method can be displayed by the image display apparatus illustrated in FIG. 9.

Eighth Embodiment

The third embodiment was described as an example of implementation of the invention by hardware. However, part or all of the structure illustrated in FIG. 27 can also be implemented by software. The image processing apparatus used in that case has the same structure as shown in FIG. 44.

The image processing apparatus is used as, for example, the image processing apparatus U202 that forms part of the display apparatus illustrated in FIG. 31; the color image IMGU201 output from the color image enlarging means U201 is supplied as the input image IMGIN through the first interface 14; the CPU 11 performs the same processing as performed in the image processing apparatus in FIG. 27; the output image IMGOUT generated as the result of the processing is supplied as image DU202 through the second interface 15 to, for example, the monitor U203 in FIG. 31, and displayed by the monitor U203.

Figure 57:
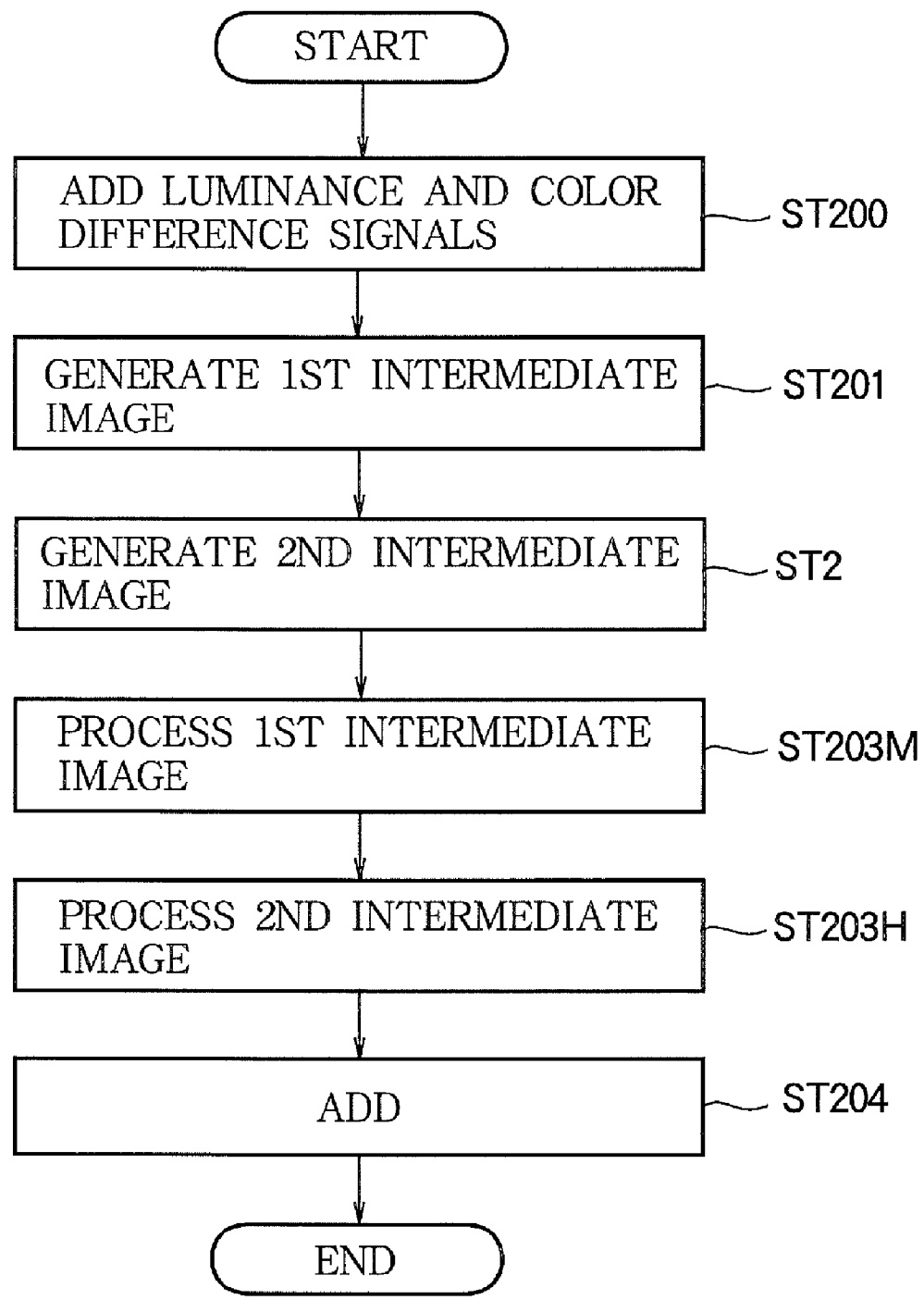
FIG. 57 is a flowchart illustrating processing steps in the image processing method in an eighth embodiment of the invention.

FIG. 57 is a flowchart illustrating an image processing method according to the eighth embodiment of the invention, implemented by giving the image processing apparatus in FIG. 44 the same functions as the image processing apparatus in the third embodiment. The image processing method according to the eighth embodiment includes a luminance and color difference signal adding step ST200, a first intermediate image generating step ST201, a second intermediate image generating step ST2, a first intermediate image processing step ST203M, a second intermediate image processing step ST203H, and an adding step ST204.

Like the third embodiment, the image processing method according to the eighth embodiment performs image processing on an input image IMGIN input in the YCbCr format. The input image IMGIN input in an image input step, which is not shown, is a color image including a signal YIN (input luminance image YIN) representing a luminance component and signals CRIN and CBIN representing color difference components. Of the color difference components, the CRIN signal (input CR image CRIN) represents the Cr component and the CBIN signal (input CB image CBIN) represents the Cb component.

The first intermediate image generating step ST201 performs the same processing on the input luminance image YIN as performed on the input image DIN by the first intermediate image generating step ST1 in the sixth embodiment. It can be structured like the first intermediate image generating step ST1 described in the sixth embodiment.

The second intermediate image generating step ST2 can operate and can be structured in the same way as the second intermediate image generating step ST2 described in the sixth embodiment.

Figure 58:
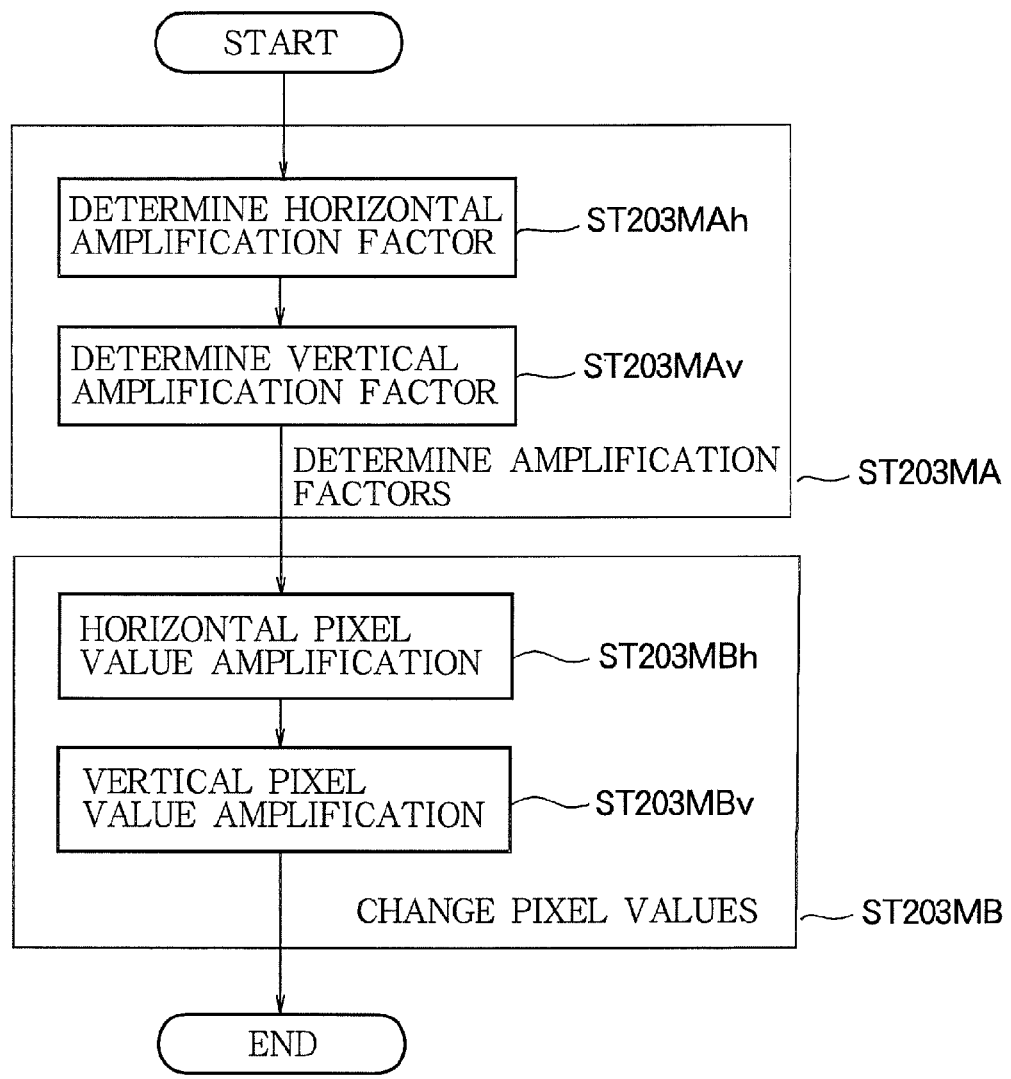
FIG. 58 is a flowchart illustrating processing in the first intermediate image processing step ST203M in FIG. 57.

The first intermediate image processing step ST203M includes, as shown in FIG. 58, an amplification factor determining step ST203MA and a pixel value changing step ST203MB.

Figure 59:
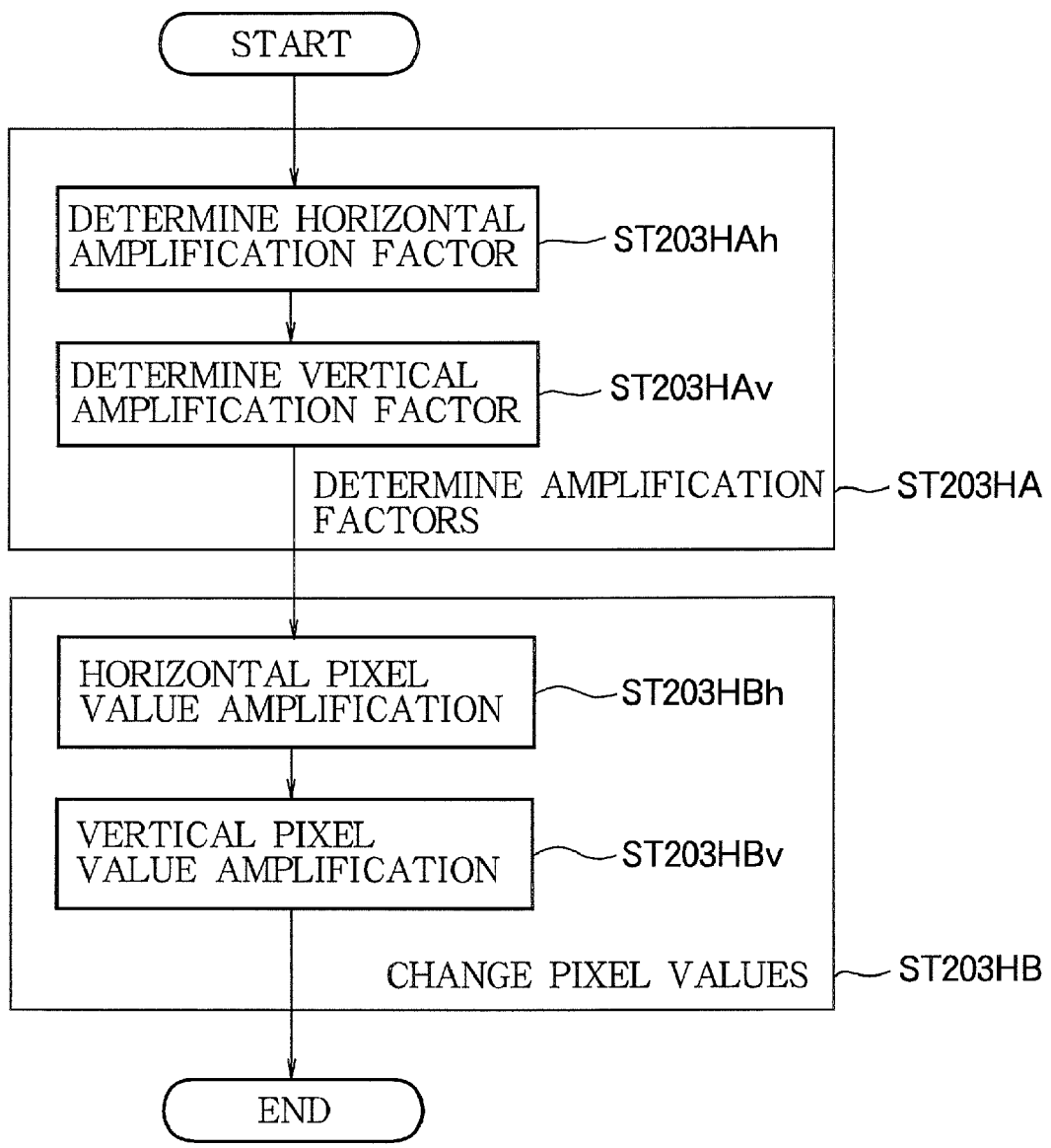
FIG. 59 is a flowchart illustrating processing in the second intermediate image processing step ST203H in FIG. 57.

The second intermediate image processing step ST203H includes, as shown in FIG. 59, an amplification factor determining step ST203HA and a pixel value changing step ST203HB.

First the operation of the luminance and color difference signal adding step ST200 will be described. The luminance and color difference signal adding step ST200 generates a summed luminance and color difference image YC by performing, on each pixel, a weighted addition of the pixel value in the input luminance image YIN, the absolute value of the pixel value in the input CR image CRIN, and the absolute value of the pixel value in the input CB image CBIN. The relationship between the summed luminance and color difference image YC and the input luminance image YIN, input CR image CRIN, and input CB image CBIN can be expressed by expression (7). These operations are equivalent to those performed by the luminance and color difference adding means 205.

The first intermediate image generating step ST201 performs the same processing on the input luminance image YIN as performed on the input image DIN by the first intermediate image generating step ST1 in the sixth embodiment.

The second intermediate image generating step ST2 operates in the same way as the second intermediate image generating step ST2 in the sixth embodiment.

Next the operation of the first intermediate image processing step ST203M will be described with reference to the flowchart in FIG. 58.

The amplification factor determining step ST203MA in the first intermediate image processing step ST203M determines amplification factors for the pixel values of the pixels in intermediate image D1. Since intermediate image D1 includes image D1$h$ and image D1$v$, an amplification factor is determined for each pixel in images D1$h$ and D1$v$. The amplification factor for each pixel in image D1$h$ is determined in the horizontal amplification factor determining step ST203MAh, and the amplification factor for each pixel in image D1$v$ is determined in the vertical amplification factor determining step ST203MAv. The horizontal amplification factor determining step ST203MAh operates like the horizontal amplification factor determining means 203MAh, and the vertical amplification factor determining step ST203MAv operates like the vertical amplification factor determining means 203MAv, so descriptions will be omitted.

In the pixel value changing step ST203MB, the pixel values of pixels in intermediate image D1 are amplified in accordance with the amplification factors determined in the amplification factor determining step ST203MA. Since intermediate image D1 includes image D1$h$ and image D1$v$, the pixel values in each of images D1$h$ and D1$v$ are amplified. An image D203MBh is generated by amplifying each pixel value in image D1$h$ in accordance with the amplification factor determined in the horizontal amplification factor determining step ST203MAh. An image D203MBv is generated by amplifying each pixel value in image D1$v$ in accordance with the amplification factor determined in the vertical amplification factor determining step ST203MAv. These operations are the same as the operations performed by the pixel value amplifying means 203MB.

An intermediate image D203M including an image D203Mh equivalent to image D203MBh and an image D203Mv equivalent to image D203MBv is generated in the first intermediate image processing step ST203M. By operating as described above, the first intermediate image processing step ST203M operates in the same way as the first intermediate image processing means 203M.

Next the operation of the second intermediate image processing step ST203H will be described with reference to the flowchart in FIG. 59.

The amplification factor determining step ST203HA in the second intermediate image processing step ST203H determines the amplification factors for the pixel value of each pixel in intermediate image D2. Since intermediate image D2 includes image D2h and image D2v, an amplification factor is determined for each pixel value in image D2h and in image D2v. The amplification factors for the pixels in image D2h are determined in the horizontal amplification factor determining step ST203HAh, and the amplification factors for the pixels in image D2v are determined in the vertical amplification factor determining step ST203HAv. The horizontal amplification factor determining step ST203HAh operates like the horizontal amplification factor determining means 203HAh, and the vertical amplification factor determining step ST203HAv operates like the vertical amplification factor determining means 203HAv, so descriptions will be omitted.

In the pixel value changing step ST203HB, the pixel values of pixels in intermediate image D2 are amplified in accordance with the amplification factors determined in the amplification factor determining step ST203HA. Since intermediate image D2 includes image D2h and image D2v, the pixel values in each of images D2h and D2v are amplified. An image D203HBh is generated by amplifying each pixel value in image D2h in accordance with the amplification factor determined in the horizontal amplification factor determining step ST203HAh. An image D203HBv is generated by amplifying each pixel value in image D2v in accordance with the amplification factor determined in the vertical amplification factor determining step ST203HAv. These operations are the same as the operations performed by the pixel value amplifying means 203HB.

An intermediate image D203H including an image D203Hh equivalent to image D203HBh and an image D203Hv equivalent to image D203HBv is generated in the second intermediate image processing step ST203H. By operating as described above, the second intermediate image processing step ST203H operates in the same way as the second intermediate image processing means 203H.

In the adding step ST204, the input luminance image YIN, intermediate image D203M, and intermediate image D203H are added together to generate the output luminance image YOUT. Intermediate image D203M includes image D203Mh and image D203Mv, and intermediate image D203H includes image D203Hh and image D203Hv, so images D203Mh, D203Mv, D203Hh, and D203Hv are added to the input luminance image YIN in the adding step ST204. The addition of images D203Mh, D203Mv, D203Hh, and D203Hv to the input luminance image YIN may be simple addition or weighted addition. The output luminance image YOUT is output as a final output image by the image processing method in this embodiment. By operating as described above, the adding step ST204 operates equivalently to the adding means 204.

The image processing method in this embodiment operates as described above.

As is clear from the preceding description, the image processing method in this embodiment and the image processing apparatus in the third embodiment operate equivalently. Therefore, the image processing method in this embodiment has the same effects as the image processing apparatus in the third embodiment. If the image processing method described above is carried out in the image processing apparatus U202 in the image display apparatus illustrated in FIG. 31, for example, the image processed by the image processing method can be displayed by the image display apparatus illustrated in FIG. 31.

Ninth Embodiment

The fourth embodiment was described as an example of implementation of the invention by hardware. However, part or all of the structure illustrated in FIG. 34 can also be implemented by software. The image processing apparatus used in that case has the same structure as shown in FIG. 44.

The image processing apparatus is used as, for example, the image processing apparatus U202 that is part of the image display apparatus in FIG. 31. The color image IMGU201 output from the color image enlarging means U201 is supplied as the input image IMGIN through the first interface 14; the CPU 11 performs the same processing as performed in the image processing apparatus illustrated in FIG. 34; the output image IMGOUT generated as the result of the processing is supplied as image DU202 through the second interface 15 to the monitor U203 in FIG. 31, for example, and displayed by the monitor U203.

Figure 60:
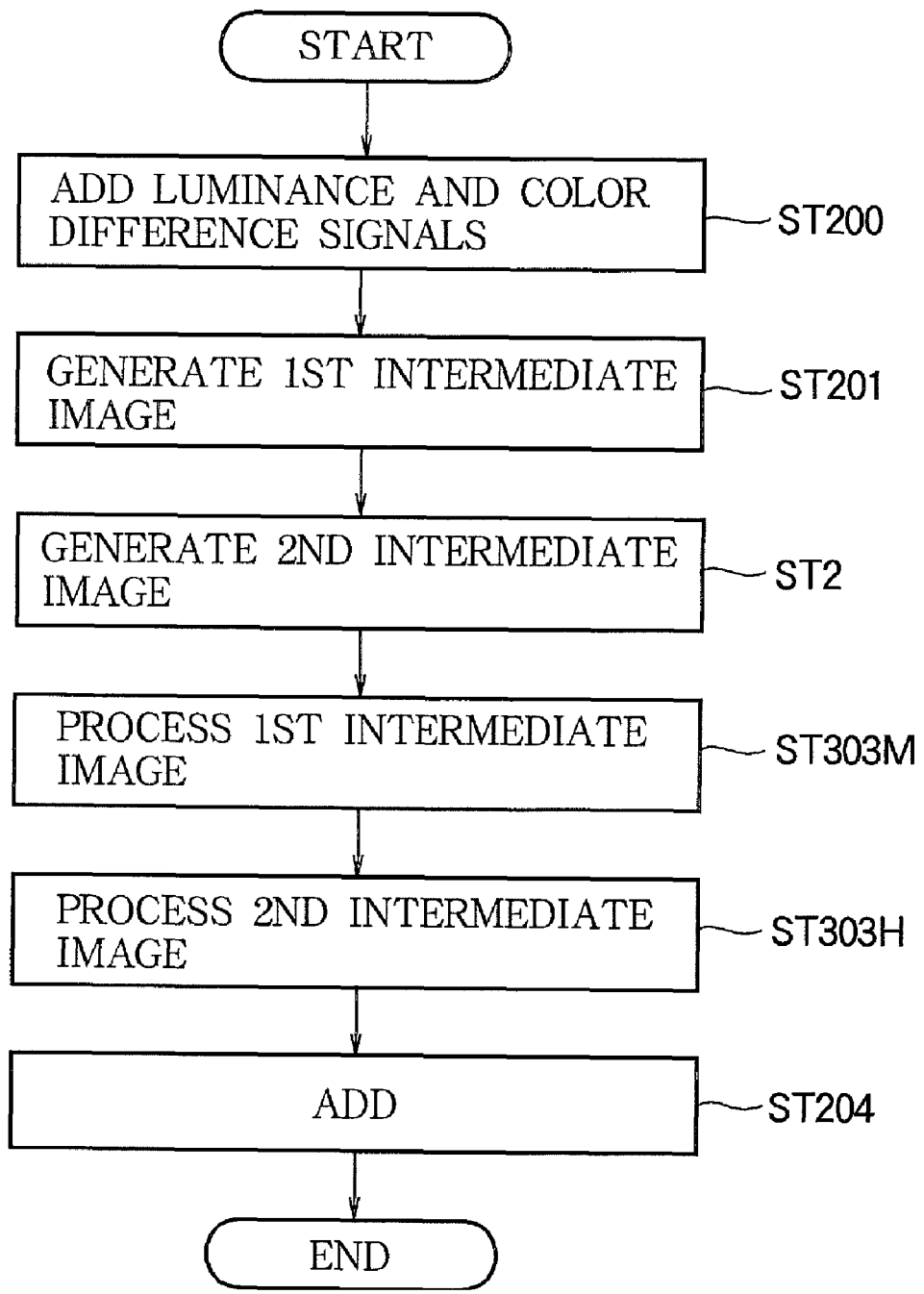
FIG. 60 is a flowchart illustrating processing steps in an image processing apparatus according to a ninth embodiment of the invention.

FIG. 60 is a flowchart illustrating an image processing method according to the ninth embodiment of the invention, implemented by giving the image processing apparatus in FIG. 44 the same functions as the image processing apparatus in the fourth embodiment. The illustrated image processing method includes a luminance and color difference signal adding step ST200, a first intermediate image generating step ST201, a second intermediate image generating step ST2, a first intermediate image processing step ST303M, a second intermediate image processing step ST303H, and an adding step ST204.

Like the fourth embodiment, the image processing method according to the ninth embodiment performs image processing on an input image IMGIN input in the YCbCr format. The input image IMGIN input in an image input step, which is not shown, is a color image including a signal YIN (input luminance image YIN) representing a luminance component and signals CRIN and CBIN representing color difference components. Of the color difference components, the CRIN signal (input CR image CRIN) represents the Cr component and the CBIN signal (input CB image CBIN) represents the Cb component.

The operation and structure of the first intermediate image generating step ST201 are the same as the operation and structure of the first intermediate image generating step ST201 described in the eighth embodiment.

The operation and structure of the second intermediate image generating step ST2 are the same as the operation and structure of the second intermediate image generating step ST2 described in the eighth embodiment.

Figure 61:
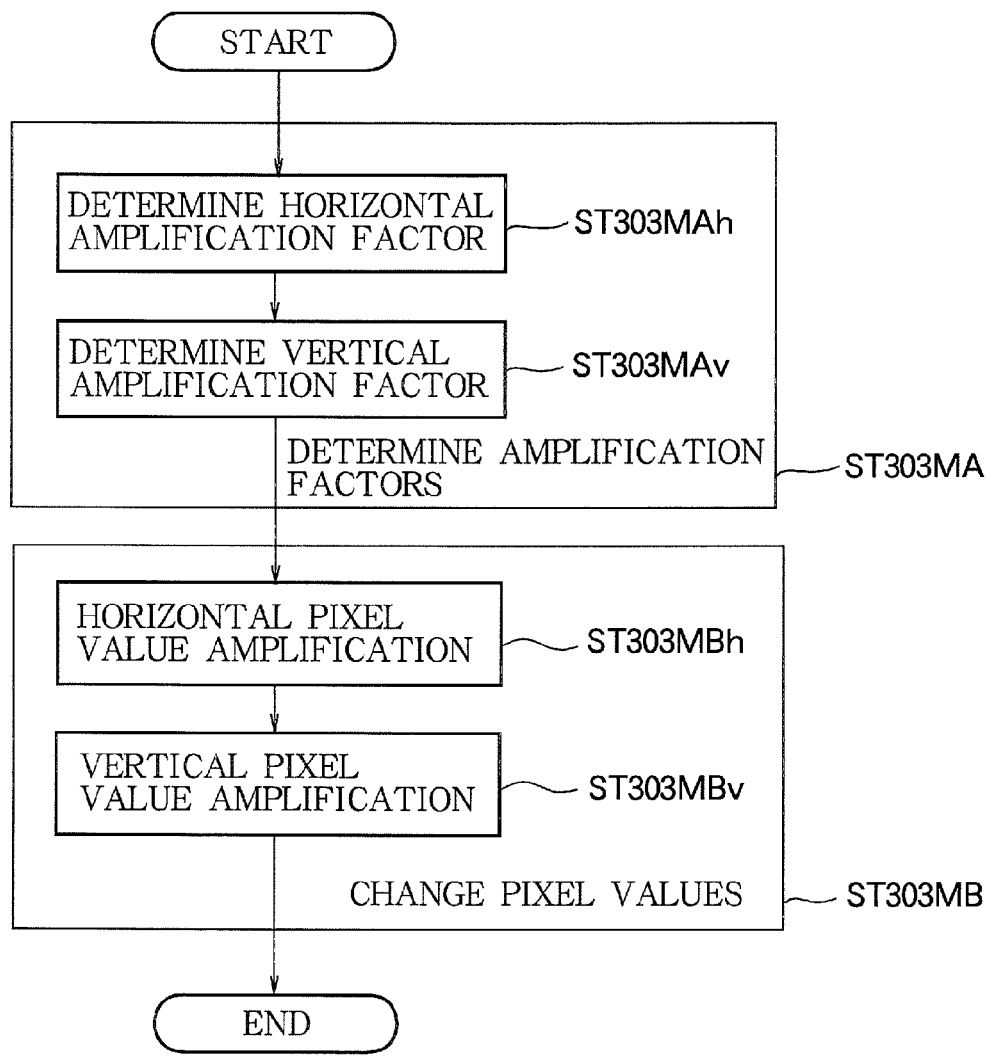
FIG. 61 is a flowchart illustrating processing in the first intermediate image processing step ST303M in FIG. 60.

The first intermediate image processing step ST303M includes, as shown in FIG. 61, an amplification factor determining step ST303MA and a pixel value changing step ST303MB.

Figure 62:
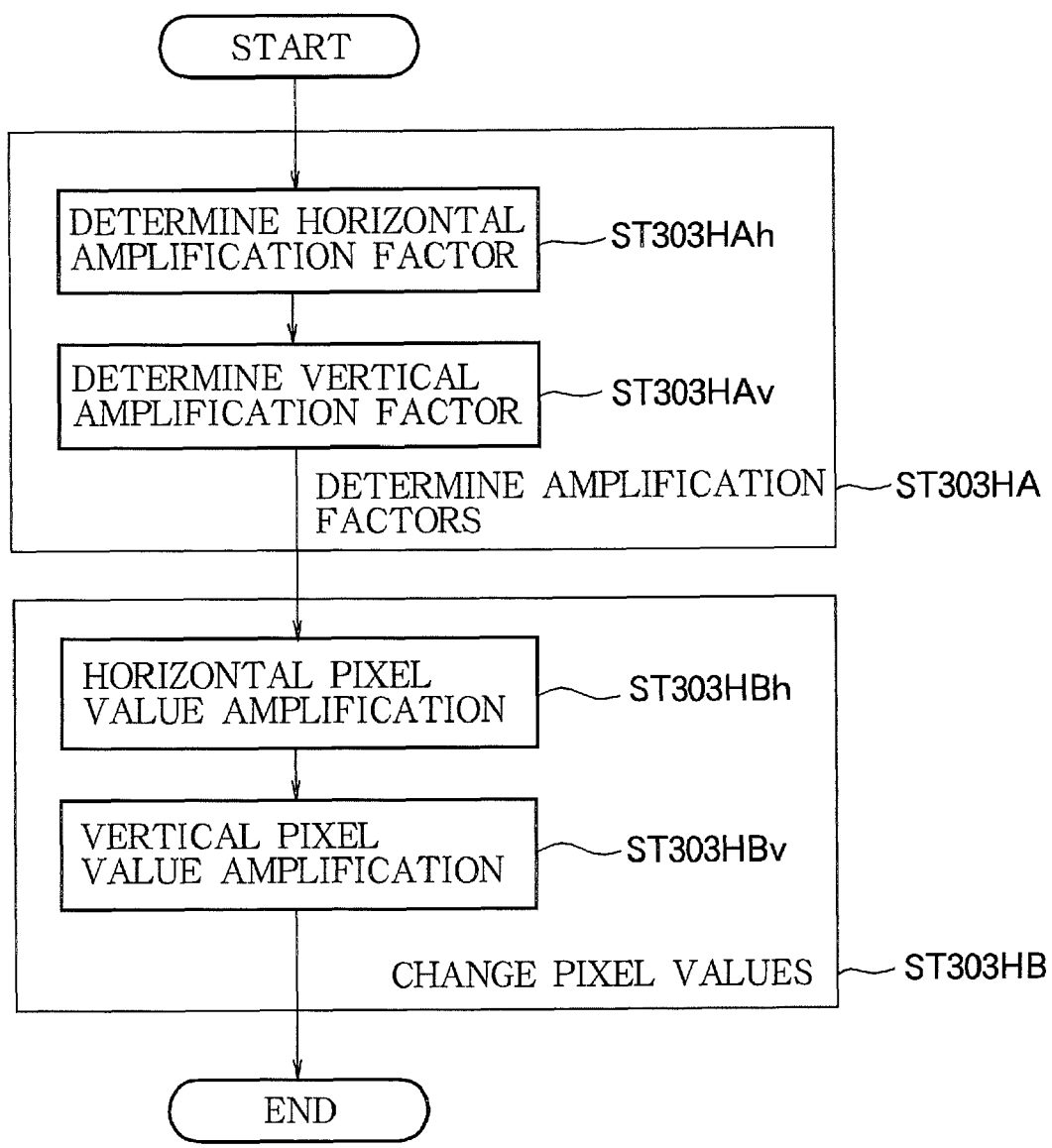
FIG. 62 is a flowchart illustrating processing in the second intermediate image processing step ST303H in FIG. 60.

The second intermediate image processing step ST303H includes, as shown in FIG. 62, an amplification factor determining step ST303HA and a pixel value changing step ST303HB.

The image processing method according to this embodiment will be described below. The operations performed in the luminance and color difference signal adding step ST200, the first intermediate image generating step ST201, the second intermediate image generating step ST2, and the adding step ST204 are the same as in the eighth embodiment, so descriptions will be omitted.

First the operation of the first intermediate image processing step ST303M will be described with reference to the flowchart in FIG. 61.

In the amplification factor determining step ST303MA of the first intermediate image processing step ST303M, amplification factors for the pixel values of pixels in intermediate image D1 are determined. Since intermediate image D1 includes image D1h and image D1v, an amplification factor is determined for each pixel in images D1h and D1v. The amplification factor for each pixel in image D1h is determined in the horizontal amplification factor determining step ST303MAh, and the amplification factor for each pixel in image D1v is determined in the vertical amplification factor determining step ST303MAv. The horizontal amplification factor determining step ST303MAh operates like the horizontal amplification factor determining means 303MAh, and the vertical amplification factor determining step ST303MAv operates like the vertical amplification factor determining means 303MAv, so descriptions will be omitted.

In the pixel value changing step ST303MB, the pixel values of pixels in intermediate image D1 are amplified in accordance with the amplification factors determined in the amplification factor determining step ST303MA. Since intermediate image D1 includes image D1h and image D1v, the pixel values in each of images D1h and D1v are amplified. An image D303MBh is generated by amplifying each pixel value in image D1h in accordance with the amplification factor determined in the horizontal amplification factor determining step ST303MAh. An image D303MBv is generated by amplifying each pixel value in image D1v in accordance with the amplification factor determined in the vertical amplification factor determining step ST303MAv. These operations are the same as the operations performed by the pixel value amplifying means 303MB.

An intermediate image D303M including an image D303Mh equivalent to image D303MBh and an image D303Mv equivalent to image D303MBv is generated in the first intermediate image processing step ST303M. By operating as described above, the first intermediate image processing step ST303M operates in the same way as the first intermediate image processing means 303M.

Next the operation of the second intermediate image processing step ST303H will be described with reference to the flowchart in FIG. 62.

In the amplification factor determining step ST303HA of the second intermediate image processing step ST303H, the amplification factors are determined for the pixel values of the pixels in intermediate image D2. Since intermediate image D2 includes image D2h and image D2v, an amplification factor is determined for each of the pixel values in images D2h and D2v. The amplification factor for each pixel in image D2h is determined in the horizontal amplification factor determining step ST303HAh, and the amplification factor for each pixel in image D2v is determined in the vertical amplification factor determining step ST303HAv. The horizontal amplification factor determining step ST303HAh operates like the horizontal amplification factor determining means 303HAh, and the vertical amplification factor determining step ST303HAv operates like the vertical amplification factor determining means 303HAv, so descriptions will be omitted.

In the pixel value changing step ST303HB, the pixel values of pixels in intermediate image D2 are amplified in accordance with the amplification factors determined in the amplification factor determining step ST303HA. Since intermediate image D2 includes image D2h and image D2v, the pixel values in each of images D2h and D2v are amplified. An image D303HBh is generated by amplifying each pixel value in image D2h in accordance with the amplification factor determined in the horizontal amplification factor determining step ST303HAh. An image D303HBv is generated by amplifying each pixel value in image D2v in accordance with the amplification factor determined in the vertical amplification factor determining step ST303HAv. These operations are the same as the operations performed by the pixel value amplifying means 303HB.

An intermediate image D303H including an image D303Hh equivalent to image D303HBh and an image D303Hv equivalent to image D303HBv is generated in the second intermediate image processing step ST303H. By operating as described above, the second intermediate image processing step ST303H operates in the same way as the second intermediate image processing means 303H.

The image processing method in this embodiment operates as described above.

As is clear from the preceding description, the image processing method in this embodiment and the image processing apparatus in the fourth embodiment operate equivalently. Therefore, the image processing method in this embodiment has the same effects as the image processing apparatus in the fourth embodiment. If the image processing method described above is carried out in the image processing apparatus U202 in the image display apparatus illustrated in FIG. 31, for example, the image processed by the image processing method can be displayed by the image display apparatus illustrated in FIG. 31.

Tenth Embodiment

The fifth embodiment was described as an example of implementation of the invention by hardware. However, part or all of the structure illustrated in FIG. 39 can also be implemented by software. The image processing apparatus used in that case has the same structure as shown in FIG. 44.

The image processing apparatus is used as, for example, the image processing apparatus U202 forming part of the image display apparatus illustrated in FIG. 31; the color image IMGU201 output from the color image enlarging means U201 is supplied as the input image IMGIN through the first interface 14; the CPU 11 performs the same processing as performed in the image processing apparatus in FIG. 39; the output image IMGOUT generated as the result of the processing is supplied as image DU202 through the second interface 15 to, for example, the monitor U203 in FIG. 31, and displayed by the monitor U203.

Figure 63:
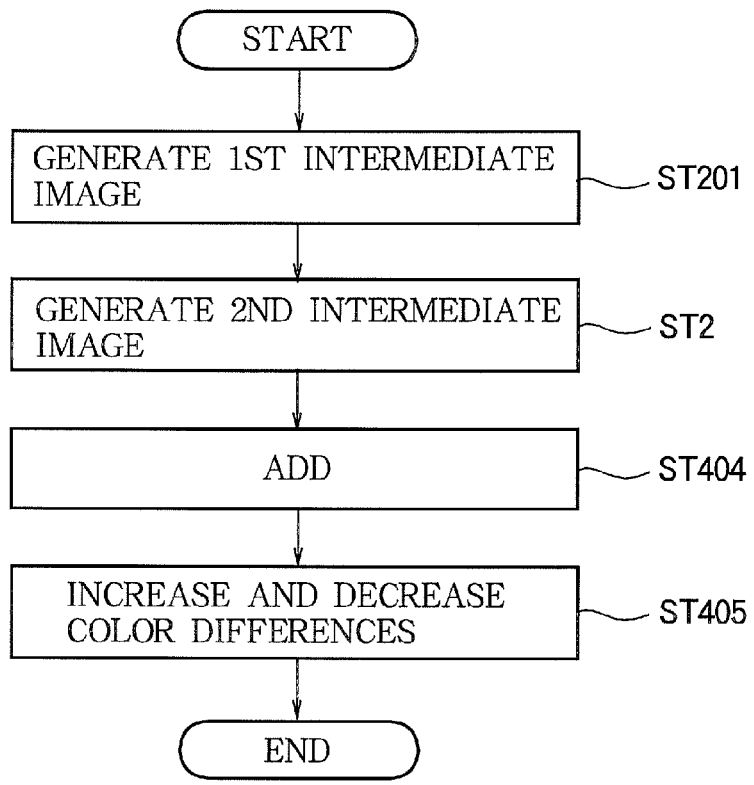
FIG. 63 is a flowchart illustrating processing steps in an image processing method in a tenth embodiment of the invention.

FIG. 63 is a flowchart illustrating an image processing method according to the tenth embodiment of the invention, implemented by giving the image processing apparatus in FIG. 44 the same functions as the image processing apparatus in the fifth embodiment. The image processing method according to the tenth embodiment includes a first intermediate image generating step ST201, a second intermediate image generating step ST2, an adding step ST404, and a color difference increasing-decreasing step ST405.

Like the fifth embodiment, the image processing method according to the tenth embodiment performs image processing on an input image IMGIN input in the YCbCr format. The input image IMGIN input in an image input step, which is not shown, is a color image including a signal YIN (input luminance image YIN) representing a luminance component and signals CRIN and CBIN representing color difference components. Of the color difference components, the CRIN signal (input CR image CRIN) represents the Cr component and the CBIN signal (input CB image CBIN) represents the Cb component.

An output image IMGOUT including the output luminance image YOUT, output CR image CROUT, and output CB image CBOUT generated by performing on the input image YIN certain processing as described later is output as a final output image by an image output step, which is not shown.

The operation and structure of the first intermediate image generating step ST201 are similar to the operation and structure of the first intermediate image generating step ST201 in the eighth embodiment.

The operation and structure of the second intermediate image generating step ST2 are similar to the operation and structure of the second intermediate image generating step ST2 in the eighth embodiment.

Next the operation of the adding step ST404 will be described.

The adding step ST404 adds the input luminance image YIN, intermediate image D1, and intermediate image D2 together and outputs the resulting sum as the summed high-frequency component image D404. The adding step ST404 also adds the summed high-frequency component image D404 (the sum of intermediate image D1 and intermediate image D2) to the input luminance image YIN and outputs the resulting sum as the output luminance image YOUT.

Intermediate image D1 includes an image D1h and an image D1v, and intermediate image D2 includes an image D2h and an image D2v, so the summed high-frequency component image D404 is generated by adding images D1h, D1v, D2h, and D2v all together in the adding step ST404. The addition of images D1h, D1v, D2h, and D2v may be simple addition or weighted addition. The output luminance image YOUT is output as part of the final output image of the image processing method in this embodiment. By operating as described above, the adding step ST404 operates equivalently to adding means 404.

Figure 64:
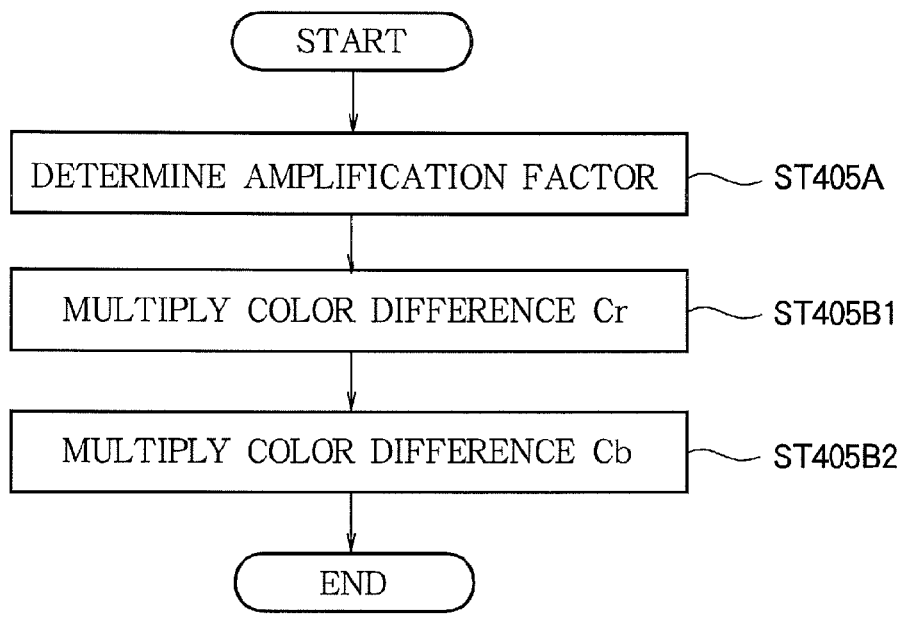
FIG. 64 is a flowchart illustrating processing in the amplification factor determining step ST405 in FIG. 63.

Next the operation of the luminance and color difference adding step ST405 will be described with reference to the flowchart in FIG. 64.

In the amplification factor determining step ST405A in the luminance and color difference adding step ST405, an amplification factor for each pixel in the input CR image CRIN and input CB image CBIN is determined on the basis of the pixel value in the corresponding position in the summed high-frequency component image D404. The relationship between the pixel value in the summed high-frequency component image D404 and the amplification factor determined in the amplification factor determining step ST405A is similar to the relationship used in the fifth embodiment.

The color difference Cr multiplying step ST405B1 multiplies the pixel values in the input CR image CRIN by an amplification factor given by an amplification factor D405A and outputs the resulting product as image D405B1.

The color difference Cb multiplying step ST405B2 multiplies the pixel values in the input CB image CBIN by an amplification factor given by the amplification factor D405A and outputs the resulting product as image D405B2.

Image D405B1 is output as the output CR image CROUT, and image D405B2 is output as the output CB image CBOUT. The output CR image CROUT and output CB image CBOUT are used as part of the final output image IMGOUT.

By operating as described above, the color difference amplifying step ST405 operates equivalently to the color difference increasing-decreasing means 405.

The image processing method in this embodiment operates as described above.

As is clear from the preceding description, the image processing method in this embodiment and the image processing apparatus in the fifth embodiment operate equivalently. Therefore, the image processing method in this embodiment has the same effects as the image processing apparatus in the fifth embodiment. If the image processing method described above is carried out in the image processing apparatus U202 in the image display apparatus illustrated in FIG. 31, for example, the image processed by the image processing method can be displayed by the image display apparatus illustrated in FIG. 31.

EXPLANATION OF REFERENCE CHARACTERS 1 first intermediate image generating means, 2 second intermediate image generating means, 3M first intermediate image processing means, 3H second intermediate image processing means, 4 adding means, 103M first intermediate image processing means, 103H second intermediate image processing means, 201 first intermediate image generating means, 203M first intermediate image processing means, 203H second intermediate image processing means, 204 adding means, 205 luminance and color difference adding means, 303M first intermediate image processing means, 303H second intermediate image processing means, 404 adding means, 405 color difference increasing-decreasing means, DIN input image, D1 intermediate image, D2 intermediate image, D3M intermediate image, D3H intermediate image, DOUT output image, D103M intermediate image, D103H intermediate image, IMGIN input image, YIN input luminance image, CRIN input CR image, CBIN input CB image, D203M intermediate image, D203H intermediate image, IMGOUT output image, YOUT output luminance image, CROUT output CR image, CBOUT output CB image, D303M intermediate image, D303H intermediate image, D404 summed high-frequency component image.

What is claimed is:

1. An image processing apparatus to which an enlarged image obtained by enlarging an original image is input as an input image, said image processing apparatus comprising:
a first intermediate image generating unit configured to generate a first intermediate image by extracting a component in a particular frequency band by removing a low frequency component and a high frequency component from the input image;
a second intermediate image generating unit configured to generate a second intermediate image from the first intermediate image;
an intermediate image processing unit configured to output an image obtained by amplifying each pixel value in the second intermediate image by a first amplification factor based on a pixel value of the input image; and
an adding unit configured to add, to the input image, the image output by the intermediate image processing unit; wherein
the first intermediate image generating unit comprises:
a first high-frequency component image generating unit configured to generate a first high-frequency component image by extracting a high-frequency component of the input image; and
a low-frequency component image generating unit configured to generate the first intermediate image by extracting only a low-frequency component of the first high-frequency component image; and
the second intermediate image generating unit comprises:
a non-linear processing unit configured to generate a non-linearly processed image by amplifying each pixel value in the first intermediate image by a second amplification factor determined for each pixel.

2. The image processing apparatus of claim 1, wherein the non-linear processing unit comprises:
a zero-crossing decision unit configured to identify a point where the pixel value in the first intermediate image changes from positive to negative or from negative to positive as a zero-crossing point; and
a signal amplifying unit configured to determine the second amplification factor for each of the pixels preceding and following each position which has been identified to be a zero-crossing point by the zero-crossing decision unit, to have a value greater than 1, and to determine the second amplification factor for each of other pixels to have a value equal to 1, and amplifying the pixel value in the first intermediate image by the determined second amplification factor to generate a nonlinearly processed image.

3. The image processing apparatus of claim 2, wherein the second intermediate image generating unit further comprises:
a second high-frequency component image generating unit configured to generate a second high-frequency component image by extracting only a high-frequency component from the non-linearly processed image.

4. The image processing apparatus of claim 1, wherein the intermediate image processing unit determines the first amplification factor based not only on the pixel value of the input image, but also on the sign of the pixel value in the second intermediate image.

5. The image processing apparatus of claim 1, wherein the input image is a color image, and
the intermediate image processing unit determines the first amplification factor based on a luminance value and a color difference signal of the input image.

6. The image processing apparatus of claim 5, wherein
the intermediate image processing unit determines the first amplification factor based on a value obtained by weighted addition of the luminance value of the input image and the absolute value of the color difference signal of the input image.

7. The image processing apparatus of claim 1, wherein the input image is a color image, and
the intermediate image processing unit determines the first amplification factor based on a luminance value and a color difference signal of the input image, and the sign of the pixel value in the second intermediate image.

8. The image processing apparatus of claim 7, wherein the intermediate image processing unit determines the first amplification factor based on a value obtained by weighted addition of the luminance value of the input image and the absolute value of the color difference signal of the input image, and the sign of pixel value in the second intermediate image.

9. An image processing apparatus for receiving a color image, the image processing apparatus comprising:
a first intermediate image generating unit configured to generate a first intermediate image by extracting a component in a particular frequency band from a luminance image representing a luminance signal of the color image;
a second intermediate image generating unit configured to generate a second intermediate image from the first intermediate image;
an adding unit configured to generate a summed high-frequency component image by adding the first intermediate image and the second intermediate image together and to generate an output luminance image by adding the summed high-frequency component image to the luminance image; and
a color difference increasing-decreasing unit configured to increase or decrease pixel values in a color difference image representing a color difference signal of the color image in accordance with pixel values in the summed high-frequency component image;
wherein the color difference increasing-decreasing unit comprises:
an amplification factor determining unit configured to determine an amplification factor for each pixel value in the color difference image, based on each pixel value in the summed high-frequency component image, and a color-difference multiplication unit configured to output a value obtained by multiplying the pixel value in the color difference signal by the amplification factor determined by the amplification factor determining unit; wherein
said amplification factor increases monotonically with the pixel value in the summed high-frequency component image.

10. An image processing method to which an enlarged image obtained by enlarging an original image is input as an input image, said image processing method comprising:
a first intermediate image generating step for generating a first intermediate image by extracting a component in a particular frequency band by removing a low frequency component and a high frequency component from the input image;
a second intermediate image generating step for generating a second intermediate image from the first intermediate image;
an intermediate image processing step for outputting an image obtained by amplifying each pixel value in the second intermediate image by a first amplification factor based on a pixel value of the input image; and
an adding step for adding, to the input image, the image output by the intermediate image processing step; wherein
the first intermediate image generating step comprises:
a first high-frequency component image generating step for generating a first high-frequency component image by extracting a high-frequency component of the input image; and
a low-frequency component image generating step for generating the first intermediate image by extracting only a low-frequency component of the first high-frequency component image; and
the second intermediate image generating step comprises:
a non-linear processing step for generating a non-linearly processed image by amplifying each pixel value in the first intermediate image by a second amplification factor determined for each pixel.

11. An image processing method for receiving a color image, the image processing method comprising:
a first intermediate image generating step for generating a first intermediate image by extracting a component in a particular frequency band from a luminance image representing a luminance signal of the color image;
a second intermediate image generating step for generating a second intermediate image from the first intermediate image;
an adding step for generating a summed high-frequency component image by adding the first intermediate image and the second intermediate image together and generating an output luminance image by adding the summed high-frequency component image to the luminance image; and a color difference increasing-decreasing step for increasing or decreasing pixel values in a color difference image representing a color difference signal of the color image in accordance with pixel values in the summed high-frequency component image;

wherein the color difference increasing-decreasing step comprises:

an amplification factor determining step for determining an amplification factor for each pixel value in the color difference image, based on each pixel value in the summed high-frequency component image, and a color-difference multiplication step for outputting a value obtained by multiplying the pixel value in the color difference signal by the amplification factor determined by the amplification factor determining step; wherein said amplification factor increases monotonically with the pixel value in the summed high-frequency component image.

12. An image display apparatus including the image processing apparatus of claim 1.

13. An image display apparatus including the image processing apparatus of claim 9.

14. An image display apparatus including the image processing method of claim 10.

15. An image display apparatus including the image processing method of claim 11.

* * * * *